United States Patent
Yang et al.

(10) Patent No.: US 12,436,104 B2
(45) Date of Patent: Oct. 7, 2025

(54) FLUORESCENT PROBE FOR BRANCHED CHAIN AMINO ACIDS AND USE THEREOF

(71) Applicant: East China University of Science and Technology, Shanghai (CN)

(72) Inventors: Yi Yang, Shanghai (CN); Yuzheng Zhao, Shanghai (CN); Xie Li, Shanghai (CN); Yejun Zou, Shanghai (CN); Changcheng Zhang, Shanghai (CN)

(73) Assignee: East China University of Science and Technology, Shanghai (CN)

( * ) Notice: Subject to any disclaimer, the term of this patent is extended or adjusted under 35 U.S.C. 154(b) by 549 days.

(21) Appl. No.: 16/981,088

(22) PCT Filed: Mar. 15, 2019

(86) PCT No.: PCT/CN2019/078274
§ 371 (c)(1),
(2) Date: Apr. 29, 2021

(87) PCT Pub. No.: WO2019/174633
PCT Pub. Date: Sep. 19, 2019

(65) Prior Publication Data
US 2024/0027344 A1 Jan. 25, 2024

(30) Foreign Application Priority Data
Mar. 15, 2018 (CN) .......................... 201810215698.7

(51) Int. Cl.
*A61K 38/00* (2006.01)
*G01N 21/64* (2006.01)

(52) U.S. Cl.
CPC .............................. *G01N 21/6428* (2013.01)

(58) Field of Classification Search
CPC .............. C07K 14/195; C07K 2319/20; C07K 2319/60; C07K 14/245; G01N 21/6428
See application file for complete search history.

(56) References Cited

U.S. PATENT DOCUMENTS

2015/0111222 A1* 4/2015 Marvin ................ C07K 14/195
435/254.11

FOREIGN PATENT DOCUMENTS

| CN | 105694851 A | 6/2016 |
|---|---|---|
| CN | 106232623 A | 12/2016 |
| CN | 106905418 A | 6/2017 |
| CN | 108395484 A | 8/2018 |

OTHER PUBLICATIONS

Chino et al. (Int. J. Mol. Sci. Jun. 13, 2007; 8(6): 513-525). Branched-chain Amino Acid Biosensing Using Fluorescent Modified Engineered Leucine/Isoleucine/Valine Binding Protein (Year: 2007).*
Chino et al., "Branched-chain Amino Acid Biosensing Using Fluorescent Modified Engineered Leucine/Isoleucine/Valine Binding Protein," International Journal of Molecular Sciences, 2007, vol. 8, pp. 513-525.
GenBank: AAN82689.1, "Leu/Ile/Val-binding protein precursor [*Escherichia coli* CFT073]," Jan. 31, 2014.
GenBank: EGI19136.1, "Leu/Ile/Val-binding protein (LIV-BP) [*Escherichia coli* M718]," Jul. 25, 2016.
International Search Report issued in corresponding International Patent Application No. PCT/CN2019/078274, mailed Jun. 14, 2019.

* cited by examiner

*Primary Examiner* — Lianko G Garyu
*Assistant Examiner* — Mercy H Sabila
(74) *Attorney, Agent, or Firm* — Greenberg Traurig, LLP; Melissa Hunter-Ensor; Nathan Hsu

(57) ABSTRACT

Provided herein is a fluorescent sensor, comprising a) a responsive polypeptide, and b) an optically active polypeptide, wherein the optically active polypeptide is inserted into the responsive polypeptide. Also provided herein are nucleic acid sequences encoding the fluorescent sensor, expression vectors comprising the nucleic acid sequence, and cells comprising such expression vectors. Also provided herein are methods for preparing the fluorescent sensor, uses of the fluorescent sensor, and kits comprising the fluorescent sensor.

10 Claims, 16 Drawing Sheets
Specification includes a Sequence Listing.

A

SEQUENCE LISTING

<160> NUMBER OF SEQ ID NOS: 33

<210> SEQ ID NO 1
<211> LENGTH: 345
<212> TYPE: PRT
<213> ORGANISM: Escherichia coli

<400> SEQUENCE: 1

Met Glu Asp Ile Lys Val Ala Val Val Gly Ala Met Ser Gly Pro Val
1               5                   10                  15

Ala Gln Tyr Gly Asp Gln Glu Phe Thr Gly Ala Glu Gln Ala Val Ala
            20                  25                  30

Asp Ile Asn Ala Lys Gly Gly Ile Lys Gly Asn Lys Leu Gln Ile Val
        35                  40                  45

Lys Tyr Asp Asp Ala Cys Asp Pro Lys Gln Ala Val Ala Val Ala Asn
    50                  55                  60

Lys Val Val Asn Asp Gly Ile Lys Tyr Val Ile Gly His Leu Cys Ser
65                  70                  75                  80

Ser Ser Thr Gln Pro Ala Ser Asp Ile Tyr Glu Asp Glu Gly Ile Leu
                85                  90                  95

Met Ile Thr Pro Ala Ala Thr Ala Pro Glu Leu Thr Ala Arg Gly Tyr
            100                 105                 110

Gln Leu Ile Leu Arg Thr Thr Gly Leu Asp Ser Asp Gln Gly Pro Thr
        115                 120                 125

Ala Ala Lys Tyr Ile Leu Glu Lys Val Lys Pro Gln Arg Ile Ala Ile
    130                 135                 140

Val His Asp Lys Gln Gln Tyr Gly Glu Gly Leu Ala Arg Ala Val Gln
145                 150                 155                 160

Asp Gly Leu Lys Lys Gly Asn Ala Asn Val Val Phe Phe Asp Gly Ile
                165                 170                 175

Thr Ala Gly Glu Lys Asp Phe Ser Thr Leu Val Ala Arg Leu Lys Lys
            180                 185                 190

Glu Asn Ile Asp Phe Val Tyr Tyr Gly Gly Tyr His Pro Glu Met Gly
        195                 200                 205

Gln Ile Leu Arg Gln Ala Arg Ala Ala Gly Leu Lys Thr Gln Phe Met
    210                 215                 220

Gly Pro Glu Gly Val Ala Asn Val Ser Leu Ser Asn Ile Ala Gly Glu
225                 230                 235                 240

Ser Ala Glu Gly Leu Leu Val Thr Lys Pro Lys Asn Tyr Asp Gln Val
                245                 250                 255

Pro Ala Asn Lys Pro Ile Val Asp Ala Ile Lys Ala Lys Lys Gln Asp
            260                 265                 270

Pro Ser Gly Ala Phe Val Trp Thr Thr Tyr Ala Ala Leu Gln Ser Leu
        275                 280                 285

Gln Ala Gly Leu Asn Gln Ser Asp Asp Pro Ala Glu Ile Ala Lys Tyr
    290                 295                 300

Leu Lys Ala Asn Ser Val Asp Thr Val Met Gly Pro Leu Thr Trp Asp
305                 310                 315                 320

Glu Lys Gly Asp Leu Lys Gly Phe Glu Phe Gly Val Phe Asp Trp His
                325                 330                 335

Ala Asn Gly Thr Ala Thr Asp Ala Lys
            340                 345

<210> SEQ ID NO 2
<211> LENGTH: 347

```
<212> TYPE: PRT
<213> ORGANISM: Escherichia coli

<400> SEQUENCE: 2

Met Asp Asp Ile Lys Val Ala Val Gly Ala Met Ser Gly Pro Ile
1               5                   10                  15

Ala Gln Trp Gly Asp Met Glu Phe Asn Gly Ala Arg Gln Ala Ile Lys
            20                  25                  30

Asp Ile Asn Ala Lys Gly Gly Ile Lys Gly Asp Lys Leu Val Gly Val
                35                  40                  45

Glu Tyr Asp Asp Ala Cys Asp Pro Lys Gln Ala Val Ala Val Ala Asn
50                  55                          60

Lys Ile Val Asn Asp Gly Ile Lys Tyr Val Ile Gly His Leu Cys Ser
65                  70                  75                  80

Ser Ser Thr Gln Pro Ala Ser Asp Ile Tyr Glu Asp Glu Gly Ile Leu
                85                  90                  95

Met Ile Ser Pro Gly Ala Thr Asn Pro Glu Leu Thr Gln Arg Gly Tyr
                100                 105                 110

Gln His Ile Met Arg Thr Ala Gly Leu Asp Ser Ser Gln Gly Pro Thr
            115                 120                 125

Ala Ala Lys Tyr Ile Leu Glu Thr Val Lys Pro Gln Arg Ile Ala Ile
130                 135                 140

Ile His Asp Lys Gln Gln Tyr Gly Glu Gly Leu Ala Arg Ser Val Gln
145                 150                 155                 160

Asp Gly Leu Lys Ala Ala Asn Ala Asn Val Val Phe Phe Asp Gly Ile
                165                 170                 175

Thr Ala Gly Glu Lys Asp Phe Ser Ala Leu Ile Ala Arg Leu Lys Lys
            180                 185                 190

Glu Asn Ile Asp Phe Val Tyr Tyr Gly Gly Tyr Tyr Pro Glu Met Gly
            195                 200                 205

Gln Met Leu Arg Gln Ala Arg Ser Val Gly Leu Lys Thr Gln Phe Met
210                 215                 220

Gly Pro Glu Gly Val Gly Asn Ala Ser Leu Ser Asn Ile Ala Gly Asp
225                 230                 235                 240

Ala Ala Glu Gly Met Leu Val Thr Met Pro Lys Arg Tyr Asp Gln Asp
                245                 250                 255

Pro Ala Asn Gln Gly Ile Val Asp Ala Leu Lys Ala Asp Lys Lys Asp
                260                 265                 270

Pro Ser Gly Pro Tyr Val Trp Ile Thr Tyr Ala Ala Val Gln Ser Leu
            275                 280                 285

Ala Thr Ala Leu Glu Arg Thr Gly Ser Asp Glu Pro Leu Ala Leu Val
290                 295                 300

Lys Asp Leu Lys Ala Asn Gly Ala Asn Thr Val Ile Gly Pro Leu Asn
305                 310                 315                 320

Trp Asp Glu Lys Gly Asp Leu Lys Gly Phe Asp Phe Gly Val Phe Gln
                325                 330                 335

Trp His Ala Asp Gly Ser Ser Thr Ala Ala Lys
                340                 345

<210> SEQ ID NO 3
<211> LENGTH: 247
<212> TYPE: PRT
<213> ORGANISM: Artificial Sequence
<220> FEATURE:
<223> OTHER INFORMATION: cpYFP
```

```
<400> SEQUENCE: 3

Met Tyr Asn Ser Asp Asn Val Tyr Ile Met Ala Asp Lys Gln Lys Asn
1               5                   10                  15

Gly Ile Lys Ala Asn Phe Lys Ile Arg His Asn Val Glu Asp Gly Ser
            20                  25                  30

Val Gln Leu Ala Asp His Tyr Gln Gln Asn Thr Pro Ile Gly Asp Gly
        35                  40                  45

Pro Val Leu Leu Pro Asp Asn His Tyr Leu Ser Phe Gln Ser Val Leu
    50                  55                  60

Ser Lys Asp Pro Asn Glu Lys Arg Asp His Met Val Leu Leu Glu Phe
65                  70                  75                  80

Val Thr Ala Ala Gly Ile Thr Leu Gly Met Asp Glu Leu Tyr Asn Val
                85                  90                  95

Asp Gly Gly Ser Gly Gly Thr Gly Ser Lys Gly Glu Glu Leu Phe Thr
            100                 105                 110

Gly Val Val Pro Ile Leu Val Glu Leu Asp Gly Asp Val Asn Gly His
        115                 120                 125

Lys Phe Ser Val Ser Gly Glu Gly Glu Gly Asp Ala Thr Tyr Gly Lys
    130                 135                 140

Leu Thr Leu Lys Leu Ile Cys Thr Thr Gly Lys Leu Pro Val Pro Trp
145                 150                 155                 160

Pro Thr Leu Val Thr Thr Leu Gly Tyr Gly Leu Lys Cys Phe Ala Arg
                165                 170                 175

Tyr Pro Asp His Met Lys Gln His Asp Phe Phe Lys Ser Ala Met Pro
            180                 185                 190

Glu Gly Tyr Val Gln Glu Arg Thr Ile Phe Phe Lys Asp Asp Gly Asn
        195                 200                 205

Tyr Lys Thr Arg Ala Glu Val Lys Phe Glu Gly Asp Thr Leu Val Asn
    210                 215                 220

Arg Ile Glu Leu Lys Gly Ile Gly Phe Lys Glu Asp Gly Asn Ile Leu
225                 230                 235                 240

Gly His Lys Leu Glu Tyr Asn
                245

<210> SEQ ID NO 4
<211> LENGTH: 243
<212> TYPE: PRT
<213> ORGANISM: Artificial Sequence
<220> FEATURE:
<223> OTHER INFORMATION: cpBFP

<400> SEQUENCE: 4

Asn Val Tyr Ile Lys Ala Asp Lys Gln Lys Asn Gly Ile Lys Ala Asn
1               5                   10                  15

Phe Lys Ile Arg His Asn Ile Glu Gly Gly Val Gln Leu Ala Tyr
            20                  25                  30

His Tyr Gln Gln Asn Thr Pro Ile Gly Asp Gly Pro Val Leu Leu Pro
        35                  40                  45

Asp Asn His Tyr Leu Ser Val Gln Ser Ile Leu Ser Lys Asp Pro Asn
    50                  55                  60

Glu Lys Arg Asp His Met Val Leu Leu Glu Phe Val Thr Ala Ala Gly
65                  70                  75                  80

Ile Thr Leu Gly Met Asp Glu Leu Tyr Lys Gly Gly Thr Gly Gly Ser
                85                  90                  95

Glu Ser Met Val Ser Lys Gly Glu Glu Leu Phe Thr Gly Val Val Pro
```

```
            100                 105                 110
Ile Gln Val Glu Leu Asp Gly Asp Val Asn Gly His Lys Phe Ser Val
            115                 120                 125

Ser Gly Glu Gly Glu Gly Asp Ala Thr Tyr Gly Lys Leu Thr Leu Lys
130                 135                 140

Phe Ile Cys Thr Thr Gly Lys Leu Pro Val Pro Trp Pro Thr Leu Val
145                 150                 155                 160

Thr Thr Leu Ser His Gly Val Gln Cys Phe Ser Arg Tyr Pro Asp His
                165                 170                 175

Met Lys Gln His Asp Phe Phe Lys Ser Ala Met Pro Gly Gly Tyr Ile
            180                 185                 190

Gln Glu Arg Thr Ile Phe Phe Lys Asp Asp Gly Asn Tyr Lys Thr Arg
            195                 200                 205

Ala Glu Val Lys Phe Glu Gly Asp Thr Leu Val Asn Arg Ile Glu Leu
        210                 215                 220

Lys Gly Ile Asp Phe Lys Glu Asp Gly Asn Ile Leu Gly His Lys Leu
225                 230                 235                 240

Glu Tyr Asn

<210> SEQ ID NO 5
<211> LENGTH: 243
<212> TYPE: PRT
<213> ORGANISM: Artificial Sequence
<220> FEATURE:
<223> OTHER INFORMATION: cpmApple

<400> SEQUENCE: 5

Met Val Ser Glu Arg Met Tyr Pro Glu Asp Gly Ala Leu Lys Ser Glu
1               5                   10                  15

Ile Lys Lys Gly Leu Arg Leu Lys Asp Gly Gly His Tyr Ala Ala Glu
            20                  25                  30

Val Lys Thr Thr Tyr Lys Ala Lys Lys Pro Val Gln Leu Pro Gly Ala
        35                  40                  45

Tyr Ile Val Asp Ile Lys Leu Asp Ile Val Ser His Asn Glu Asp Tyr
    50                  55                  60

Thr Ile Val Glu Gln Cys Glu Arg Ala Glu Gly Arg His Ser Thr Gly
65                  70                  75                  80

Gly Met Asp Glu Leu Tyr Lys Gly Gly Thr Gly Gly Ser Leu Val Ser
                85                  90                  95

Lys Gly Glu Glu Asp Asn Met Ala Ile Ile Lys Glu Phe Met Arg Phe
            100                 105                 110

Lys Val His Met Glu Gly Ser Val Asn Gly His Glu Phe Glu Ile Glu
            115                 120                 125

Gly Glu Gly Glu Gly Arg Pro Tyr Glu Ala Phe Gln Thr Ala Lys Leu
        130                 135                 140

Lys Val Thr Lys Gly Gly Pro Leu Pro Phe Ala Trp Asp Ile Leu Ser
145                 150                 155                 160

Pro Gln Phe Met Tyr Gly Ser Lys Ala Tyr Ile Lys His Pro Ala Asp
                165                 170                 175

Ile Pro Asp Tyr Phe Lys Leu Ser Phe Pro Glu Gly Phe Arg Trp Glu
            180                 185                 190

Arg Val Met Asn Phe Glu Asp Gly Gly Ile Ile His Val Asn Gln Asp
        195                 200                 205

Ser Ser Leu Gln Asp Gly Val Phe Ile Tyr Lys Val Lys Leu Arg Gly
    210                 215                 220
```

Thr Asn Phe Pro Pro Asp Gly Pro Val Met Gln Lys Thr Met Gly
225                 230                 235                 240

Trp Glu Ala

<210> SEQ ID NO 6
<211> LENGTH: 241
<212> TYPE: PRT
<213> ORGANISM: Artificial Sequence
<220> FEATURE:
<223> OTHER INFORMATION: cpGFP

<400> SEQUENCE: 6

Asn Val Tyr Ile Lys Ala Asp Lys Gln Lys Asn Gly Ile Lys Ala Asn
1               5                   10                  15

Phe Lys Ile Arg His Asn Ile Glu Asp Gly Gly Val Gln Leu Ala Tyr
            20                  25                  30

His Tyr Gln Gln Asn Thr Pro Ile Gly Asp Gly Pro Val Leu Leu Pro
        35                  40                  45

Asp Asn His Tyr Leu Ser Val Gln Ser Ile Leu Ser Lys Asp Pro Asn
    50                  55                  60

Glu Lys Arg Asp His Met Val Leu Leu Glu Phe Val Thr Ala Ala Gly
65                  70                  75                  80

Ile Thr Leu Gly Met Asp Glu Leu Tyr Lys Gly Gly Thr Gly Gly Ser
                85                  90                  95

Met Val Ser Lys Gly Glu Glu Leu Phe Thr Gly Val Val Pro Ile Gln
            100                 105                 110

Val Glu Leu Asp Gly Asp Val Asn Gly His Lys Phe Ser Val Ser Gly
        115                 120                 125

Glu Gly Glu Gly Asp Ala Thr Tyr Gly Lys Leu Thr Leu Lys Phe Ile
    130                 135                 140

Cys Thr Thr Gly Lys Leu Pro Val Pro Trp Pro Thr Leu Val Thr Thr
145                 150                 155                 160

Leu Thr Tyr Gly Val Gln Cys Phe Ser Arg Tyr Pro Asp His Met Lys
                165                 170                 175

Gln His Asp Phe Phe Lys Ser Ala Met Pro Glu Gly Tyr Ile Gln Glu
            180                 185                 190

Arg Thr Ile Phe Phe Lys Asp Asp Gly Asn Tyr Lys Thr Arg Ala Glu
        195                 200                 205

Val Lys Phe Glu Gly Asp Thr Leu Val Asn Arg Ile Glu Leu Lys Gly
    210                 215                 220

Ile Asp Phe Lys Glu Asp Gly Asn Ile Leu Gly His Lys Leu Glu Tyr
225                 230                 235                 240

Asn

<210> SEQ ID NO 7
<211> LENGTH: 241
<212> TYPE: PRT
<213> ORGANISM: Artificial Sequence
<220> FEATURE:
<223> OTHER INFORMATION: cpTFP

<400> SEQUENCE: 7

Asn Val Tyr Ile Met Ala Asp Lys Gln Lys Asn Gly Ile Lys Ala Asn
1               5                   10                  15

Phe Lys Ile Arg His Asn Ile Glu Asp Gly Gly Val Gln Leu Ala Asp
            20                  25                  30

His Tyr Gln Gln Asn Thr Pro Ile Gly Asp Gly Pro Val Leu Leu Pro
            35                  40                  45

Asp Asn His Tyr Leu Ser Ile Gln Ser Lys Leu Ser Lys Asp Pro Asn
 50                  55                  60

Glu Lys Arg Asp His Met Val Leu Leu Glu Phe Val Thr Ala Ala Gly
 65                  70                  75                  80

Ile Thr His Gly Met Asp Glu Leu Tyr Lys Gly Thr Gly Gly Ser
                    85                  90                  95

Met Val Ser Lys Gly Glu Glu Leu Phe Thr Gly Val Val Pro Ile Leu
                100                 105                 110

Val Glu Leu Asp Gly Asp Val Asn Gly His Lys Phe Ser Val Ser Gly
                115                 120                 125

Glu Gly Glu Gly Asp Ala Thr Tyr Gly Lys Leu Thr Leu Lys Phe Ile
            130                 135                 140

Cys Thr Thr Gly Lys Leu Pro Val Pro Trp Pro Thr Leu Val Thr Thr
145                 150                 155                 160

Phe Ser Tyr Gly Val Met Val Phe Ala Arg Tyr Pro Asp His Met Lys
                    165                 170                 175

Gln His Asp Phe Phe Lys Ser Ala Met Pro Glu Gly Tyr Val Gln Glu
                180                 185                 190

Arg Thr Ile Phe Phe Lys Asp Asp Gly Asn Tyr Lys Thr Arg Ala Glu
            195                 200                 205

Val Lys Phe Glu Gly Asp Thr Leu Val Asn Arg Ile Glu Leu Lys Gly
210                 215                 220

Ile Asp Phe Lys Glu Asp Gly Asn Ile Leu Gly His Lys Leu Glu Tyr
225                 230                 235                 240

Asn

<210> SEQ ID NO 8
<211> LENGTH: 242
<212> TYPE: PRT
<213> ORGANISM: Artificial Sequence
<220> FEATURE:
<223> OTHER INFORMATION: cpmOrange

<400> SEQUENCE: 8

Val Ser Glu Arg Met Tyr Pro Glu Asp Gly Val Leu Lys Ser Glu Ile
1               5                   10                  15

Lys Lys Gly Leu Arg Leu Lys Asp Gly His Tyr Ala Ala Glu Val
                20                  25                  30

Lys Thr Thr Tyr Lys Ala Lys Lys Pro Val Gln Leu Pro Gly Ala Tyr
            35                  40                  45

Ile Val Asp Ile Lys Leu Asp Ile Val Ser His Asn Glu Asp Tyr Thr
 50                  55                  60

Ile Val Glu Gln Cys Glu Arg Ala Glu Gly Arg His Pro Thr Gly Gly
 65                  70                  75                  80

Arg Asp Glu Leu Tyr Lys Gly Gly Thr Gly Gly Ser Leu Val Ser Lys
                    85                  90                  95

Gly Glu Glu Asp Asn Met Ala Ile Ile Lys Glu Phe Met Arg Phe Lys
                100                 105                 110

Val His Met Glu Gly Ser Val Asn Gly His Glu Phe Glu Ile Glu Gly
                115                 120                 125

Glu Gly Glu Gly Arg Pro Tyr Glu Ala Phe Gln Thr Ala Lys Leu Lys
            130                 135                 140

Val Thr Lys Gly Gly Pro Leu Pro Phe Ala Trp Asp Ile Leu Ser Pro

```
                145                 150                 155                 160
        Gln Phe Thr Tyr Gly Ser Lys Ala Tyr Ile Lys His Pro Ala Asp Ile
                        165                 170                 175

Pro Asp Tyr Phe Lys Leu Ser Phe Pro Glu Gly Phe Arg Trp Glu Arg
                        180                 185                 190

Val Met Asn Phe Glu Asp Gly Gly Ile Ile His Val Asn Gln Asp Ser
                        195                 200                 205

Ser Leu Gln Asp Gly Val Phe Ile Tyr Lys Val Lys Leu Arg Gly Thr
                        210                 215                 220

Asn Phe Pro Pro Asp Gly Pro Val Met Gln Lys Lys Thr Met Gly Trp
        225                 230                 235                 240

Glu Ala

<210> SEQ ID NO 9
<211> LENGTH: 250
<212> TYPE: PRT
<213> ORGANISM: Artificial Sequence
<220> FEATURE:
<223> OTHER INFORMATION: cpmKate

<400> SEQUENCE: 9

Met Gly Gly Arg Ser Lys Lys Pro Ala Lys Asn Leu Lys Met Pro Gly
1               5                   10                  15

Val Tyr Tyr Val Asp Arg Arg Leu Glu Arg Ile Lys Glu Ala Asp Lys
                20                  25                  30

Glu Thr Tyr Val Glu Gln His Glu Val Ala Val Ala Arg Tyr Cys Asp
                35                  40                  45

Leu Pro Ser Lys Leu Gly His Lys Leu Asn Gly Gly Thr Gly Gly Ser
        50                  55                  60

Met Val Ser Lys Gly Glu Glu Leu Ile Lys Glu Asn Met His Met Lys
65                  70                  75                  80

Leu Tyr Met Glu Gly Thr Val Asn Asn His His Phe Lys Cys Thr Ser
                85                  90                  95

Glu Gly Glu Gly Lys Pro Tyr Glu Gly Thr Gln Thr Met Arg Ile Lys
                100                 105                 110

Val Val Glu Gly Gly Pro Leu Pro Phe Ala Phe Asp Ile Leu Ala Thr
                115                 120                 125

Ser Phe Met Tyr Gly Ser Lys Thr Phe Ile Asn His Thr Gln Gly Ile
                130                 135                 140

Pro Asp Phe Phe Lys Gln Ser Phe Pro Glu Gly Phe Thr Trp Glu Arg
145                 150                 155                 160

Val Thr Thr Tyr Glu Asp Gly Gly Val Leu Thr Ala Thr Gln Asp Thr
                165                 170                 175

Ser Leu Gln Asp Gly Cys Leu Ile Tyr Asn Val Lys Ile Arg Gly Val
                180                 185                 190

Asn Phe Pro Ser Asn Gly Pro Val Met Gln Lys Lys Thr Leu Gly Trp
                195                 200                 205

Glu Ala Ser Thr Glu Met Leu Tyr Pro Ala Asp Gly Gly Leu Glu Gly
                210                 215                 220

Arg Ser Asp Met Ala Leu Lys Leu Val Gly Gly His Leu Ile Cys
225                 230                 235                 240

Asn Leu Lys Thr Thr Tyr Arg Ser Lys Lys
                245                 250

<210> SEQ ID NO 10
```

<211> LENGTH: 236
<212> TYPE: PRT
<213> ORGANISM: Artificial Sequence
<220> FEATURE:
<223> OTHER INFORMATION: mcherry

<400> SEQUENCE: 10

```
Met Val Ser Lys Gly Glu Glu Asp Asn Met Ala Ile Ile Lys Glu Phe
1               5                   10                  15

Met Arg Phe Lys Val His Met Glu Gly Ser Val Asn Gly His Glu Phe
            20                  25                  30

Glu Ile Glu Gly Glu Gly Glu Gly Arg Pro Tyr Glu Gly Thr Gln Thr
        35                  40                  45

Ala Lys Leu Lys Val Thr Lys Gly Gly Pro Leu Pro Phe Ala Trp Asp
    50                  55                  60

Ile Leu Ser Pro Gln Phe Met Tyr Gly Ser Lys Ala Tyr Val Lys His
65                  70                  75                  80

Pro Ala Asp Ile Pro Asp Tyr Leu Lys Leu Ser Phe Pro Glu Gly Phe
                85                  90                  95

Lys Trp Glu Arg Val Met Asn Phe Glu Asp Gly Gly Val Val Thr Val
            100                 105                 110

Thr Gln Asp Ser Ser Leu Gln Asp Gly Glu Phe Ile Tyr Lys Val Lys
        115                 120                 125

Leu Arg Gly Thr Asn Phe Pro Ser Asp Gly Pro Val Met Gln Lys Lys
    130                 135                 140

Thr Met Gly Trp Glu Ala Ser Ser Glu Arg Met Tyr Pro Glu Asp Gly
145                 150                 155                 160

Ala Leu Lys Gly Glu Ile Lys Gln Arg Leu Lys Leu Lys Asp Gly Gly
                165                 170                 175

His Tyr Asp Ala Glu Val Lys Thr Thr Tyr Lys Ala Lys Lys Pro Val
            180                 185                 190

Gln Leu Pro Gly Ala Tyr Asn Val Asn Ile Lys Leu Asp Ile Thr Ser
        195                 200                 205

His Asn Glu Asp Tyr Thr Ile Val Glu Gln Tyr Glu Arg Ala Glu Gly
    210                 215                 220

Arg His Ser Thr Gly Gly Met Asp Glu Leu Tyr Lys
225                 230                 235
```

<210> SEQ ID NO 11
<211> LENGTH: 238
<212> TYPE: PRT
<213> ORGANISM: Artificial Sequence
<220> FEATURE:
<223> OTHER INFORMATION: GFP

<400> SEQUENCE: 11

```
Met Ser Lys Gly Glu Glu Leu Phe Thr Gly Val Val Pro Val Leu Val
1               5                   10                  15

Glu Leu Asp Gly Asp Val Asn Gly Gln Lys Phe Ser Val Ser Gly Glu
            20                  25                  30

Gly Glu Gly Asp Ala Thr Tyr Gly Lys Leu Thr Leu Asn Phe Ile Cys
        35                  40                  45

Thr Thr Gly Lys Leu Pro Val Pro Trp Pro Thr Leu Val Thr Thr Phe
    50                  55                  60

Ser Tyr Gly Val Gln Cys Phe Ser Arg Tyr Pro Asp His Met Lys Gln
65                  70                  75                  80

His Asp Phe Phe Lys Ser Ala Met Pro Glu Gly Tyr Val Gln Glu Arg
```

-continued

```
                85                  90                  95
Thr Ile Phe Tyr Lys Asp Asp Gly Asn Tyr Lys Thr Arg Ala Glu Val
                100                 105                 110

Lys Phe Glu Gly Asp Thr Leu Val Asn Arg Ile Glu Leu Lys Gly Ile
            115                 120                 125

Asp Phe Lys Glu Asp Gly Asn Ile Leu Gly His Lys Met Glu Tyr Asn
130                 135                 140

Tyr Asn Ser His Asn Val Tyr Ile Met Gly Asp Lys Pro Lys Asn Gly
145                 150                 155                 160

Ile Lys Val Asn Phe Lys Ile Arg His Asn Ile Lys Asp Gly Ser Val
                165                 170                 175

Gln Leu Ala Asp His Tyr Gln Gln Asn Thr Pro Ile Gly Asp Gly Pro
            180                 185                 190

Val Leu Leu Pro Asp Asn His Tyr Leu Ser Thr Gln Ser Ala Leu Ser
            195                 200                 205

Lys Asp Pro Asn Glu Lys Arg Asp His Met Ile Leu Leu Glu Phe Val
210                 215                 220

Thr Ala Ala Arg Ile Thr His Gly Met Asp Glu Leu Tyr Lys
225                 230                 235
```

<210> SEQ ID NO 12
<211> LENGTH: 239
<212> TYPE: PRT
<213> ORGANISM: Artificial Sequence
<220> FEATURE:
<223> OTHER INFORMATION: BFP

<400> SEQUENCE: 12

```
Met Val Ser Lys Gly Glu Glu Leu Phe Thr Gly Val Val Pro Ile Leu
1               5                   10                  15

Val Glu Leu Asp Gly Asp Val Asn Gly His Lys Phe Ser Val Ser Gly
            20                  25                  30

Glu Gly Glu Gly Asp Ala Thr Tyr Gly Lys Leu Thr Leu Lys Phe Ile
        35                  40                  45

Cys Thr Thr Gly Lys Leu Pro Val Pro Trp Pro Thr Leu Val Thr Thr
50                  55                  60

Leu Ser His Gly Val Gln Cys Phe Ser Arg Tyr Pro Asp His Met Lys
65                  70                  75                  80

Gln His Asp Phe Phe Lys Ser Ala Met Pro Glu Gly Tyr Val Gln Glu
                85                  90                  95

Arg Thr Ile Phe Phe Lys Asp Asp Gly Asn Tyr Lys Thr Arg Ala Glu
            100                 105                 110

Val Lys Phe Glu Gly Asp Thr Leu Val Asn Arg Ile Glu Leu Lys Gly
        115                 120                 125

Ile Asp Phe Lys Glu Asp Gly Asn Ile Leu Gly His Lys Leu Glu Tyr
130                 135                 140

Asn Phe Asn Ser His Asn Val Tyr Ile Met Ala Asp Lys Gln Lys Asn
145                 150                 155                 160

Gly Ile Lys Ala Asn Phe Lys Ile Arg His Asn Ile Glu Asp Gly Ser
                165                 170                 175

Val Gln Leu Ala Asp His Tyr Gln Gln Asn Thr Pro Ile Gly Asp Gly
            180                 185                 190

Pro Val Leu Leu Pro Asp Ser His Tyr Leu Ser Thr Gln Ser Ala Leu
        195                 200                 205

Ser Lys Asp Pro Asn Glu Lys Arg Asp His Met Val Leu Leu Glu Phe
```

```
                  210                 215                 220
Val Thr Ala Ala Gly Ile Thr Leu Gly Met Asp Glu Leu Tyr Lys
225                 230                 235

<210> SEQ ID NO 13
<211> LENGTH: 233
<212> TYPE: PRT
<213> ORGANISM: Artificial Sequence
<220> FEATURE:
<223> OTHER INFORMATION: mKate

<400> SEQUENCE: 13

Met Ser Glu Leu Ile Thr Glu Asn Met His Met Lys Leu Tyr Met Glu
1               5                   10                  15

Gly Thr Val Asn Asn His His Phe Lys Cys Thr Ser Glu Gly Glu Gly
                20                  25                  30

Lys Pro Tyr Glu Gly Thr Gln Thr Met Arg Ile Lys Val Val Glu Gly
            35                  40                  45

Gly Pro Leu Pro Phe Ala Phe Asp Ile Leu Ala Thr Ser Phe Met Tyr
        50                  55                  60

Gly Ser Lys Thr Phe Ile Asn His Thr Gln Gly Ile Pro Asp Phe Phe
65                  70                  75                  80

Lys Gln Ser Phe Pro Glu Gly Phe Thr Trp Glu Arg Val Thr Thr Tyr
                85                  90                  95

Glu Asp Gly Gly Val Leu Thr Ala Thr Gln Asp Thr Ser Leu Gln Asp
            100                 105                 110

Gly Cys Leu Ile Tyr Asn Val Lys Ile Arg Gly Val Asn Phe Pro Ser
        115                 120                 125

Asn Gly Pro Val Met Gln Lys Lys Thr Leu Gly Trp Glu Ala Ser Thr
130                 135                 140

Glu Met Leu Tyr Pro Ala Asp Gly Gly Leu Glu Gly Arg Ala Asp Met
145                 150                 155                 160

Ala Leu Lys Leu Val Gly Gly Gly His Leu Ile Cys Asn Leu Lys Thr
                165                 170                 175

Thr Tyr Arg Ser Lys Lys Pro Ala Lys Asn Leu Lys Met Pro Gly Val
            180                 185                 190

Tyr Tyr Val Asp Arg Arg Leu Glu Arg Ile Lys Glu Ala Asp Lys Glu
        195                 200                 205

Thr Tyr Val Glu Gln His Glu Val Ala Val Ala Arg Tyr Cys Asp Leu
    210                 215                 220

Pro Ser Lys Leu Gly His Lys Leu Asn
225                 230

<210> SEQ ID NO 14
<211> LENGTH: 590
<212> TYPE: PRT
<213> ORGANISM: Artificial Sequence
<220> FEATURE:
<223> OTHER INFORMATION: LivJ325/326-cpYFP

<400> SEQUENCE: 14

Glu Asp Ile Lys Val Ala Val Val Gly Ala Met Ser Gly Pro Val Ala
1               5                   10                  15

Gln Tyr Gly Asp Gln Glu Phe Thr Gly Ala Glu Gln Ala Val Ala Asp
                20                  25                  30

Ile Asn Ala Lys Gly Gly Ile Lys Gly Asn Lys Leu Gln Ile Val Lys
            35                  40                  45
```

```
Tyr Asp Asp Ala Cys Asp Pro Lys Gln Ala Val Ala Val Ala Asn Lys
 50              55                  60

Val Val Asn Asp Gly Ile Lys Tyr Val Ile Gly His Leu Cys Ser Ser
 65              70                  75                  80

Ser Thr Gln Pro Ala Ser Asp Ile Tyr Glu Asp Glu Gly Ile Leu Met
                 85                  90                  95

Ile Thr Pro Ala Ala Thr Ala Pro Glu Leu Thr Ala Arg Gly Tyr Gln
                100                 105                 110

Leu Ile Leu Arg Thr Thr Gly Leu Asp Ser Asp Gln Gly Pro Thr Ala
            115                 120                 125

Ala Lys Tyr Ile Leu Glu Lys Val Lys Pro Gln Arg Ile Ala Ile Val
    130                 135                 140

His Asp Lys Gln Gln Tyr Gly Glu Gly Leu Ala Arg Ala Val Gln Asp
145                 150                 155                 160

Gly Leu Lys Lys Gly Asn Ala Asn Val Val Phe Phe Asp Gly Ile Thr
                165                 170                 175

Ala Gly Glu Lys Asp Phe Ser Thr Leu Val Ala Arg Leu Lys Lys Glu
            180                 185                 190

Asn Ile Asp Phe Val Tyr Tyr Gly Gly Tyr His Pro Glu Met Gly Gln
        195                 200                 205

Ile Leu Arg Gln Ala Arg Ala Ala Gly Leu Lys Thr Gln Phe Met Gly
    210                 215                 220

Pro Glu Gly Val Ala Asn Val Ser Leu Ser Asn Ile Ala Gly Glu Ser
225                 230                 235                 240

Ala Glu Gly Leu Leu Val Thr Lys Pro Lys Asn Tyr Asp Gln Val Pro
                245                 250                 255

Ala Asn Lys Pro Ile Val Asp Ala Ile Lys Ala Lys Lys Gln Asp Pro
            260                 265                 270

Ser Gly Ala Phe Val Trp Thr Thr Tyr Ala Ala Leu Gln Ser Leu Gln
        275                 280                 285

Ala Gly Leu Asn Gln Ser Asp Pro Ala Glu Ile Ala Lys Tyr Leu
    290                 295                 300

Lys Ala Asn Ser Val Asp Thr Val Met Gly Pro Leu Thr Trp Asp Glu
305                 310                 315                 320

Lys Gly Asp Leu Lys Tyr Asn Ser Asp Asn Val Tyr Ile Met Ala Asp
                325                 330                 335

Lys Gln Lys Asn Gly Ile Lys Ala Asn Phe Lys Ile Arg His Asn Val
            340                 345                 350

Glu Asp Gly Ser Val Gln Leu Ala Asp His Tyr Gln Gln Asn Thr Pro
        355                 360                 365

Ile Gly Asp Gly Pro Val Leu Leu Pro Asp Asn His Tyr Leu Ser Phe
    370                 375                 380

Gln Ser Val Leu Ser Lys Asp Pro Asn Glu Lys Arg Asp His Met Val
385                 390                 395                 400

Leu Leu Glu Phe Val Thr Ala Ala Gly Ile Thr Leu Gly Met Asp Glu
                405                 410                 415

Leu Tyr Asn Val Asp Gly Gly Ser Gly Gly Thr Gly Ser Lys Gly Glu
            420                 425                 430

Glu Leu Phe Thr Gly Val Val Pro Ile Leu Val Glu Leu Asp Gly Asp
        435                 440                 445

Val Asn Gly His Lys Phe Ser Val Ser Gly Glu Gly Glu Gly Asp Ala
450                 455                 460

Thr Tyr Gly Lys Leu Thr Leu Lys Leu Ile Cys Thr Thr Gly Lys Leu
```

```
           465                 470                 475                 480
       Pro Val Pro Trp Pro Thr Leu Val Thr Thr Leu Gly Tyr Gly Leu Lys
                       485                 490                 495

Cys Phe Ala Arg Tyr Pro Asp His Met Lys Gln His Asp Phe Phe Lys
                       500                 505                 510

Ser Ala Met Pro Glu Gly Tyr Val Gln Glu Arg Thr Ile Phe Phe Lys
                       515                 520                 525

Asp Asp Gly Asn Tyr Lys Thr Arg Ala Glu Val Lys Phe Glu Gly Asp
                       530                 535                 540

Thr Leu Val Asn Arg Ile Glu Leu Lys Gly Ile Gly Phe Lys Glu Asp
       545                 550                 555                 560

Gly Asn Ile Leu Gly His Lys Leu Glu Tyr Asn Gly Phe Glu Phe Gly
                       565                 570                 575

Val Phe Asp Trp His Ala Asn Gly Thr Ala Thr Asp Ala Lys
                       580                 585                 590

<210> SEQ ID NO 15
<211> LENGTH: 589
<212> TYPE: PRT
<213> ORGANISM: Artificial Sequence
<220> FEATURE:
<223> OTHER INFORMATION: LivJ325/327-cpYFP

<400> SEQUENCE: 15

Glu Asp Ile Lys Val Ala Val Val Gly Ala Met Ser Gly Pro Val Ala
1               5                   10                  15

Gln Tyr Gly Asp Gln Glu Phe Thr Gly Ala Glu Gln Ala Val Ala Asp
                20                  25                  30

Ile Asn Ala Lys Gly Gly Ile Lys Gly Asn Lys Leu Gln Ile Val Lys
            35                  40                  45

Tyr Asp Asp Ala Cys Asp Pro Lys Gln Ala Val Ala Val Ala Asn Lys
        50                  55                  60

Val Val Asn Asp Gly Ile Lys Tyr Val Ile Gly His Leu Cys Ser Ser
65                  70                  75                  80

Ser Thr Gln Pro Ala Ser Asp Ile Tyr Glu Asp Glu Gly Ile Leu Met
                85                  90                  95

Ile Thr Pro Ala Ala Thr Ala Pro Glu Leu Thr Ala Arg Gly Tyr Gln
            100                 105                 110

Leu Ile Leu Arg Thr Thr Gly Leu Asp Ser Asp Gln Gly Pro Thr Ala
        115                 120                 125

Ala Lys Tyr Ile Leu Glu Lys Val Lys Pro Gln Arg Ile Ala Ile Val
    130                 135                 140

His Asp Lys Gln Gln Tyr Gly Glu Gly Leu Ala Arg Ala Val Gln Asp
145                 150                 155                 160

Gly Leu Lys Lys Gly Asn Ala Asn Val Val Phe Asp Gly Ile Thr
                165                 170                 175

Ala Gly Glu Lys Asp Phe Ser Thr Leu Val Ala Arg Leu Lys Lys Glu
            180                 185                 190

Asn Ile Asp Phe Val Tyr Tyr Gly Gly Tyr His Pro Glu Met Gly Gln
        195                 200                 205

Ile Leu Arg Gln Ala Arg Ala Ala Gly Leu Lys Thr Gln Phe Met Gly
    210                 215                 220

Pro Glu Gly Val Ala Asn Val Ser Leu Ser Asn Ile Ala Gly Glu Ser
225                 230                 235                 240

Ala Glu Gly Leu Leu Val Thr Lys Pro Lys Asn Tyr Asp Gln Val Pro
```

```
            245                 250                 255
Ala Asn Lys Pro Ile Val Asp Ala Ile Lys Ala Lys Gln Asp Pro
            260                 265                 270

Ser Gly Ala Phe Val Trp Thr Thr Tyr Ala Ala Leu Gln Ser Leu Gln
            275                 280                 285

Ala Gly Leu Asn Gln Ser Asp Pro Ala Glu Ile Ala Lys Tyr Leu
            290                 295                 300

Lys Ala Asn Ser Val Asp Thr Val Met Gly Pro Leu Thr Trp Asp Glu
305                 310                 315                 320

Lys Gly Asp Leu Lys Tyr Asn Ser Asp Asn Val Tyr Ile Met Ala Asp
                325                 330                 335

Lys Gln Lys Asn Gly Ile Lys Ala Asn Phe Lys Ile Arg His Asn Val
            340                 345                 350

Glu Asp Gly Ser Val Gln Leu Ala Asp His Tyr Gln Gln Asn Thr Pro
            355                 360                 365

Ile Gly Asp Gly Pro Val Leu Leu Pro Asp Asn His Tyr Leu Ser Phe
            370                 375                 380

Gln Ser Val Leu Ser Lys Asp Pro Asn Glu Lys Arg Asp His Met Val
385                 390                 395                 400

Leu Leu Glu Phe Val Thr Ala Ala Gly Ile Thr Leu Gly Met Asp Glu
                405                 410                 415

Leu Tyr Asn Val Asp Gly Gly Ser Gly Gly Thr Gly Ser Lys Gly Glu
            420                 425                 430

Glu Leu Phe Thr Gly Val Val Pro Ile Leu Val Glu Leu Asp Gly Asp
            435                 440                 445

Val Asn Gly His Lys Phe Ser Val Ser Gly Glu Gly Glu Gly Asp Ala
450                 455                 460

Thr Tyr Gly Lys Leu Thr Leu Lys Leu Ile Cys Thr Thr Gly Lys Leu
465                 470                 475                 480

Pro Val Pro Trp Pro Thr Leu Val Thr Thr Leu Gly Tyr Gly Leu Lys
                485                 490                 495

Cys Phe Ala Arg Tyr Pro Asp His Met Lys Gln His Asp Phe Phe Lys
            500                 505                 510

Ser Ala Met Pro Glu Gly Tyr Val Gln Glu Arg Thr Ile Phe Phe Lys
            515                 520                 525

Asp Asp Gly Asn Tyr Lys Thr Arg Ala Glu Val Lys Phe Glu Gly Asp
            530                 535                 540

Thr Leu Val Asn Arg Ile Glu Leu Lys Gly Ile Gly Phe Lys Glu Asp
545                 550                 555                 560

Gly Asn Ile Leu Gly His Lys Leu Glu Tyr Asn Phe Glu Phe Gly Val
                565                 570                 575

Phe Asp Trp His Ala Asn Gly Thr Ala Thr Asp Ala Lys
            580                 585

<210> SEQ ID NO 16
<211> LENGTH: 588
<212> TYPE: PRT
<213> ORGANISM: Artificial Sequence
<220> FEATURE:
<223> OTHER INFORMATION: LivJ325/328-cpYFP

<400> SEQUENCE: 16

Glu Asp Ile Lys Val Ala Val Val Gly Ala Met Ser Gly Pro Val Ala
1               5                   10                  15

Gln Tyr Gly Asp Gln Glu Phe Thr Gly Ala Glu Gln Ala Val Ala Asp
```

```
                20                  25                  30
Ile Asn Ala Lys Gly Gly Ile Lys Gly Asn Lys Leu Gln Ile Val Lys
            35                  40                  45
Tyr Asp Asp Ala Cys Asp Pro Lys Gln Ala Val Ala Val Ala Asn Lys
            50                  55                  60
Val Val Asn Asp Gly Ile Lys Tyr Val Ile Gly His Leu Cys Ser Ser
 65                 70                  75                  80
Ser Thr Gln Pro Ala Ser Asp Ile Tyr Glu Asp Glu Gly Ile Leu Met
                    85                  90                  95
Ile Thr Pro Ala Ala Thr Ala Pro Glu Leu Thr Ala Arg Gly Tyr Gln
                100                 105                 110
Leu Ile Leu Arg Thr Thr Gly Leu Asp Ser Asp Gln Gly Pro Thr Ala
            115                 120                 125
Ala Lys Tyr Ile Leu Glu Lys Val Lys Pro Gln Arg Ile Ala Ile Val
            130                 135                 140
His Asp Lys Gln Gln Tyr Gly Glu Gly Leu Ala Arg Ala Val Gln Asp
145                 150                 155                 160
Gly Leu Lys Lys Gly Asn Ala Asn Val Val Phe Phe Asp Gly Ile Thr
                165                 170                 175
Ala Gly Glu Lys Asp Phe Ser Thr Leu Val Ala Arg Leu Lys Lys Glu
                180                 185                 190
Asn Ile Asp Phe Val Tyr Tyr Gly Gly Tyr His Pro Glu Met Gly Gln
                195                 200                 205
Ile Leu Arg Gln Ala Arg Ala Ala Gly Leu Lys Thr Gln Phe Met Gly
            210                 215                 220
Pro Glu Gly Val Ala Asn Val Ser Leu Ser Asn Ile Ala Gly Glu Ser
225                 230                 235                 240
Ala Glu Gly Leu Leu Val Thr Lys Pro Lys Asn Tyr Asp Gln Val Pro
                245                 250                 255
Ala Asn Lys Pro Ile Val Asp Ala Ile Lys Ala Lys Lys Gln Asp Pro
                260                 265                 270
Ser Gly Ala Phe Val Trp Thr Thr Tyr Ala Ala Leu Gln Ser Leu Gln
            275                 280                 285
Ala Gly Leu Asn Gln Ser Asp Asp Pro Ala Glu Ile Ala Lys Tyr Leu
            290                 295                 300
Lys Ala Asn Ser Val Asp Thr Val Met Gly Pro Leu Thr Trp Asp Glu
305                 310                 315                 320
Lys Gly Asp Leu Lys Tyr Asn Ser Asp Asn Val Tyr Ile Met Ala Asp
                325                 330                 335
Lys Gln Lys Asn Gly Ile Lys Ala Asn Phe Lys Ile Arg His Asn Val
            340                 345                 350
Glu Asp Gly Ser Val Gln Leu Ala Asp His Tyr Gln Gln Asn Thr Pro
            355                 360                 365
Ile Gly Asp Gly Pro Val Leu Leu Pro Asp Asn His Tyr Leu Ser Phe
            370                 375                 380
Gln Ser Val Leu Ser Lys Asp Pro Asn Glu Lys Arg Asp His Met Val
385                 390                 395                 400
Leu Leu Glu Phe Val Thr Ala Ala Gly Ile Thr Leu Gly Met Asp Glu
                405                 410                 415
Leu Tyr Asn Val Asp Gly Gly Ser Gly Gly Thr Gly Ser Lys Gly Glu
                420                 425                 430
Glu Leu Phe Thr Gly Val Val Pro Ile Leu Val Glu Leu Asp Gly Asp
            435                 440                 445
```

```
Val Asn Gly His Lys Phe Ser Val Ser Gly Glu Glu Gly Asp Ala
    450                 455                 460

Thr Tyr Gly Lys Leu Thr Leu Lys Leu Ile Cys Thr Thr Gly Lys Leu
465                 470                 475                 480

Pro Val Pro Trp Pro Thr Leu Val Thr Thr Leu Gly Tyr Gly Leu Lys
                485                 490                 495

Cys Phe Ala Arg Tyr Pro Asp His Met Lys Gln His Asp Phe Phe Lys
                500                 505                 510

Ser Ala Met Pro Glu Gly Tyr Val Gln Glu Arg Thr Ile Phe Phe Lys
            515                 520                 525

Asp Asp Gly Asn Tyr Lys Thr Arg Ala Glu Val Lys Phe Glu Gly Asp
        530                 535                 540

Thr Leu Val Asn Arg Ile Glu Leu Lys Gly Ile Gly Phe Lys Glu Asp
545                 550                 555                 560

Gly Asn Ile Leu Gly His Lys Leu Glu Tyr Asn Glu Phe Gly Val Phe
                565                 570                 575

Asp Trp His Ala Asn Gly Thr Ala Thr Asp Ala Lys
                580                 585

<210> SEQ ID NO 17
<211> LENGTH: 587
<212> TYPE: PRT
<213> ORGANISM: Artificial Sequence
<220> FEATURE:
<223> OTHER INFORMATION: LivJ325/329-cpYFP

<400> SEQUENCE: 17

Glu Asp Ile Lys Val Ala Val Val Gly Ala Met Ser Gly Pro Val Ala
1               5                   10                  15

Gln Tyr Gly Asp Gln Glu Phe Thr Gly Ala Glu Gln Ala Val Ala Asp
            20                  25                  30

Ile Asn Ala Lys Gly Gly Ile Lys Gly Asn Lys Leu Gln Ile Val Lys
        35                  40                  45

Tyr Asp Asp Ala Cys Asp Pro Lys Gln Ala Val Ala Val Ala Asn Lys
    50                  55                  60

Val Val Asn Asp Gly Ile Lys Tyr Val Ile Gly His Leu Cys Ser Ser
65                  70                  75                  80

Ser Thr Gln Pro Ala Ser Asp Ile Tyr Glu Asp Glu Gly Ile Leu Met
                85                  90                  95

Ile Thr Pro Ala Ala Thr Ala Pro Glu Leu Thr Ala Arg Gly Tyr Gln
            100                 105                 110

Leu Ile Leu Arg Thr Thr Gly Leu Asp Ser Asp Gln Gly Pro Thr Ala
        115                 120                 125

Ala Lys Tyr Ile Leu Glu Lys Val Lys Pro Gln Arg Ile Ala Ile Val
    130                 135                 140

His Asp Lys Gln Gln Tyr Gly Glu Gly Leu Ala Arg Ala Val Gln Asp
145                 150                 155                 160

Gly Leu Lys Lys Gly Asn Ala Asn Val Val Phe Phe Asp Gly Ile Thr
                165                 170                 175

Ala Gly Glu Lys Asp Phe Ser Thr Leu Val Ala Arg Leu Lys Lys Glu
            180                 185                 190

Asn Ile Asp Phe Val Tyr Tyr Gly Gly Tyr His Pro Glu Met Gly Gln
        195                 200                 205

Ile Leu Arg Gln Ala Arg Ala Ala Gly Leu Lys Thr Gln Phe Met Gly
    210                 215                 220
```

Pro Glu Gly Val Ala Asn Val Ser Leu Ser Asn Ile Ala Gly Glu Ser
225                 230                 235                 240

Ala Glu Gly Leu Leu Val Thr Lys Pro Lys Asn Tyr Asp Gln Val Pro
            245                 250                 255

Ala Asn Lys Pro Ile Val Asp Ala Ile Lys Ala Lys Gln Asp Pro
        260                 265                 270

Ser Gly Ala Phe Val Trp Thr Thr Tyr Ala Ala Leu Gln Ser Leu Gln
        275                 280                 285

Ala Gly Leu Asn Gln Ser Asp Asp Pro Ala Glu Ile Ala Lys Tyr Leu
        290                 295                 300

Lys Ala Asn Ser Val Asp Thr Val Met Gly Pro Leu Thr Trp Asp Glu
305                 310                 315                 320

Lys Gly Asp Leu Lys Tyr Asn Ser Asp Asn Val Tyr Ile Met Ala Asp
            325                 330                 335

Lys Gln Lys Asn Gly Ile Lys Ala Asn Phe Lys Ile Arg His Asn Val
        340                 345                 350

Glu Asp Gly Ser Val Gln Leu Ala Asp His Tyr Gln Gln Asn Thr Pro
        355                 360                 365

Ile Gly Asp Gly Pro Val Leu Leu Pro Asp Asn His Tyr Leu Ser Phe
370                 375                 380

Gln Ser Val Leu Ser Lys Asp Pro Asn Glu Lys Arg Asp His Met Val
385                 390                 395                 400

Leu Leu Glu Phe Val Thr Ala Ala Gly Ile Thr Leu Gly Met Asp Glu
            405                 410                 415

Leu Tyr Asn Val Asp Gly Gly Ser Gly Thr Gly Ser Lys Gly Glu
        420                 425                 430

Glu Leu Phe Thr Gly Val Val Pro Ile Leu Val Glu Leu Asp Gly Asp
        435                 440                 445

Val Asn Gly His Lys Phe Ser Val Ser Gly Glu Gly Glu Gly Asp Ala
450                 455                 460

Thr Tyr Gly Lys Leu Thr Leu Lys Leu Ile Cys Thr Thr Gly Lys Leu
465                 470                 475                 480

Pro Val Pro Trp Pro Thr Leu Val Thr Thr Leu Gly Tyr Gly Leu Lys
            485                 490                 495

Cys Phe Ala Arg Tyr Pro Asp His Met Lys Gln His Asp Phe Phe Lys
        500                 505                 510

Ser Ala Met Pro Glu Gly Tyr Val Gln Glu Arg Thr Ile Phe Phe Lys
        515                 520                 525

Asp Asp Gly Asn Tyr Lys Thr Arg Ala Glu Val Lys Phe Glu Gly Asp
        530                 535                 540

Thr Leu Val Asn Arg Ile Glu Leu Lys Gly Ile Gly Phe Lys Glu Asp
545                 550                 555                 560

Gly Asn Ile Leu Gly His Lys Leu Glu Tyr Asn Phe Gly Val Phe Asp
            565                 570                 575

Trp His Ala Asn Gly Thr Ala Thr Asp Ala Lys
            580                 585

<210> SEQ ID NO 18
<211> LENGTH: 591
<212> TYPE: PRT
<213> ORGANISM: Artificial Sequence
<220> FEATURE:
<223> OTHER INFORMATION: LivJ326/327-cpYFP

<400> SEQUENCE: 18

```
Met Glu Asp Ile Lys Val Ala Val Val Gly Ala Met Ser Gly Pro Val
1               5                   10                  15

Ala Gln Tyr Gly Asp Gln Glu Phe Thr Gly Ala Glu Gln Ala Val Ala
            20                  25                  30

Asp Ile Asn Ala Lys Gly Gly Ile Lys Gly Asn Lys Leu Gln Ile Val
            35                  40                  45

Lys Tyr Asp Asp Ala Cys Asp Pro Lys Gln Ala Val Ala Val Ala Asn
50                      55                  60

Lys Val Val Asn Asp Gly Ile Lys Tyr Val Ile Gly His Leu Cys Ser
65                      70                  75                  80

Ser Ser Thr Gln Pro Ala Ser Asp Ile Tyr Glu Asp Glu Gly Ile Leu
                85                  90                  95

Met Ile Thr Pro Ala Ala Thr Ala Pro Glu Leu Thr Ala Arg Gly Tyr
                100                 105                 110

Gln Leu Ile Leu Arg Thr Thr Gly Leu Asp Ser Asp Gln Gly Pro Thr
            115                 120                 125

Ala Ala Lys Tyr Ile Leu Glu Lys Val Lys Pro Gln Arg Ile Ala Ile
            130                 135                 140

Val His Asp Lys Gln Gln Tyr Gly Glu Gly Leu Ala Arg Ala Val Gln
145                 150                 155                 160

Asp Gly Leu Lys Lys Gly Asn Ala Asn Val Val Phe Phe Asp Gly Ile
                165                 170                 175

Thr Ala Gly Glu Lys Asp Phe Ser Thr Leu Val Ala Arg Leu Lys Lys
                180                 185                 190

Glu Asn Ile Asp Phe Val Tyr Tyr Gly Gly Tyr His Pro Glu Met Gly
            195                 200                 205

Gln Ile Leu Arg Gln Ala Arg Ala Ala Gly Leu Lys Thr Gln Phe Met
    210                 215                 220

Gly Pro Glu Gly Val Ala Asn Val Ser Leu Ser Asn Ile Ala Gly Glu
225                 230                 235                 240

Ser Ala Glu Gly Leu Leu Val Thr Lys Pro Lys Asn Tyr Asp Gln Val
                245                 250                 255

Pro Ala Asn Lys Pro Ile Val Asp Ala Ile Lys Ala Lys Lys Gln Asp
            260                 265                 270

Pro Ser Gly Ala Phe Val Trp Thr Thr Tyr Ala Ala Leu Gln Ser Leu
            275                 280                 285

Gln Ala Gly Leu Asn Gln Ser Asp Asp Pro Ala Glu Ile Ala Lys Tyr
    290                 295                 300

Leu Lys Ala Asn Ser Val Asp Thr Val Met Gly Pro Leu Thr Trp Asp
305                 310                 315                 320

Glu Lys Gly Asp Leu Lys Gly Tyr Asn Ser Asp Asn Val Tyr Ile Met
            325                 330                 335

Ala Asp Lys Gln Lys Asn Gly Ile Lys Ala Asn Phe Lys Ile Arg His
            340                 345                 350

Asn Val Glu Asp Gly Ser Val Gln Leu Ala Asp His Tyr Gln Gln Asn
            355                 360                 365

Thr Pro Ile Gly Asp Gly Pro Val Leu Leu Pro Asp Asn His Tyr Leu
    370                 375                 380

Ser Phe Gln Ser Val Leu Ser Lys Asp Pro Asn Glu Lys Arg Asp His
385                 390                 395                 400

Met Val Leu Leu Glu Phe Val Thr Ala Ala Gly Ile Thr Leu Gly Met
                405                 410                 415
```

Asp Glu Leu Tyr Asn Val Asp Gly Ser Gly Thr Gly Ser Lys
        420                 425                 430

Gly Glu Glu Leu Phe Thr Gly Val Val Pro Ile Leu Val Glu Leu Asp
            435                 440                 445

Gly Asp Val Asn Gly His Lys Phe Ser Val Ser Gly Glu Gly Glu Gly
450                 455                 460

Asp Ala Thr Tyr Gly Lys Leu Thr Leu Lys Leu Ile Cys Thr Thr Gly
465                 470                 475                 480

Lys Leu Pro Val Pro Trp Pro Thr Leu Val Thr Thr Leu Gly Tyr Gly
                485                 490                 495

Leu Lys Cys Phe Ala Arg Tyr Pro Asp His Met Lys Gln His Asp Phe
            500                 505                 510

Phe Lys Ser Ala Met Pro Glu Gly Tyr Val Gln Glu Arg Thr Ile Phe
        515                 520                 525

Phe Lys Asp Asp Gly Asn Tyr Lys Thr Arg Ala Glu Val Lys Phe Glu
    530                 535                 540

Gly Asp Thr Leu Val Asn Arg Ile Glu Leu Lys Gly Ile Gly Phe Lys
545                 550                 555                 560

Glu Asp Gly Asn Ile Leu Gly His Lys Leu Glu Tyr Asn Phe Glu Phe
                565                 570                 575

Gly Val Phe Asp Trp His Ala Asn Gly Thr Ala Thr Asp Ala Lys
            580                 585                 590

<210> SEQ ID NO 19
<211> LENGTH: 589
<212> TYPE: PRT
<213> ORGANISM: Artificial Sequence
<220> FEATURE:
<223> OTHER INFORMATION: LivJ326/328-cpYFP

<400> SEQUENCE: 19

Glu Asp Ile Lys Val Ala Val Val Gly Ala Met Ser Gly Pro Val Ala
1               5                   10                  15

Gln Tyr Gly Asp Gln Glu Phe Thr Gly Ala Glu Gln Ala Val Ala Asp
            20                  25                  30

Ile Asn Ala Lys Gly Gly Ile Lys Gly Asn Lys Leu Gln Ile Val Lys
        35                  40                  45

Tyr Asp Asp Ala Cys Asp Pro Lys Gln Ala Val Ala Val Ala Asn Lys
50                  55                  60

Val Val Asn Asp Gly Ile Lys Tyr Val Ile Gly His Leu Cys Ser Ser
65                  70                  75                  80

Ser Thr Gln Pro Ala Ser Asp Ile Tyr Glu Asp Glu Gly Ile Leu Met
                85                  90                  95

Ile Thr Pro Ala Ala Thr Ala Pro Glu Leu Thr Ala Arg Gly Tyr Gln
            100                 105                 110

Leu Ile Leu Arg Thr Thr Gly Leu Asp Ser Asp Gln Gly Pro Thr Ala
        115                 120                 125

Ala Lys Tyr Ile Leu Glu Lys Val Lys Pro Gln Arg Ile Ala Ile Val
    130                 135                 140

His Asp Lys Gln Gln Tyr Gly Glu Gly Leu Ala Arg Ala Val Gln Asp
145                 150                 155                 160

Gly Leu Lys Lys Gly Asn Ala Asn Val Val Phe Phe Asp Gly Ile Thr
                165                 170                 175

Ala Gly Glu Lys Asp Phe Ser Thr Leu Val Ala Arg Leu Lys Lys Glu
            180                 185                 190

Asn Ile Asp Phe Val Tyr Tyr Gly Gly Tyr His Pro Glu Met Gly Gln
            195                 200                 205

Ile Leu Arg Gln Ala Arg Ala Ala Gly Leu Lys Thr Gln Phe Met Gly
210                 215                 220

Pro Glu Gly Val Ala Asn Val Ser Leu Ser Asn Ile Ala Gly Glu Ser
225                 230                 235                 240

Ala Glu Gly Leu Leu Val Thr Lys Pro Lys Asn Tyr Asp Gln Val Pro
            245                 250                 255

Ala Asn Lys Pro Ile Val Asp Ala Lys Ala Lys Lys Gln Asp Pro
            260                 265                 270

Ser Gly Ala Phe Val Trp Thr Thr Tyr Ala Ala Leu Gln Ser Leu Gln
            275                 280                 285

Ala Gly Leu Asn Gln Ser Asp Asp Pro Ala Glu Ile Ala Lys Tyr Leu
            290                 295                 300

Lys Ala Asn Ser Val Asp Thr Val Met Gly Pro Leu Thr Trp Asp Glu
305                 310                 315                 320

Lys Gly Asp Leu Lys Gly Tyr Asn Ser Asp Asn Val Tyr Ile Met Ala
            325                 330                 335

Asp Lys Gln Lys Asn Gly Ile Lys Ala Asn Phe Lys Ile Arg His Asn
            340                 345                 350

Val Glu Asp Gly Ser Val Gln Leu Ala Asp His Tyr Gln Gln Asn Thr
            355                 360                 365

Pro Ile Gly Asp Gly Pro Val Leu Leu Pro Asp Asn His Tyr Leu Ser
            370                 375                 380

Phe Gln Ser Val Leu Ser Lys Asp Pro Asn Glu Lys Arg Asp His Met
385                 390                 395                 400

Val Leu Leu Glu Phe Val Thr Ala Ala Gly Ile Thr Leu Gly Met Asp
            405                 410                 415

Glu Leu Tyr Asn Val Asp Gly Gly Ser Gly Gly Thr Gly Ser Lys Gly
            420                 425                 430

Glu Glu Leu Phe Thr Gly Val Val Pro Ile Leu Val Glu Leu Asp Gly
            435                 440                 445

Asp Val Asn Gly His Lys Phe Ser Val Ser Gly Glu Gly Glu Gly Asp
450                 455                 460

Ala Thr Tyr Gly Lys Leu Thr Leu Lys Leu Ile Cys Thr Thr Gly Lys
465                 470                 475                 480

Leu Pro Val Pro Trp Pro Thr Leu Val Thr Thr Leu Gly Tyr Gly Leu
            485                 490                 495

Lys Cys Phe Ala Arg Tyr Pro Asp His Met Lys Gln His Asp Phe Phe
            500                 505                 510

Lys Ser Ala Met Pro Glu Gly Tyr Val Gln Glu Arg Thr Ile Phe Phe
            515                 520                 525

Lys Asp Asp Gly Asn Tyr Lys Thr Arg Ala Glu Val Lys Phe Glu Gly
            530                 535                 540

Asp Thr Leu Val Asn Arg Ile Glu Leu Lys Gly Ile Gly Phe Lys Glu
545                 550                 555                 560

Asp Gly Asn Ile Leu Gly His Lys Leu Glu Tyr Asn Glu Phe Gly Val
            565                 570                 575

Phe Asp Trp His Ala Asn Gly Thr Ala Thr Asp Ala Lys
            580                 585

<210> SEQ ID NO 20
<211> LENGTH: 588
<212> TYPE: PRT

<213> ORGANISM: Artificial Sequence
<220> FEATURE:
<223> OTHER INFORMATION: LivJ326/329-cpYFP

<400> SEQUENCE: 20

```
Glu Asp Ile Lys Val Ala Val Gly Ala Met Ser Gly Pro Val Ala
1               5                   10                  15

Gln Tyr Gly Asp Gln Glu Phe Thr Gly Ala Glu Gln Ala Val Ala Asp
                20                  25                  30

Ile Asn Ala Lys Gly Gly Ile Lys Gly Asn Lys Leu Gln Ile Val Lys
                35                  40                  45

Tyr Asp Asp Ala Cys Asp Pro Lys Gln Ala Val Ala Val Ala Asn Lys
50                      55                  60

Val Val Asn Asp Gly Ile Lys Tyr Val Ile Gly His Leu Cys Ser Ser
65                  70                  75                  80

Ser Thr Gln Pro Ala Ser Asp Ile Tyr Glu Asp Glu Gly Ile Leu Met
                85                  90                  95

Ile Thr Pro Ala Ala Thr Ala Pro Glu Leu Thr Ala Arg Gly Tyr Gln
                100                 105                 110

Leu Ile Leu Arg Thr Thr Gly Leu Asp Ser Asp Gln Gly Pro Thr Ala
                115                 120                 125

Ala Lys Tyr Ile Leu Glu Lys Val Lys Pro Gln Arg Ile Ala Ile Val
                130                 135                 140

His Asp Lys Gln Gln Tyr Gly Glu Gly Leu Ala Arg Ala Val Gln Asp
145                 150                 155                 160

Gly Leu Lys Lys Gly Asn Ala Asn Val Val Phe Phe Asp Gly Ile Thr
                165                 170                 175

Ala Gly Glu Lys Asp Phe Ser Thr Leu Val Ala Arg Leu Lys Lys Glu
                180                 185                 190

Asn Ile Asp Phe Val Tyr Tyr Gly Gly Tyr His Pro Glu Met Gly Gln
                195                 200                 205

Ile Leu Arg Gln Ala Arg Ala Ala Gly Leu Lys Thr Gln Phe Met Gly
                210                 215                 220

Pro Glu Gly Val Ala Asn Val Ser Leu Ser Asn Ile Ala Gly Glu Ser
225                 230                 235                 240

Ala Glu Gly Leu Leu Val Thr Lys Pro Lys Asn Tyr Asp Gln Val Pro
                245                 250                 255

Ala Asn Lys Pro Ile Val Asp Ala Ile Lys Ala Lys Lys Gln Asp Pro
                260                 265                 270

Ser Gly Ala Phe Val Trp Thr Thr Tyr Ala Ala Leu Gln Ser Leu Gln
                275                 280                 285

Ala Gly Leu Asn Gln Ser Asp Asp Pro Ala Glu Ile Ala Lys Tyr Leu
                290                 295                 300

Lys Ala Asn Ser Val Asp Thr Val Met Gly Pro Leu Thr Trp Asp Glu
305                 310                 315                 320

Lys Gly Asp Leu Lys Gly Tyr Asn Ser Asp Val Tyr Ile Met Ala
                325                 330                 335

Asp Lys Gln Lys Asn Gly Ile Lys Ala Asn Phe Lys Ile Arg His Asn
                340                 345                 350

Val Glu Asp Gly Ser Val Gln Leu Ala Asp His Tyr Gln Gln Asn Thr
                355                 360                 365

Pro Ile Gly Asp Gly Pro Val Leu Leu Pro Asp Asn His Tyr Leu Ser
                370                 375                 380

Phe Gln Ser Val Leu Ser Lys Asp Pro Asn Glu Lys Arg Asp His Met
```

```
                385                 390                 395                 400
Val Leu Leu Glu Phe Val Thr Ala Ala Gly Ile Thr Leu Gly Met Asp
                    405                 410                 415

Glu Leu Tyr Asn Val Asp Gly Gly Ser Gly Gly Thr Gly Ser Lys Gly
                    420                 425                 430

Glu Glu Leu Phe Thr Gly Val Val Pro Ile Leu Val Glu Leu Asp Gly
                    435                 440                 445

Asp Val Asn Gly His Lys Phe Ser Val Ser Gly Glu Gly Glu Gly Asp
            450                 455                 460

Ala Thr Tyr Gly Lys Leu Thr Leu Lys Leu Ile Cys Thr Thr Gly Lys
465                 470                 475                 480

Leu Pro Val Pro Trp Pro Thr Leu Val Thr Thr Leu Gly Tyr Gly Leu
                    485                 490                 495

Lys Cys Phe Ala Arg Tyr Pro Asp His Met Lys Gln His Asp Phe Phe
                500                 505                 510

Lys Ser Ala Met Pro Glu Gly Tyr Val Gln Glu Arg Thr Ile Phe Phe
                515                 520                 525

Lys Asp Asp Gly Asn Tyr Lys Thr Arg Ala Glu Val Lys Phe Glu Gly
                530                 535                 540

Asp Thr Leu Val Asn Arg Ile Glu Leu Lys Gly Ile Gly Phe Lys Glu
545                 550                 555                 560

Asp Gly Asn Ile Leu Gly His Lys Leu Glu Tyr Asn Phe Gly Val Phe
                    565                 570                 575

Asp Trp His Ala Asn Gly Thr Ala Thr Asp Ala Lys
                580                 585

<210> SEQ ID NO 21
<211> LENGTH: 591
<212> TYPE: PRT
<213> ORGANISM: Artificial Sequence
<220> FEATURE:
<223> OTHER INFORMATION: LivJ327/328-cpYFP

<400> SEQUENCE: 21

Met Glu Asp Ile Lys Val Ala Val Val Gly Ala Met Ser Gly Pro Val
1               5                   10                  15

Ala Gln Tyr Gly Asp Gln Glu Phe Thr Gly Ala Glu Gln Ala Val Ala
                20                  25                  30

Asp Ile Asn Ala Lys Gly Gly Ile Lys Gly Asn Lys Leu Gln Ile Val
            35                  40                  45

Lys Tyr Asp Asp Ala Cys Asp Pro Lys Gln Ala Val Ala Val Ala Asn
50                  55                  60

Lys Val Val Asn Asp Gly Ile Lys Tyr Val Ile Gly His Leu Cys Ser
65                  70                  75                  80

Ser Ser Thr Gln Pro Ala Ser Asp Ile Tyr Glu Asp Glu Gly Ile Leu
                85                  90                  95

Met Ile Thr Pro Ala Ala Thr Ala Pro Glu Leu Thr Ala Arg Gly Tyr
                100                 105                 110

Gln Leu Ile Leu Arg Thr Thr Gly Leu Asp Ser Asp Gln Gly Pro Thr
                115                 120                 125

Ala Ala Lys Tyr Ile Leu Glu Lys Val Lys Pro Gln Arg Ile Ala Ile
                130                 135                 140

Val His Asp Lys Gln Gln Tyr Gly Glu Gly Leu Ala Arg Ala Val Gln
145                 150                 155                 160

Asp Gly Leu Lys Lys Gly Asn Ala Asn Val Val Phe Phe Asp Gly Ile
```

```
            165                 170                 175
Thr Ala Gly Glu Lys Asp Phe Ser Thr Leu Val Ala Arg Leu Lys Lys
            180                 185                 190
Glu Asn Ile Asp Phe Val Tyr Tyr Gly Gly Tyr His Pro Glu Met Gly
            195                 200                 205
Gln Ile Leu Arg Gln Ala Arg Ala Gly Leu Lys Thr Gln Phe Met
            210                 215                 220
Gly Pro Glu Gly Val Ala Asn Val Ser Leu Ser Asn Ile Ala Gly Glu
225                 230                 235                 240
Ser Ala Glu Gly Leu Leu Val Thr Lys Pro Lys Asn Tyr Asp Gln Val
            245                 250                 255
Pro Ala Asn Lys Pro Ile Val Asp Ala Ile Lys Ala Lys Lys Gln Asp
            260                 265                 270
Pro Ser Gly Ala Phe Val Trp Thr Thr Tyr Ala Ala Leu Gln Ser Leu
            275                 280                 285
Gln Ala Gly Leu Asn Gln Ser Asp Asp Pro Ala Glu Ile Ala Lys Tyr
            290                 295                 300
Leu Lys Ala Asn Ser Val Asp Thr Val Met Gly Pro Leu Thr Trp Asp
305                 310                 315                 320
Glu Lys Gly Asp Leu Lys Gly Phe Tyr Asn Ser Asp Asn Val Tyr Ile
            325                 330                 335
Met Ala Asp Lys Gln Lys Asn Gly Ile Lys Ala Asn Phe Lys Ile Arg
            340                 345                 350
His Asn Val Glu Asp Gly Ser Val Gln Leu Ala Asp His Tyr Gln Gln
            355                 360                 365
Asn Thr Pro Ile Gly Asp Gly Pro Val Leu Leu Pro Asp Asn His Tyr
            370                 375                 380
Leu Ser Phe Gln Ser Val Leu Ser Lys Asp Pro Asn Glu Lys Arg Asp
385                 390                 395                 400
His Met Val Leu Leu Glu Phe Val Thr Ala Ala Gly Ile Thr Leu Gly
            405                 410                 415
Met Asp Glu Leu Tyr Asn Val Asp Gly Gly Ser Gly Gly Thr Gly Ser
            420                 425                 430
Lys Gly Glu Glu Leu Phe Thr Gly Val Val Pro Ile Leu Val Glu Leu
            435                 440                 445
Asp Gly Asp Val Asn Gly His Lys Phe Ser Val Ser Gly Glu Gly Glu
            450                 455                 460
Gly Asp Ala Thr Tyr Gly Lys Leu Thr Leu Lys Leu Ile Cys Thr Thr
465                 470                 475                 480
Gly Lys Leu Pro Val Pro Trp Pro Thr Leu Val Thr Thr Leu Gly Tyr
            485                 490                 495
Gly Leu Lys Cys Phe Ala Arg Tyr Pro Asp His Met Lys Gln His Asp
            500                 505                 510
Phe Phe Lys Ser Ala Met Pro Glu Gly Tyr Val Gln Glu Arg Thr Ile
            515                 520                 525
Phe Phe Lys Asp Asp Gly Asn Tyr Lys Thr Arg Ala Glu Val Lys Phe
            530                 535                 540
Glu Gly Asp Thr Leu Val Asn Arg Ile Glu Leu Lys Gly Ile Gly Phe
545                 550                 555                 560
Lys Glu Asp Gly Asn Ile Leu Gly His Lys Leu Glu Tyr Asn Glu Phe
            565                 570                 575
Gly Val Phe Asp Trp His Ala Asn Gly Thr Ala Thr Asp Ala Lys
            580                 585                 590
```

<210> SEQ ID NO 22
<211> LENGTH: 589
<212> TYPE: PRT
<213> ORGANISM: Artificial Sequence
<220> FEATURE:
<223> OTHER INFORMATION: LivJ327/329-cpYFP

<400> SEQUENCE: 22

```
Glu Asp Ile Lys Val Ala Val Val Gly Ala Met Ser Gly Pro Val Ala
1               5                   10                  15

Gln Tyr Gly Asp Gln Glu Phe Thr Gly Ala Glu Gln Ala Val Ala Asp
            20                  25                  30

Ile Asn Ala Lys Gly Gly Ile Lys Gly Asn Lys Leu Gln Ile Val Lys
        35                  40                  45

Tyr Asp Asp Ala Cys Asp Pro Lys Gln Ala Val Ala Val Ala Asn Lys
    50                  55                  60

Val Val Asn Asp Gly Ile Lys Tyr Val Ile Gly His Leu Cys Ser Ser
65                  70                  75                  80

Ser Thr Gln Pro Ala Ser Asp Ile Tyr Glu Asp Glu Gly Ile Leu Met
                85                  90                  95

Ile Thr Pro Ala Ala Thr Ala Pro Glu Leu Thr Ala Arg Gly Tyr Gln
            100                 105                 110

Leu Ile Leu Arg Thr Thr Gly Leu Asp Ser Asp Gln Gly Pro Thr Ala
        115                 120                 125

Ala Lys Tyr Ile Leu Glu Lys Val Lys Pro Gln Arg Ile Ala Ile Val
    130                 135                 140

His Asp Lys Gln Gln Tyr Gly Glu Gly Leu Ala Arg Ala Val Gln Asp
145                 150                 155                 160

Gly Leu Lys Lys Gly Asn Ala Asn Val Val Phe Phe Asp Gly Ile Thr
                165                 170                 175

Ala Gly Glu Lys Asp Phe Ser Thr Leu Val Ala Arg Leu Lys Lys Glu
            180                 185                 190

Asn Ile Asp Phe Val Tyr Tyr Gly Gly Tyr His Pro Glu Met Gly Gln
        195                 200                 205

Ile Leu Arg Gln Ala Arg Ala Ala Gly Leu Lys Thr Gln Phe Met Gly
    210                 215                 220

Pro Glu Gly Val Ala Asn Val Ser Leu Ser Asn Ile Ala Gly Glu Ser
225                 230                 235                 240

Ala Glu Gly Leu Leu Val Thr Lys Pro Lys Asn Tyr Asp Gln Val Pro
                245                 250                 255

Ala Asn Lys Pro Ile Val Asp Ala Ile Lys Ala Lys Lys Gln Asp Pro
            260                 265                 270

Ser Gly Ala Phe Val Trp Thr Thr Tyr Ala Ala Leu Gln Ser Leu Gln
        275                 280                 285

Ala Gly Leu Asn Gln Ser Asp Asp Pro Ala Glu Ile Ala Lys Tyr Leu
    290                 295                 300

Lys Ala Asn Ser Val Asp Thr Val Met Gly Pro Leu Thr Trp Asp Glu
305                 310                 315                 320

Lys Gly Asp Leu Lys Gly Phe Tyr Asn Ser Asp Asn Val Tyr Ile Met
                325                 330                 335

Ala Asp Lys Gln Lys Asn Gly Ile Lys Ala Asn Phe Lys Ile Arg His
            340                 345                 350

Asn Val Glu Asp Gly Ser Val Gln Leu Ala Asp His Tyr Gln Gln Asn
        355                 360                 365
```

```
Thr Pro Ile Gly Asp Gly Pro Val Leu Leu Pro Asp Asn His Tyr Leu
    370             375                 380

Ser Phe Gln Ser Val Leu Ser Lys Asp Pro Asn Glu Lys Arg Asp His
385                 390                 395                 400

Met Val Leu Leu Glu Phe Val Thr Ala Ala Gly Ile Thr Leu Gly Met
                405                 410                 415

Asp Glu Leu Tyr Asn Val Asp Gly Ser Gly Gly Thr Gly Ser Lys
                420                 425                 430

Gly Glu Glu Leu Phe Thr Gly Val Val Pro Ile Leu Val Glu Leu Asp
            435                 440                 445

Gly Asp Val Asn Gly His Lys Phe Ser Val Ser Gly Glu Gly Glu Gly
        450                 455                 460

Asp Ala Thr Tyr Gly Lys Leu Thr Leu Lys Leu Ile Cys Thr Thr Gly
465                 470                 475                 480

Lys Leu Pro Val Pro Trp Pro Thr Leu Val Thr Thr Leu Gly Tyr Gly
                485                 490                 495

Leu Lys Cys Phe Ala Arg Tyr Pro Asp His Met Lys Gln His Asp Phe
            500                 505                 510

Phe Lys Ser Ala Met Pro Glu Gly Tyr Val Gln Glu Arg Thr Ile Phe
        515                 520                 525

Phe Lys Asp Asp Gly Asn Tyr Lys Thr Arg Ala Glu Val Lys Phe Glu
    530                 535                 540

Gly Asp Thr Leu Val Asn Arg Ile Glu Leu Lys Gly Ile Gly Phe Lys
545                 550                 555                 560

Glu Asp Gly Asn Ile Leu Gly His Lys Leu Glu Tyr Asn Phe Gly Val
                565                 570                 575

Phe Asp Trp His Ala Asn Gly Thr Ala Thr Asp Ala Lys
            580                 585

<210> SEQ ID NO 23
<211> LENGTH: 590
<212> TYPE: PRT
<213> ORGANISM: Artificial Sequence
<220> FEATURE:
<223> OTHER INFORMATION: LivJ328/329-cpYFP

<400> SEQUENCE: 23

Glu Asp Ile Lys Val Ala Val Val Gly Ala Met Ser Gly Pro Val Ala
1               5                   10                  15

Gln Tyr Gly Asp Gln Glu Phe Thr Gly Ala Glu Gln Ala Val Ala Asp
                20                  25                  30

Ile Asn Ala Lys Gly Gly Ile Lys Gly Asn Lys Leu Gln Ile Val Lys
            35                  40                  45

Tyr Asp Asp Ala Cys Asp Pro Lys Gln Ala Val Ala Val Ala Asn Lys
50                  55                  60

Val Val Asn Asp Gly Ile Lys Tyr Val Ile Gly His Leu Cys Ser Ser
65                  70                  75                  80

Ser Thr Gln Pro Ala Ser Asp Ile Tyr Glu Asp Glu Gly Ile Leu Met
                85                  90                  95

Ile Thr Pro Ala Ala Thr Ala Pro Glu Leu Thr Ala Arg Gly Tyr Gln
                100                 105                 110

Leu Ile Leu Arg Thr Thr Gly Leu Asp Ser Asp Gln Gly Pro Thr Ala
            115                 120                 125

Ala Lys Tyr Ile Leu Glu Lys Val Lys Pro Gln Arg Ile Ala Ile Val
        130                 135                 140
```

```
His Asp Lys Gln Gln Tyr Gly Glu Gly Leu Ala Arg Ala Val Gln Asp
145                 150                 155                 160

Gly Leu Lys Lys Gly Asn Ala Asn Val Val Phe Phe Asp Gly Ile Thr
            165                 170                 175

Ala Gly Glu Lys Asp Phe Ser Thr Leu Val Ala Arg Leu Lys Lys Glu
        180                 185                 190

Asn Ile Asp Phe Val Tyr Tyr Gly Gly Tyr His Pro Glu Met Gly Gln
    195                 200                 205

Ile Leu Arg Gln Ala Arg Ala Ala Gly Leu Lys Thr Gln Phe Met Gly
210                 215                 220

Pro Glu Gly Val Ala Asn Val Ser Leu Ser Asn Ile Ala Gly Glu Ser
225                 230                 235                 240

Ala Glu Gly Leu Leu Val Thr Lys Pro Lys Asn Tyr Asp Gln Val Pro
            245                 250                 255

Ala Asn Lys Pro Ile Val Asp Ala Ile Lys Ala Lys Lys Gln Asp Pro
        260                 265                 270

Ser Gly Ala Phe Val Trp Thr Thr Tyr Ala Ala Leu Gln Ser Leu Gln
    275                 280                 285

Ala Gly Leu Asn Gln Ser Asp Asp Pro Ala Glu Ile Ala Lys Tyr Leu
290                 295                 300

Lys Ala Asn Ser Val Asp Thr Val Met Gly Pro Leu Thr Trp Asp Glu
305                 310                 315                 320

Lys Gly Asp Leu Lys Gly Phe Glu Tyr Asn Ser Asp Asn Val Tyr Ile
            325                 330                 335

Met Ala Asp Lys Gln Lys Asn Gly Ile Lys Ala Asn Phe Lys Ile Arg
        340                 345                 350

His Asn Val Glu Asp Gly Ser Val Gln Leu Ala Asp His Tyr Gln Gln
    355                 360                 365

Asn Thr Pro Ile Gly Asp Gly Pro Val Leu Leu Pro Asp Asn His Tyr
370                 375                 380

Leu Ser Phe Gln Ser Val Leu Ser Lys Asp Pro Asn Glu Lys Arg Asp
385                 390                 395                 400

His Met Val Leu Leu Glu Phe Val Thr Ala Ala Gly Ile Thr Leu Gly
            405                 410                 415

Met Asp Glu Leu Tyr Asn Val Asp Gly Gly Ser Gly Gly Thr Gly Ser
        420                 425                 430

Lys Gly Glu Glu Leu Phe Thr Gly Val Val Pro Ile Leu Val Glu Leu
    435                 440                 445

Asp Gly Asp Val Asn Gly His Lys Phe Ser Val Ser Gly Glu Gly Glu
450                 455                 460

Gly Asp Ala Thr Tyr Gly Lys Leu Thr Leu Lys Leu Ile Cys Thr Thr
465                 470                 475                 480

Gly Lys Leu Pro Val Pro Trp Pro Thr Leu Val Thr Thr Leu Gly Tyr
            485                 490                 495

Gly Leu Lys Cys Phe Ala Arg Tyr Pro Asp His Met Lys Gln His Asp
        500                 505                 510

Phe Phe Lys Ser Ala Met Pro Glu Gly Tyr Val Gln Glu Arg Thr Ile
    515                 520                 525

Phe Phe Lys Asp Asp Gly Asn Tyr Lys Thr Arg Ala Glu Val Lys Phe
        530                 535                 540

Glu Gly Asp Thr Leu Val Asn Arg Ile Glu Leu Lys Gly Ile Gly Phe
545                 550                 555                 560
```

```
Lys Glu Asp Gly Asn Ile Leu Gly His Lys Leu Glu Tyr Asn Phe Gly
                565                 570                 575
Val Phe Asp Trp His Ala Asn Gly Thr Ala Thr Asp Ala Lys
            580                 585                 590

<210> SEQ ID NO 24
<211> LENGTH: 593
<212> TYPE: PRT
<213> ORGANISM: Artificial Sequence
<220> FEATURE:
<223> OTHER INFORMATION: LivK 327/328-cpYFP

<400> SEQUENCE: 24

Met Asp Asp Ile Lys Val Ala Val Val Gly Ala Met Ser Gly Pro Ile
1               5                   10                  15
Ala Gln Trp Gly Asp Met Glu Phe Asn Gly Ala Arg Gln Ala Ile Lys
            20                  25                  30
Asp Ile Asn Ala Lys Gly Gly Ile Lys Gly Asp Lys Leu Val Gly Val
        35                  40                  45
Glu Tyr Asp Asp Ala Cys Asp Pro Lys Gln Ala Val Ala Val Ala Asn
    50                  55                  60
Lys Ile Val Asn Asp Gly Ile Lys Tyr Val Ile Gly His Leu Cys Ser
65                  70                  75                  80
Ser Ser Thr Gln Pro Ala Ser Asp Ile Tyr Glu Asp Glu Gly Ile Leu
                85                  90                  95
Met Ile Ser Pro Gly Ala Thr Asn Pro Glu Leu Thr Gln Arg Gly Tyr
            100                 105                 110
Gln His Ile Met Arg Thr Ala Gly Leu Asp Ser Ser Gln Gly Pro Thr
        115                 120                 125
Ala Ala Lys Tyr Ile Leu Glu Thr Val Lys Pro Gln Arg Ile Ala Ile
    130                 135                 140
Ile His Asp Lys Gln Gln Tyr Gly Glu Gly Leu Ala Arg Ser Val Gln
145                 150                 155                 160
Asp Gly Leu Lys Ala Ala Asn Ala Asn Val Val Phe Phe Asp Gly Ile
                165                 170                 175
Thr Ala Gly Glu Lys Asp Phe Ser Ala Leu Ile Ala Arg Leu Lys Lys
            180                 185                 190
Glu Asn Ile Asp Phe Val Tyr Tyr Gly Gly Tyr Tyr Pro Glu Met Gly
        195                 200                 205
Gln Met Leu Arg Gln Ala Arg Ser Val Gly Leu Lys Thr Gln Phe Met
    210                 215                 220
Gly Pro Glu Gly Val Gly Asn Ala Ser Leu Ser Asn Ile Ala Gly Asp
225                 230                 235                 240
Ala Ala Glu Gly Met Leu Val Thr Met Pro Lys Arg Tyr Asp Gln Asp
                245                 250                 255
Pro Ala Asn Gln Gly Ile Val Asp Ala Leu Lys Ala Asp Lys Lys Asp
            260                 265                 270
Pro Ser Gly Pro Tyr Val Trp Ile Thr Tyr Ala Ala Val Gln Ser Leu
        275                 280                 285
Ala Thr Ala Leu Glu Arg Thr Gly Ser Asp Glu Pro Leu Ala Leu Val
    290                 295                 300
Lys Asp Leu Lys Ala Asn Gly Ala Asn Thr Val Ile Gly Pro Leu Asn
305                 310                 315                 320
Trp Asp Glu Lys Gly Asp Leu Lys Tyr Asn Ser Asp Asn Val Tyr Ile
                325                 330                 335
```

Met Ala Asp Lys Gln Lys Asn Gly Ile Lys Ala Asn Phe Lys Ile Arg
            340                 345                 350

His Asn Val Glu Asp Gly Ser Val Gln Leu Ala Asp His Tyr Gln Gln
            355                 360                 365

Asn Thr Pro Ile Gly Asp Gly Pro Val Leu Leu Pro Asp Asn His Tyr
        370                 375                 380

Leu Ser Phe Gln Ser Val Leu Ser Lys Asp Pro Asn Glu Lys Arg Asp
385                 390                 395                 400

His Met Val Leu Leu Glu Phe Val Thr Ala Ala Gly Ile Thr Leu Gly
                405                 410                 415

Met Asp Glu Leu Tyr Asn Val Asp Gly Gly Ser Gly Gly Thr Gly Ser
            420                 425                 430

Lys Gly Glu Glu Leu Phe Thr Gly Val Val Pro Ile Leu Val Glu Leu
            435                 440                 445

Asp Gly Asp Val Asn Gly His Lys Phe Ser Val Ser Gly Glu Gly Glu
        450                 455                 460

Gly Asp Ala Thr Tyr Gly Lys Leu Thr Leu Lys Leu Ile Cys Thr Thr
465                 470                 475                 480

Gly Lys Leu Pro Val Pro Trp Pro Thr Leu Val Thr Thr Leu Gly Tyr
                485                 490                 495

Gly Leu Lys Cys Phe Ala Arg Tyr Pro Asp His Met Lys Gln His Asp
            500                 505                 510

Phe Phe Lys Ser Ala Met Pro Glu Gly Tyr Val Gln Glu Arg Thr Ile
            515                 520                 525

Phe Phe Lys Asp Asp Gly Asn Tyr Lys Thr Arg Ala Glu Val Lys Phe
        530                 535                 540

Glu Gly Asp Thr Leu Val Asn Arg Ile Glu Leu Lys Gly Ile Gly Phe
545                 550                 555                 560

Lys Glu Asp Gly Asn Ile Leu Gly His Lys Leu Glu Tyr Asn Gly Phe
                565                 570                 575

Asp Phe Gly Val Phe Gln Trp His Ala Asp Gly Ser Ser Thr Ala Ala
            580                 585                 590

Lys

<210> SEQ ID NO 25
<211> LENGTH: 592
<212> TYPE: PRT
<213> ORGANISM: Artificial Sequence
<220> FEATURE:
<223> OTHER INFORMATION: LivK 327/329-cpYFP

<400> SEQUENCE: 25

Met Asp Asp Ile Lys Val Ala Val Val Gly Ala Met Ser Gly Pro Ile
1               5                   10                  15

Ala Gln Trp Gly Asp Met Glu Phe Asn Gly Ala Arg Gln Ala Ile Lys
            20                  25                  30

Asp Ile Asn Ala Lys Gly Gly Ile Lys Gly Asp Lys Leu Val Gly Val
        35                  40                  45

Glu Tyr Asp Asp Ala Cys Asp Pro Lys Gln Ala Val Ala Val Ala Asn
    50                  55                  60

Lys Ile Val Asn Asp Gly Ile Lys Tyr Val Ile Gly His Leu Cys Ser
65                  70                  75                  80

Ser Ser Thr Gln Pro Ala Ser Asp Ile Tyr Glu Asp Glu Gly Ile Leu
                85                  90                  95

Met Ile Ser Pro Gly Ala Thr Asn Pro Glu Leu Thr Gln Arg Gly Tyr

```
                100              105              110
Gln His Ile Met Arg Thr Ala Gly Leu Asp Ser Ser Gln Gly Pro Thr
            115              120              125

Ala Ala Lys Tyr Ile Leu Glu Thr Val Lys Pro Gln Arg Ile Ala Ile
130              135              140

Ile His Asp Lys Gln Gln Tyr Gly Glu Gly Leu Ala Arg Ser Val Gln
145              150              155              160

Asp Gly Leu Lys Ala Ala Asn Ala Asn Val Val Phe Phe Asp Gly Ile
                165              170              175

Thr Ala Gly Glu Lys Asp Phe Ser Ala Leu Ile Ala Arg Leu Lys Lys
            180              185              190

Glu Asn Ile Asp Phe Val Tyr Tyr Gly Gly Tyr Tyr Pro Glu Met Gly
        195              200              205

Gln Met Leu Arg Gln Ala Arg Ser Val Gly Leu Lys Thr Gln Phe Met
    210              215              220

Gly Pro Glu Gly Val Gly Asn Ala Ser Leu Ser Asn Ile Ala Gly Asp
225              230              235              240

Ala Ala Glu Gly Met Leu Val Thr Met Pro Lys Arg Tyr Asp Gln Asp
                245              250              255

Pro Ala Asn Gln Gly Ile Val Asp Ala Leu Lys Ala Asp Lys Lys Asp
            260              265              270

Pro Ser Gly Pro Tyr Val Trp Ile Thr Tyr Ala Ala Val Gln Ser Leu
        275              280              285

Ala Thr Ala Leu Glu Arg Thr Gly Ser Asp Glu Pro Leu Ala Leu Val
    290              295              300

Lys Asp Leu Lys Ala Asn Gly Ala Asn Thr Val Ile Gly Pro Leu Asn
305              310              315              320

Trp Asp Glu Lys Gly Asp Leu Lys Tyr Asn Ser Asp Asn Val Tyr Ile
                325              330              335

Met Ala Asp Lys Gln Lys Asn Gly Ile Lys Ala Asn Phe Lys Ile Arg
            340              345              350

His Asn Val Glu Asp Gly Ser Val Gln Leu Ala Asp His Tyr Gln Gln
        355              360              365

Asn Thr Pro Ile Gly Asp Gly Pro Val Leu Leu Pro Asp Asn His Tyr
    370              375              380

Leu Ser Phe Gln Ser Val Leu Ser Lys Asp Pro Asn Glu Lys Arg Asp
385              390              395              400

His Met Val Leu Leu Glu Phe Val Thr Ala Ala Gly Ile Thr Leu Gly
                405              410              415

Met Asp Glu Leu Tyr Asn Val Asp Gly Gly Ser Gly Gly Thr Gly Ser
            420              425              430

Lys Gly Glu Glu Leu Phe Thr Gly Val Val Pro Ile Leu Val Glu Leu
        435              440              445

Asp Gly Asp Val Asn Gly His Lys Phe Ser Val Ser Gly Glu Gly Glu
    450              455              460

Gly Asp Ala Thr Tyr Gly Lys Leu Thr Leu Lys Leu Ile Cys Thr Thr
465              470              475              480

Gly Lys Leu Pro Val Pro Trp Pro Thr Leu Val Thr Thr Leu Gly Tyr
                485              490              495

Gly Leu Lys Cys Phe Ala Arg Tyr Pro Asp His Met Lys Gln His Asp
            500              505              510

Phe Phe Lys Ser Ala Met Pro Glu Gly Tyr Val Gln Glu Arg Thr Ile
        515              520              525
```

```
Phe Phe Lys Asp Asp Gly Asn Tyr Lys Thr Arg Ala Glu Val Lys Phe
        530                 535                 540

Glu Gly Asp Thr Leu Val Asn Arg Ile Glu Leu Lys Gly Ile Gly Phe
545                 550                 555                 560

Lys Glu Asp Gly Asn Ile Leu Gly His Lys Leu Glu Tyr Asn Phe Asp
                565                 570                 575

Phe Gly Val Phe Gln Trp His Ala Asp Gly Ser Ser Thr Ala Ala Lys
            580                 585                 590

<210> SEQ ID NO 26
<211> LENGTH: 591
<212> TYPE: PRT
<213> ORGANISM: Artificial Sequence
<220> FEATURE:
<223> OTHER INFORMATION: LivK 327/330-cpYFP

<400> SEQUENCE: 26

Met Asp Asp Ile Lys Val Ala Val Gly Ala Met Ser Gly Pro Ile
1               5                   10                  15

Ala Gln Trp Gly Asp Met Glu Phe Asn Gly Ala Arg Gln Ala Ile Lys
                20                  25                  30

Asp Ile Asn Ala Lys Gly Gly Ile Lys Gly Asp Lys Leu Val Gly Val
            35                  40                  45

Glu Tyr Asp Asp Ala Cys Asp Pro Lys Gln Ala Val Ala Val Ala Asn
50                  55                  60

Lys Ile Val Asn Asp Gly Ile Lys Tyr Val Ile Gly His Leu Cys Ser
65                  70                  75                  80

Ser Ser Thr Gln Pro Ala Ser Asp Ile Tyr Glu Asp Glu Gly Ile Leu
                85                  90                  95

Met Ile Ser Pro Gly Ala Thr Asn Pro Glu Leu Thr Gln Arg Gly Tyr
            100                 105                 110

Gln His Ile Met Arg Thr Ala Gly Leu Asp Ser Ser Gln Gly Pro Thr
            115                 120                 125

Ala Ala Lys Tyr Ile Leu Glu Thr Val Lys Pro Gln Arg Ile Ala Ile
        130                 135                 140

Ile His Asp Lys Gln Gln Tyr Gly Glu Gly Leu Ala Arg Ser Val Gln
145                 150                 155                 160

Asp Gly Leu Lys Ala Ala Asn Ala Asn Val Val Phe Phe Asp Gly Ile
                165                 170                 175

Thr Ala Gly Glu Lys Asp Phe Ser Ala Leu Ile Ala Arg Leu Lys Lys
            180                 185                 190

Glu Asn Ile Asp Phe Val Tyr Tyr Gly Gly Tyr Tyr Pro Glu Met Gly
        195                 200                 205

Gln Met Leu Arg Gln Ala Arg Ser Val Gly Leu Lys Thr Gln Phe Met
210                 215                 220

Gly Pro Glu Gly Val Gly Asn Ala Ser Leu Ser Asn Ile Ala Gly Asp
225                 230                 235                 240

Ala Ala Glu Gly Met Leu Val Thr Met Pro Lys Arg Tyr Asp Gln Asp
                245                 250                 255

Pro Ala Asn Gln Gly Ile Val Asp Ala Leu Lys Ala Asp Lys Lys Asp
            260                 265                 270

Pro Ser Gly Pro Tyr Val Trp Ile Thr Tyr Ala Ala Val Gln Ser Leu
        275                 280                 285

Ala Thr Ala Leu Glu Arg Thr Gly Ser Asp Glu Pro Leu Ala Leu Val
290                 295                 300
```

```
Lys Asp Leu Lys Ala Asn Gly Ala Asn Thr Val Ile Gly Pro Leu Asn
305                 310                 315                 320

Trp Asp Glu Lys Gly Asp Leu Lys Tyr Asn Ser Asp Asn Val Tyr Ile
            325                 330                 335

Met Ala Asp Lys Gln Lys Asn Gly Ile Lys Ala Asn Phe Lys Ile Arg
            340                 345                 350

His Asn Val Glu Asp Gly Ser Val Gln Leu Ala Asp His Tyr Gln Gln
            355                 360                 365

Asn Thr Pro Ile Gly Asp Gly Pro Val Leu Leu Pro Asp Asn His Tyr
370                 375                 380

Leu Ser Phe Gln Ser Val Leu Ser Lys Asp Pro Asn Glu Lys Arg Asp
385                 390                 395                 400

His Met Val Leu Leu Glu Phe Val Thr Ala Ala Gly Ile Thr Leu Gly
                405                 410                 415

Met Asp Glu Leu Tyr Asn Val Asp Gly Gly Ser Gly Gly Thr Gly Ser
            420                 425                 430

Lys Gly Glu Glu Leu Phe Thr Gly Val Val Pro Ile Leu Val Glu Leu
            435                 440                 445

Asp Gly Asp Val Asn Gly His Lys Phe Ser Val Ser Gly Glu Gly Glu
450                 455                 460

Gly Asp Ala Thr Tyr Gly Lys Leu Thr Leu Lys Leu Ile Cys Thr Thr
465                 470                 475                 480

Gly Lys Leu Pro Val Pro Trp Pro Thr Leu Val Thr Thr Leu Gly Tyr
                485                 490                 495

Gly Leu Lys Cys Phe Ala Arg Tyr Pro Asp His Met Lys Gln His Asp
            500                 505                 510

Phe Phe Lys Ser Ala Met Pro Glu Gly Tyr Val Gln Glu Arg Thr Ile
            515                 520                 525

Phe Phe Lys Asp Asp Gly Asn Tyr Lys Thr Arg Ala Glu Val Lys Phe
530                 535                 540

Glu Gly Asp Thr Leu Val Asn Arg Ile Glu Leu Lys Gly Ile Gly Phe
545                 550                 555                 560

Lys Glu Asp Gly Asn Ile Leu Gly His Lys Leu Glu Tyr Asn Asp Phe
                565                 570                 575

Gly Val Phe Gln Trp His Ala Asp Gly Ser Ser Thr Ala Ala Lys
            580                 585                 590

<210> SEQ ID NO 27
<211> LENGTH: 593
<212> TYPE: PRT
<213> ORGANISM: Artificial Sequence
<220> FEATURE:
<223> OTHER INFORMATION: LivK 327/331-cpYFP

<400> SEQUENCE: 27

Met Asp Asp Ile Lys Val Ala Val Val Gly Ala Met Ser Gly Pro Ile
1               5                   10                  15

Ala Gln Trp Gly Asp Met Glu Phe Asn Gly Ala Arg Gln Ala Ile Lys
            20                  25                  30

Asp Ile Asn Ala Lys Gly Gly Ile Lys Gly Asp Lys Leu Val Gly Val
        35                  40                  45

Glu Tyr Asp Asp Ala Cys Asp Pro Lys Gln Ala Val Ala Val Ala Asn
    50                  55                  60

Lys Ile Val Asn Asp Gly Ile Lys Tyr Val Ile Gly His Leu Cys Ser
65                  70                  75                  80
```

```
Ser Ser Thr Gln Pro Ala Ser Asp Ile Tyr Glu Asp Glu Gly Ile Leu
             85                  90                  95
Met Ile Ser Pro Gly Ala Thr Asn Pro Glu Leu Thr Gln Arg Gly Tyr
            100                 105                 110
Gln His Ile Met Arg Thr Ala Gly Leu Asp Ser Ser Gln Gly Pro Thr
            115                 120                 125
Ala Ala Lys Tyr Ile Leu Glu Thr Val Lys Pro Gln Arg Ile Ala Ile
    130                 135                 140
Ile His Asp Lys Gln Gln Tyr Gly Glu Gly Leu Ala Arg Ser Val Gln
145                 150                 155                 160
Asp Gly Leu Lys Ala Ala Asn Ala Asn Val Val Phe Phe Asp Gly Ile
                165                 170                 175
Thr Ala Gly Glu Lys Asp Phe Ser Ala Leu Ile Ala Arg Leu Lys Lys
            180                 185                 190
Glu Asn Ile Asp Phe Val Tyr Tyr Gly Gly Tyr Tyr Pro Glu Met Gly
            195                 200                 205
Gln Met Leu Arg Gln Ala Arg Ser Val Gly Leu Lys Thr Gln Phe Met
    210                 215                 220
Gly Pro Glu Gly Val Gly Asn Ala Ser Leu Ser Asn Ile Ala Gly Asp
225                 230                 235                 240
Ala Ala Glu Gly Met Leu Val Thr Met Pro Lys Arg Tyr Asp Gln Asp
                245                 250                 255
Pro Ala Asn Gln Gly Ile Val Asp Ala Leu Lys Ala Asp Lys Lys Asp
            260                 265                 270
Pro Ser Gly Pro Tyr Val Trp Ile Thr Tyr Ala Ala Val Gln Ser Leu
            275                 280                 285
Ala Thr Ala Leu Glu Arg Thr Gly Ser Asp Glu Pro Leu Ala Leu Val
    290                 295                 300
Lys Asp Leu Lys Ala Asn Gly Ala Asn Thr Val Ile Gly Pro Leu Asn
305                 310                 315                 320
Trp Asp Glu Lys Gly Asp Leu Lys Tyr Asn Ser Asp Asn Val Tyr Ile
                325                 330                 335
Met Ala Asp Lys Gln Lys Asn Gly Ile Lys Ala Asn Phe Lys Ile Arg
            340                 345                 350
His Asn Val Glu Asp Gly Ser Val Gln Leu Ala Asp His Tyr Gln Gln
            355                 360                 365
Asn Thr Pro Ile Gly Asp Gly Pro Val Leu Leu Pro Asp Asn His Tyr
    370                 375                 380
Leu Ser Phe Gln Ser Val Leu Ser Lys Asp Pro Asn Glu Lys Arg Asp
385                 390                 395                 400
His Met Val Leu Leu Glu Phe Val Thr Ala Ala Gly Ile Thr Leu Gly
                405                 410                 415
Met Asp Glu Leu Tyr Asn Val Asp Gly Gly Ser Gly Thr Gly Ser
            420                 425                 430
Lys Gly Glu Glu Leu Phe Thr Gly Val Val Pro Ile Leu Val Glu Leu
    435                 440                 445
Asp Gly Asp Val Asn Gly His Lys Phe Ser Val Ser Gly Glu Gly Glu
    450                 455                 460
Gly Asp Ala Thr Tyr Gly Lys Leu Thr Leu Lys Leu Ile Cys Thr Thr
465                 470                 475                 480
Gly Lys Leu Pro Val Pro Trp Pro Thr Leu Val Thr Thr Leu Gly Tyr
                485                 490                 495
```

Gly Leu Lys Cys Phe Ala Arg Tyr Pro Asp His Met Lys Gln His Asp
                500                 505                 510

Phe Phe Lys Ser Ala Met Pro Glu Gly Tyr Val Gln Glu Arg Thr Ile
            515                 520                 525

Phe Phe Lys Asp Asp Gly Asn Tyr Lys Thr Arg Ala Glu Val Lys Phe
        530                 535                 540

Glu Gly Asp Thr Leu Val Asn Arg Ile Glu Leu Lys Gly Ile Gly Phe
545                 550                 555                 560

Lys Glu Asp Gly Asn Ile Leu Gly His Lys Leu Glu Tyr Asn Gly Phe
                565                 570                 575

Asp Phe Gly Val Phe Gln Trp His Ala Asp Gly Ser Ser Thr Ala Ala
            580                 585                 590

Lys

<210> SEQ ID NO 28
<211> LENGTH: 593
<212> TYPE: PRT
<213> ORGANISM: Artificial Sequence
<220> FEATURE:
<223> OTHER INFORMATION: LivK 328/329-cpYFP

<400> SEQUENCE: 28

Met Asp Asp Ile Lys Val Ala Val Val Gly Ala Met Ser Gly Pro Ile
1               5                   10                  15

Ala Gln Trp Gly Asp Met Glu Phe Asn Gly Ala Arg Gln Ala Ile Lys
                20                  25                  30

Asp Ile Asn Ala Lys Gly Gly Ile Lys Gly Asp Lys Leu Val Gly Val
            35                  40                  45

Glu Tyr Asp Asp Ala Cys Asp Pro Lys Gln Ala Val Ala Val Ala Asn
50                  55                  60

Lys Ile Val Asn Asp Gly Ile Lys Tyr Val Ile Gly His Leu Cys Ser
65                  70                  75                  80

Ser Ser Thr Gln Pro Ala Ser Asp Ile Tyr Glu Asp Glu Gly Ile Leu
                85                  90                  95

Met Ile Ser Pro Gly Ala Thr Asn Pro Glu Leu Thr Gln Arg Gly Tyr
            100                 105                 110

Gln His Ile Met Arg Thr Ala Gly Leu Asp Ser Ser Gln Gly Pro Thr
        115                 120                 125

Ala Ala Lys Tyr Ile Leu Glu Thr Val Lys Pro Gln Arg Ile Ala Ile
    130                 135                 140

Ile His Asp Lys Gln Gln Tyr Gly Glu Gly Leu Ala Arg Ser Val Gln
145                 150                 155                 160

Asp Gly Leu Lys Ala Ala Asn Ala Asn Val Val Phe Phe Asp Gly Ile
                165                 170                 175

Thr Ala Gly Glu Lys Asp Phe Ser Ala Leu Ile Ala Arg Leu Lys Lys
            180                 185                 190

Glu Asn Ile Asp Phe Val Tyr Tyr Gly Gly Tyr Pro Glu Met Gly
        195                 200                 205

Gln Met Leu Arg Gln Ala Arg Ser Val Gly Leu Lys Thr Gln Phe Met
    210                 215                 220

Gly Pro Glu Gly Val Gly Asn Ala Ser Leu Ser Asn Ile Ala Gly Asp
225                 230                 235                 240

Ala Ala Glu Gly Met Leu Val Thr Met Pro Lys Arg Tyr Asp Gln Asp
                245                 250                 255

Pro Ala Asn Gln Gly Ile Val Asp Ala Leu Lys Ala Asp Lys Lys Asp

```
            260                 265                 270
Pro Ser Gly Pro Tyr Val Trp Ile Thr Tyr Ala Ala Val Gln Ser Leu
        275                 280                 285

Ala Thr Ala Leu Glu Arg Thr Gly Ser Asp Glu Pro Leu Ala Leu Val
    290                 295                 300

Lys Asp Leu Lys Ala Asn Gly Ala Asn Thr Val Ile Gly Pro Leu Asn
305                 310                 315                 320

Trp Asp Glu Lys Gly Asp Leu Lys Gly Tyr Asn Ser Asp Asn Val Tyr
                325                 330                 335

Ile Met Ala Asp Lys Gln Lys Asn Gly Ile Lys Ala Asn Phe Lys Ile
            340                 345                 350

Arg His Asn Val Glu Asp Gly Ser Val Gln Leu Ala Asp His Tyr Gln
        355                 360                 365

Gln Asn Thr Pro Ile Gly Asp Gly Pro Val Leu Leu Pro Asp Asn His
    370                 375                 380

Tyr Leu Ser Phe Gln Ser Val Leu Ser Lys Asp Pro Asn Glu Lys Arg
385                 390                 395                 400

Asp His Met Val Leu Leu Glu Phe Val Thr Ala Ala Gly Ile Thr Leu
                405                 410                 415

Gly Met Asp Glu Leu Tyr Asn Val Asp Gly Ser Gly Gly Thr Gly
            420                 425                 430

Ser Lys Gly Glu Glu Leu Phe Thr Gly Val Val Pro Ile Leu Val Glu
        435                 440                 445

Leu Asp Gly Asp Val Asn Gly His Lys Phe Ser Val Ser Gly Glu Gly
450                 455                 460

Glu Gly Asp Ala Thr Tyr Gly Lys Leu Thr Leu Lys Leu Ile Cys Thr
465                 470                 475                 480

Thr Gly Lys Leu Pro Val Pro Trp Pro Thr Leu Val Thr Thr Leu Gly
                485                 490                 495

Tyr Gly Leu Lys Cys Phe Ala Arg Tyr Pro Asp His Met Lys Gln His
            500                 505                 510

Asp Phe Phe Lys Ser Ala Met Pro Glu Gly Tyr Val Gln Glu Arg Thr
        515                 520                 525

Ile Phe Phe Lys Asp Asp Gly Asn Tyr Lys Thr Arg Ala Glu Val Lys
    530                 535                 540

Phe Glu Gly Asp Thr Leu Val Asn Arg Ile Glu Leu Lys Gly Ile Gly
545                 550                 555                 560

Phe Lys Glu Asp Gly Asn Ile Leu Gly His Lys Leu Glu Tyr Asn Phe
                565                 570                 575

Asp Phe Gly Val Phe Gln Trp His Ala Asp Gly Ser Ser Thr Ala Ala
            580                 585                 590

Lys

<210> SEQ ID NO 29
<211> LENGTH: 593
<212> TYPE: PRT
<213> ORGANISM: Artificial Sequence
<220> FEATURE:
<223> OTHER INFORMATION: LivK 328/330-cpYFP

<400> SEQUENCE: 29

Met Asp Asp Ile Lys Val Ala Val Val Gly Ala Met Ser Gly Pro Ile
1               5                   10                  15

Ala Gln Trp Gly Asp Met Glu Phe Asn Gly Ala Arg Gln Ala Ile Lys
            20                  25                  30
```

```
Asp Ile Asn Ala Lys Gly Gly Ile Lys Gly Asp Lys Leu Val Gly Val
        35                  40                  45

Glu Tyr Asp Asp Ala Cys Asp Pro Lys Gln Ala Val Ala Val Ala Asn
    50                  55                  60

Lys Ile Val Asn Asp Gly Ile Lys Tyr Val Ile Gly His Leu Cys Ser
65                  70                  75                  80

Ser Ser Thr Gln Pro Ala Ser Asp Ile Tyr Glu Asp Glu Gly Ile Leu
                85                  90                  95

Met Ile Ser Pro Gly Ala Thr Asn Pro Glu Leu Thr Gln Arg Gly Tyr
            100                 105                 110

Gln His Ile Met Arg Thr Ala Gly Leu Asp Ser Ser Gln Gly Pro Thr
        115                 120                 125

Ala Ala Lys Tyr Ile Leu Glu Thr Val Lys Pro Gln Arg Ile Ala Ile
    130                 135                 140

Ile His Asp Lys Gln Gln Tyr Gly Glu Gly Leu Ala Arg Ser Val Gln
145                 150                 155                 160

Asp Gly Leu Lys Ala Ala Asn Ala Asn Val Val Phe Phe Asp Gly Ile
                165                 170                 175

Thr Ala Gly Glu Lys Asp Phe Ser Ala Leu Ile Ala Arg Leu Lys Lys
            180                 185                 190

Glu Asn Ile Asp Phe Val Tyr Tyr Gly Gly Tyr Tyr Pro Glu Met Gly
        195                 200                 205

Gln Met Leu Arg Gln Ala Arg Ser Val Gly Leu Lys Thr Gln Phe Met
    210                 215                 220

Gly Pro Glu Gly Val Gly Asn Ala Ser Leu Ser Asn Ile Ala Gly Asp
225                 230                 235                 240

Ala Ala Glu Gly Met Leu Val Thr Met Pro Lys Arg Tyr Asp Gln Asp
                245                 250                 255

Pro Ala Asn Gln Gly Ile Val Asp Ala Leu Lys Ala Asp Lys Lys Asp
            260                 265                 270

Pro Ser Gly Pro Tyr Val Trp Ile Thr Tyr Ala Ala Val Gln Ser Leu
        275                 280                 285

Ala Thr Ala Leu Glu Arg Thr Gly Ser Asp Glu Pro Leu Ala Leu Val
    290                 295                 300

Lys Asp Leu Lys Ala Asn Gly Ala Asn Thr Val Ile Gly Pro Leu Asn
305                 310                 315                 320

Trp Asp Glu Lys Gly Asp Leu Lys Gly Tyr Asn Ser Asp Asn Val Tyr
                325                 330                 335

Ile Met Ala Asp Lys Gln Lys Asn Gly Ile Lys Ala Asn Phe Lys Ile
            340                 345                 350

Arg His Asn Val Glu Asp Gly Ser Val Gln Leu Ala Asp His Tyr Gln
        355                 360                 365

Gln Asn Thr Pro Ile Gly Asp Gly Pro Val Leu Leu Pro Asp Asn His
    370                 375                 380

Tyr Leu Ser Phe Gln Ser Val Leu Ser Lys Asp Pro Asn Glu Lys Arg
385                 390                 395                 400

Asp His Met Val Leu Leu Glu Phe Val Thr Ala Ala Gly Ile Thr Leu
                405                 410                 415

Gly Met Asp Glu Leu Tyr Asn Val Asp Gly Ser Gly Gly Thr Gly
            420                 425                 430

Ser Lys Gly Glu Glu Leu Phe Thr Gly Val Val Pro Ile Leu Val Glu
        435                 440                 445
```

```
Leu Asp Gly Asp Val Asn Gly His Lys Phe Ser Val Ser Gly Glu Gly
450                 455                 460

Glu Gly Asp Ala Thr Tyr Gly Lys Leu Thr Leu Lys Leu Ile Cys Thr
465                 470                 475                 480

Thr Gly Lys Leu Pro Val Pro Trp Pro Thr Leu Val Thr Thr Leu Gly
                485                 490                 495

Tyr Gly Leu Lys Cys Phe Ala Arg Tyr Pro Asp His Met Lys Gln His
            500                 505                 510

Asp Phe Phe Lys Ser Ala Met Pro Glu Gly Tyr Val Gln Glu Arg Thr
        515                 520                 525

Ile Phe Phe Lys Asp Asp Gly Asn Tyr Lys Thr Arg Ala Glu Val Lys
    530                 535                 540

Phe Glu Gly Asp Thr Leu Val Asn Arg Ile Glu Leu Lys Gly Ile Gly
545                 550                 555                 560

Phe Lys Glu Asp Gly Asn Ile Leu Gly His Lys Leu Glu Tyr Asn Phe
                565                 570                 575

Asp Phe Gly Val Phe Gln Trp His Ala Asp Gly Ser Ser Thr Ala Ala
            580                 585                 590

Lys

<210> SEQ ID NO 30
<211> LENGTH: 593
<212> TYPE: PRT
<213> ORGANISM: Artificial Sequence
<220> FEATURE:
<223> OTHER INFORMATION: LivK 328/331-cpYFP

<400> SEQUENCE: 30

Met Asp Asp Ile Lys Val Ala Val Val Gly Ala Met Ser Gly Pro Ile
1               5                   10                  15

Ala Gln Trp Gly Asp Met Glu Phe Asn Gly Ala Arg Gln Ala Ile Lys
            20                  25                  30

Asp Ile Asn Ala Lys Gly Gly Ile Lys Gly Asp Lys Leu Val Gly Val
        35                  40                  45

Glu Tyr Asp Asp Ala Cys Asp Pro Lys Gln Ala Val Ala Val Ala Asn
50                  55                  60

Lys Ile Val Asn Asp Gly Ile Lys Tyr Val Ile Gly His Leu Cys Ser
65                  70                  75                  80

Ser Ser Thr Gln Pro Ala Ser Asp Ile Tyr Glu Asp Glu Gly Ile Leu
                85                  90                  95

Met Ile Ser Pro Gly Ala Thr Asn Pro Glu Leu Thr Gln Arg Gly Tyr
            100                 105                 110

Gln His Ile Met Arg Thr Ala Gly Leu Asp Ser Ser Gln Gly Pro Thr
        115                 120                 125

Ala Ala Lys Tyr Ile Leu Glu Thr Val Lys Pro Gln Arg Ile Ala Ile
    130                 135                 140

Ile His Asp Lys Gln Gln Tyr Gly Glu Gly Leu Ala Arg Ser Val Gln
145                 150                 155                 160

Asp Gly Leu Lys Ala Ala Asn Ala Asn Val Val Phe Phe Asp Gly Ile
                165                 170                 175

Thr Ala Gly Glu Lys Asp Phe Ser Ala Leu Ile Ala Arg Leu Lys Lys
            180                 185                 190

Glu Asn Ile Asp Phe Val Tyr Tyr Gly Gly Tyr Tyr Pro Glu Met Gly
        195                 200                 205

Gln Met Leu Arg Gln Ala Arg Ser Val Gly Leu Lys Thr Gln Phe Met
```

```
                210                 215                 220
Gly Pro Glu Gly Val Gly Asn Ala Ser Leu Ser Asn Ile Ala Gly Asp
225                 230                 235                 240

Ala Ala Glu Gly Met Leu Val Thr Met Pro Lys Arg Tyr Asp Gln Asp
                245                 250                 255

Pro Ala Asn Gln Gly Ile Val Asp Ala Leu Lys Ala Asp Lys Lys Asp
                260                 265                 270

Pro Ser Gly Pro Tyr Val Trp Ile Thr Tyr Ala Ala Val Gln Ser Leu
            275                 280                 285

Ala Thr Ala Leu Glu Arg Thr Gly Ser Asp Glu Pro Leu Ala Leu Val
        290                 295                 300

Lys Asp Leu Lys Ala Asn Gly Ala Asn Thr Val Ile Gly Pro Leu Asn
305                 310                 315                 320

Trp Asp Glu Lys Gly Asp Leu Lys Gly Tyr Asn Ser Asp Asn Val Tyr
                325                 330                 335

Ile Met Ala Asp Lys Gln Lys Asn Gly Ile Lys Ala Asn Phe Lys Ile
                340                 345                 350

Arg His Asn Val Glu Asp Gly Ser Val Gln Leu Ala Asp His Tyr Gln
            355                 360                 365

Gln Asn Thr Pro Ile Gly Asp Gly Pro Val Leu Leu Pro Asp Asn His
        370                 375                 380

Tyr Leu Ser Phe Gln Ser Val Leu Ser Lys Asp Pro Asn Glu Lys Arg
385                 390                 395                 400

Asp His Met Val Leu Leu Glu Phe Val Thr Ala Ala Gly Ile Thr Leu
                405                 410                 415

Gly Met Asp Glu Leu Tyr Asn Val Asp Gly Ser Gly Gly Thr Gly
                420                 425                 430

Ser Lys Gly Glu Glu Leu Phe Thr Gly Val Val Pro Ile Leu Val Glu
            435                 440                 445

Leu Asp Gly Asp Val Asn Gly His Lys Phe Ser Val Ser Gly Glu Gly
        450                 455                 460

Glu Gly Asp Ala Thr Tyr Gly Lys Leu Thr Leu Lys Leu Ile Cys Thr
465                 470                 475                 480

Thr Gly Lys Leu Pro Val Pro Trp Pro Thr Leu Val Thr Thr Leu Gly
                485                 490                 495

Tyr Gly Leu Lys Cys Phe Ala Arg Tyr Pro Asp His Met Lys Gln His
            500                 505                 510

Asp Phe Phe Lys Ser Ala Met Pro Glu Gly Tyr Val Gln Glu Arg Thr
        515                 520                 525

Ile Phe Phe Lys Asp Asp Gly Asn Tyr Lys Thr Arg Ala Glu Val Lys
        530                 535                 540

Phe Glu Gly Asp Thr Leu Val Asn Arg Ile Glu Leu Lys Gly Ile Gly
545                 550                 555                 560

Phe Lys Glu Asp Gly Asn Ile Leu Gly His Lys Leu Glu Tyr Asn Phe
                565                 570                 575

Asp Phe Gly Val Phe Gln Trp His Ala Asp Gly Ser Ser Thr Ala Ala
            580                 585                 590

Lys

<210> SEQ ID NO 31
<211> LENGTH: 593
<212> TYPE: PRT
<213> ORGANISM: Artificial Sequence
<220> FEATURE:
```

<223> OTHER INFORMATION: LivK 329/330-cpYFP

<400> SEQUENCE: 31

Met Asp Asp Ile Lys Val Ala Val Val Gly Ala Met Ser Gly Pro Ile
1               5                   10                  15

Ala Gln Trp Gly Asp Met Glu Phe Asn Gly Ala Arg Gln Ala Ile Lys
            20                  25                  30

Asp Ile Asn Ala Lys Gly Gly Ile Lys Gly Asp Lys Leu Val Gly Val
        35                  40                  45

Glu Tyr Asp Asp Ala Cys Asp Pro Lys Gln Ala Val Ala Val Ala Asn
    50                  55                  60

Lys Ile Val Asn Asp Gly Ile Lys Tyr Val Ile Gly His Leu Cys Ser
65                  70                  75                  80

Ser Ser Thr Gln Pro Ala Ser Asp Ile Tyr Glu Asp Glu Gly Ile Leu
            85                  90                  95

Met Ile Ser Pro Gly Ala Thr Asn Pro Glu Leu Thr Gln Arg Gly Tyr
            100                 105                 110

Gln His Ile Met Arg Thr Ala Gly Leu Asp Ser Ser Gln Gly Pro Thr
        115                 120                 125

Ala Ala Lys Tyr Ile Leu Glu Thr Val Lys Pro Gln Arg Ile Ala Ile
    130                 135                 140

Ile His Asp Lys Gln Gln Tyr Gly Glu Gly Leu Ala Arg Ser Val Gln
145                 150                 155                 160

Asp Gly Leu Lys Ala Ala Asn Ala Asn Val Val Phe Phe Asp Gly Ile
            165                 170                 175

Thr Ala Gly Glu Lys Asp Phe Ser Ala Leu Ile Ala Arg Leu Lys Lys
            180                 185                 190

Glu Asn Ile Asp Phe Val Tyr Tyr Gly Gly Tyr Tyr Pro Glu Met Gly
        195                 200                 205

Gln Met Leu Arg Gln Ala Arg Ser Val Gly Leu Lys Thr Gln Phe Met
    210                 215                 220

Gly Pro Glu Gly Val Gly Asn Ala Ser Leu Ser Asn Ile Ala Gly Asp
225                 230                 235                 240

Ala Ala Glu Gly Met Leu Val Thr Met Pro Lys Arg Tyr Asp Gln Asp
            245                 250                 255

Pro Ala Asn Gln Gly Ile Val Asp Ala Leu Lys Ala Asp Lys Lys Asp
            260                 265                 270

Pro Ser Gly Pro Tyr Val Trp Ile Thr Tyr Ala Ala Val Gln Ser Leu
        275                 280                 285

Ala Thr Ala Leu Glu Arg Thr Gly Ser Asp Glu Pro Leu Ala Leu Val
    290                 295                 300

Lys Asp Leu Lys Ala Asn Gly Ala Asn Thr Val Ile Gly Pro Leu Asn
305                 310                 315                 320

Trp Asp Glu Lys Gly Asp Leu Lys Gly Phe Tyr Asn Ser Asp Asn Val
            325                 330                 335

Tyr Ile Met Ala Asp Lys Gln Lys Asn Gly Ile Lys Ala Asn Phe Lys
        340                 345                 350

Ile Arg His Asn Val Glu Asp Gly Ser Val Gln Leu Ala Asp His Tyr
    355                 360                 365

Gln Gln Asn Thr Pro Ile Gly Asp Gly Pro Val Leu Leu Pro Asp Asn
    370                 375                 380

His Tyr Leu Ser Phe Gln Ser Val Leu Ser Lys Asp Pro Asn Glu Lys
385                 390                 395                 400

-continued

```
Arg Asp His Met Val Leu Leu Glu Phe Val Thr Ala Ala Gly Ile Thr
                405                 410                 415

Leu Gly Met Asp Glu Leu Tyr Asn Val Asp Gly Gly Ser Gly Gly Thr
            420                 425                 430

Gly Ser Lys Gly Glu Glu Leu Phe Thr Gly Val Val Pro Ile Leu Val
        435                 440                 445

Glu Leu Asp Gly Asp Val Asn Gly His Lys Phe Ser Val Ser Gly Glu
    450                 455                 460

Gly Glu Gly Asp Ala Thr Tyr Gly Lys Leu Thr Leu Lys Leu Ile Cys
465                 470                 475                 480

Thr Thr Gly Lys Leu Pro Val Pro Trp Pro Thr Leu Val Thr Thr Leu
                485                 490                 495

Gly Tyr Gly Leu Lys Cys Phe Ala Arg Tyr Pro Asp His Met Lys Gln
            500                 505                 510

His Asp Phe Phe Lys Ser Ala Met Pro Glu Gly Tyr Val Gln Glu Arg
        515                 520                 525

Thr Ile Phe Phe Lys Asp Asp Gly Asn Tyr Lys Thr Arg Ala Glu Val
    530                 535                 540

Lys Phe Glu Gly Asp Thr Leu Val Asn Arg Ile Glu Leu Lys Gly Ile
545                 550                 555                 560

Gly Phe Lys Glu Asp Gly Asn Ile Leu Gly His Lys Leu Glu Tyr Asn
                565                 570                 575

Asp Phe Gly Val Phe Gln Trp His Ala Asp Gly Ser Ser Thr Ala Ala
            580                 585                 590

Lys
```

<210> SEQ ID NO 32
<211> LENGTH: 593
<212> TYPE: PRT
<213> ORGANISM: Artificial Sequence
<220> FEATURE:
<223> OTHER INFORMATION: LivK 329/331-cpYFP

<400> SEQUENCE: 32

```
Met Asp Asp Ile Lys Val Ala Val Val Gly Ala Met Ser Gly Pro Ile
1               5                   10                  15

Ala Gln Trp Gly Asp Met Glu Phe Asn Gly Ala Arg Gln Ala Ile Lys
                20                  25                  30

Asp Ile Asn Ala Lys Gly Gly Ile Lys Gly Asp Lys Leu Val Gly Val
            35                  40                  45

Glu Tyr Asp Asp Ala Cys Asp Pro Lys Gln Ala Val Ala Val Ala Asn
    50                  55                  60

Lys Ile Val Asn Asp Gly Ile Lys Tyr Val Ile Gly His Leu Cys Ser
65                  70                  75                  80

Ser Ser Thr Gln Pro Ala Ser Asp Ile Tyr Glu Asp Glu Gly Ile Leu
                85                  90                  95

Met Ile Ser Pro Gly Ala Thr Asn Pro Glu Leu Thr Gln Arg Gly Tyr
            100                 105                 110

Gln His Ile Met Arg Thr Ala Gly Leu Asp Ser Ser Gln Gly Pro Thr
        115                 120                 125

Ala Ala Lys Tyr Ile Leu Glu Thr Val Lys Pro Gln Arg Ile Ala Ile
    130                 135                 140

Ile His Asp Lys Gln Gln Tyr Gly Glu Gly Leu Ala Arg Ser Val Gln
145                 150                 155                 160

Asp Gly Leu Lys Ala Ala Asn Ala Asn Val Val Phe Phe Asp Gly Ile
```

```
                165                 170                 175
Thr Ala Gly Glu Lys Asp Phe Ser Ala Leu Ile Ala Arg Leu Lys Lys
            180                 185                 190
Glu Asn Ile Asp Phe Val Tyr Tyr Gly Gly Tyr Pro Glu Met Gly
            195                 200             205
Gln Met Leu Arg Gln Ala Arg Ser Val Gly Leu Lys Thr Gln Phe Met
        210                 215                 220
Gly Pro Glu Gly Val Gly Asn Ala Ser Leu Ser Asn Ile Ala Gly Asp
225                 230                 235                 240
Ala Ala Glu Gly Met Leu Val Thr Met Pro Lys Arg Tyr Asp Gln Asp
                245                 250                 255
Pro Ala Asn Gln Gly Ile Val Asp Ala Leu Lys Ala Asp Lys Lys Asp
            260                 265                 270
Pro Ser Gly Pro Tyr Val Trp Ile Thr Tyr Ala Ala Val Gln Ser Leu
            275                 280                 285
Ala Thr Ala Leu Glu Arg Thr Gly Ser Asp Glu Pro Leu Ala Leu Val
        290                 295                 300
Lys Asp Leu Lys Ala Asn Gly Ala Asn Thr Val Ile Gly Pro Leu Asn
305                 310                 315                 320
Trp Asp Glu Lys Gly Asp Leu Lys Gly Phe Tyr Asn Ser Asp Asn Val
                325                 330                 335
Tyr Ile Met Ala Asp Lys Gln Lys Asn Gly Ile Lys Ala Asn Phe Lys
            340                 345                 350
Ile Arg His Asn Val Glu Asp Gly Ser Val Gln Leu Ala Asp His Tyr
            355                 360                 365
Gln Gln Asn Thr Pro Ile Gly Asp Gly Pro Val Leu Leu Pro Asp Asn
        370                 375                 380
His Tyr Leu Ser Phe Gln Ser Val Leu Ser Lys Asp Pro Asn Glu Lys
385                 390                 395                 400
Arg Asp His Met Val Leu Leu Glu Phe Val Thr Ala Ala Gly Ile Thr
                405                 410                 415
Leu Gly Met Asp Glu Leu Tyr Asn Val Asp Gly Gly Ser Gly Gly Thr
            420                 425                 430
Gly Ser Lys Gly Glu Glu Leu Phe Thr Gly Val Val Pro Ile Leu Val
        435                 440                 445
Glu Leu Asp Gly Asp Val Asn Gly His Lys Phe Ser Val Ser Gly Glu
    450                 455                 460
Gly Glu Gly Asp Ala Thr Tyr Gly Lys Leu Thr Leu Lys Leu Ile Cys
465                 470                 475                 480
Thr Thr Gly Lys Leu Pro Val Pro Trp Pro Thr Leu Val Thr Thr Leu
                485                 490                 495
Gly Tyr Gly Leu Lys Cys Phe Ala Arg Tyr Pro Asp His Met Lys Gln
            500                 505                 510
His Asp Phe Phe Lys Ser Ala Met Pro Glu Gly Tyr Val Gln Glu Arg
        515                 520                 525
Thr Ile Phe Phe Lys Asp Asp Gly Asn Tyr Lys Thr Arg Ala Glu Val
        530                 535                 540
Lys Phe Glu Gly Asp Thr Leu Val Asn Arg Ile Glu Leu Lys Gly Ile
545                 550                 555                 560
Gly Phe Lys Glu Asp Gly Asn Ile Leu Gly His Lys Leu Glu Tyr Asn
                565                 570                 575
Asp Phe Gly Val Phe Gln Trp His Ala Asp Gly Ser Ser Thr Ala Ala
            580                 585                 590
```

Lys

<210> SEQ ID NO 33
<211> LENGTH: 593
<212> TYPE: PRT
<213> ORGANISM: Artificial Sequence
<220> FEATURE:
<223> OTHER INFORMATION: LivK 330/331-cpYFP

<400> SEQUENCE: 33

```
Met Asp Asp Ile Lys Val Ala Val Val Gly Ala Met Ser Gly Pro Ile
1               5                   10                  15

Ala Gln Trp Gly Asp Met Glu Phe Asn Gly Ala Arg Gln Ala Ile Lys
            20                  25                  30

Asp Ile Asn Ala Lys Gly Gly Ile Lys Gly Asp Lys Leu Val Gly Val
        35                  40                  45

Glu Tyr Asp Asp Ala Cys Asp Pro Lys Gln Ala Val Ala Val Ala Asn
    50                  55                  60

Lys Ile Val Asn Asp Gly Ile Lys Tyr Val Ile Gly His Leu Cys Ser
65                  70                  75                  80

Ser Ser Thr Gln Pro Ala Ser Asp Ile Tyr Glu Asp Glu Gly Ile Leu
                85                  90                  95

Met Ile Ser Pro Gly Ala Thr Asn Pro Glu Leu Thr Gln Arg Gly Tyr
            100                 105                 110

Gln His Ile Met Arg Thr Ala Gly Leu Asp Ser Ser Gln Gly Pro Thr
        115                 120                 125

Ala Ala Lys Tyr Ile Leu Glu Thr Val Lys Pro Gln Arg Ile Ala Ile
    130                 135                 140

Ile His Asp Lys Gln Gln Tyr Gly Glu Gly Leu Ala Arg Ser Val Gln
145                 150                 155                 160

Asp Gly Leu Lys Ala Ala Asn Ala Asn Val Val Phe Asp Gly Ile
                165                 170                 175

Thr Ala Gly Glu Lys Asp Phe Ser Ala Leu Ile Ala Arg Leu Lys Lys
            180                 185                 190

Glu Asn Ile Asp Phe Val Tyr Tyr Gly Gly Tyr Pro Glu Met Gly
        195                 200                 205

Gln Met Leu Arg Gln Ala Arg Ser Val Gly Leu Lys Thr Gln Phe Met
    210                 215                 220

Gly Pro Glu Gly Val Gly Asn Ala Ser Leu Ser Asn Ile Ala Gly Asp
225                 230                 235                 240

Ala Ala Glu Gly Met Leu Val Thr Met Pro Lys Arg Tyr Asp Gln Asp
                245                 250                 255

Pro Ala Asn Gln Gly Ile Val Asp Ala Leu Lys Ala Asp Lys Lys Asp
            260                 265                 270

Pro Ser Gly Pro Tyr Val Trp Ile Thr Tyr Ala Ala Val Gln Ser Leu
        275                 280                 285

Ala Thr Ala Leu Glu Arg Thr Gly Ser Asp Glu Pro Leu Ala Leu Val
    290                 295                 300

Lys Asp Leu Lys Ala Asn Gly Ala Asn Thr Val Ile Gly Pro Leu Asn
305                 310                 315                 320

Trp Asp Glu Lys Gly Asp Leu Lys Gly Phe Asp Tyr Asn Ser Asp Asn
                325                 330                 335

Val Tyr Ile Met Ala Asp Lys Gln Lys Asn Gly Ile Lys Ala Asn Phe
            340                 345                 350
```

-continued

```
Lys Ile Arg His Asn Val Glu Asp Gly Ser Val Gln Leu Ala Asp His
        355                 360                 365

Tyr Gln Gln Asn Thr Pro Ile Gly Asp Gly Pro Val Leu Leu Pro Asp
    370                 375                 380

Asn His Tyr Leu Ser Phe Gln Ser Val Leu Ser Lys Asp Pro Asn Glu
385                 390                 395                 400

Lys Arg Asp His Met Val Leu Leu Glu Phe Val Thr Ala Ala Gly Ile
                405                 410                 415

Thr Leu Gly Met Asp Glu Leu Tyr Asn Val Asp Gly Gly Ser Gly Gly
            420                 425                 430

Thr Gly Ser Lys Gly Glu Glu Leu Phe Thr Gly Val Val Pro Ile Leu
        435                 440                 445

Val Glu Leu Asp Gly Asp Val Asn Gly His Lys Phe Ser Val Ser Gly
    450                 455                 460

Glu Gly Glu Gly Asp Ala Thr Tyr Gly Lys Leu Thr Leu Lys Leu Ile
465                 470                 475                 480

Cys Thr Thr Gly Lys Leu Pro Val Pro Trp Pro Thr Leu Val Thr Thr
                485                 490                 495

Leu Gly Tyr Gly Leu Lys Cys Phe Ala Arg Tyr Pro Asp His Met Lys
            500                 505                 510

Gln His Asp Phe Phe Lys Ser Ala Met Pro Glu Gly Tyr Val Gln Glu
        515                 520                 525

Arg Thr Ile Phe Phe Lys Asp Asp Gly Asn Tyr Lys Thr Arg Ala Glu
    530                 535                 540

Val Lys Phe Glu Gly Asp Thr Leu Val Asn Arg Ile Glu Leu Lys Gly
545                 550                 555                 560

Ile Gly Phe Lys Glu Asp Gly Asn Ile Leu Gly His Lys Leu Glu Tyr
                565                 570                 575

Asn Phe Gly Val Phe Gln Trp His Ala Asp Gly Ser Ser Thr Ala Ala
            580                 585                 590

Lys
```

FLUORESCENT PROBE FOR BRANCHED CHAIN AMINO ACIDS AND USE THEREOF

FIELD

The disclosure relates to a fluorescent protein, especially, relates to a fluorescent sensor for detecting branched chain amino acids, and a preparation method and uses thereof.

CROSS-REFERENCE TO RELATED APPLICATIONS

This application is a U.S. National Stage Application, pursuant to 35 U.S.C. § 371, of PCT International Application No. PCT/CN2019/078274, filed Mar. 15, 2019, which claims priority to and the benefit of Chinese Patent Application No. 201810215698.7, filed Mar. 15, 2018, the entire contents of each of which are incorporated by reference herein.

SEQUENCE LISTING

This application contains a Sequence Listing which has been submitted electronically in ASCII format and is hereby incorporated by reference in its entirety. Said ASCII copy, created on Feb. 21, 2023, is named 010100_Sequence_v2.txt, and is 132,842 bytes in size.

BACKGROUND

Branched chain amino acids (BCAA), including leucine, isoleucine and valine, are used as effective nutritional signal molecules to regulate the rate of protein synthesis. These three branched chain amino acids are three of the nine essential amino acids for human beings, and account for 35% of essential amino acids in muscle protein and 40% of amino acids required by mammals. They are important in immunology, brain function and other physiological functions (P. C. Calder, 2006; B. skeie et al., 1990). All the three branched chain amino acids are essential for lymphocyte growth and proliferation (K. Tajiri and Y. Shimizu, 2013). Branched chain amino acids may affect brain protein synthesis and energy production, and participate in the synthesis of different neurotransmitters (J. D. Fernstrom, 2005).

Leucine is the most important amino acid in branched chain amino acids (Buse and Reid, 1975; Buse et al., 1979; Li and Jefferson, 1978; Anthony et al., 2000). It can stimulate the initiation of mRNA translation through insulin-dependent and independent pathways, thus promoting muscle protein synthesis (Norton and layman, 2006). Leucine can cross the blood-brain barrier to a certain extent (Smith et al., 1987), and can be absorbed more easily than other amino acids (Grill et al., 1992). Leucine plays a unique regulatory role in metabolism, including translation control of protein synthesis (Kimball and Jefferson, 2001) and blood glucose regulation (Layman and Baum, 2004). Studies have shown that abnormal level of BCAA is usually associated with some major metabolic diseases, including diabetes (Hu, F. B et al., 2001; Wang, T. J et al., 2011; Mapstone, M et al., 2014), obesity (Goffredo et al., 2017), aging (D'Antona et al., 2010), and cancer (Tarlungeanu, D. C et al., 2016; Mayers, J. R. et al., 2014; Tonjes, M et al., 2013).

Because branched chain amino acids, especially leucine, have the above important functions, the detection of their content is particularly important. The common detection methods for branched chain amino acids in the art include mass spectrometry (Pontoni, G et al., 2014, 1996), chromatography (Tateda N et al., Analytical sciences: the international journal of the Japan Society for Analytical Chemistry 2001, 17(6):775-778; Wadud S et al., Journal of chromatography B, Analytical technologies in the biomedical and life sciences 2002, 767(2):369-374), capillary electrophoresis (Li X-t et al., Chem Res Chin Univ 2013, 29(3):434-438; Meng J et al., The Analyst 2010, 135 (7):1592-1599), UV Vis spectrophotometry (Hortala M A et al., J Am Chem Soc 2003, 125(1):20-21; PU F et al., Anal Chem 2010, 82(19): 8211-8216; Du J et al., Chemical communications (Cambridge, England) 2013, 49(47):5399-5401; Engeser Metal., Chemical Communications 1999, (13):1191-1192). However, these detection methods have defects: cell fragmentation is required; sample processing is time-consuming; and separation, extraction and purification of amino acid(s) are difficult. These methods can not be used in high-throughput quantitative analysis in situ, which restricts the development of branched chain amino acid related research fields.

Therefore, there is an urgent need in the art to develop a specific BCAA detection method, especially a real-time, high-throughput and dynamic method which is suitable for physiological and subcellular detection in situ with high spatial-temporal resolution.

Branched chain amino acids are also determined by fluorescence spectrometry (Engeser M et al., Chemical Communications 1999, (13):1191-1192), and measured by the change of fluorescence emission intensity of naphthalene segments covalently connected with Ni (II) tetraazamacrocyclic complex. However, the Ni (II) tetraazamacrocyclic complex needs to undergo a temperature related spin exchange equilibrium. The method is still unable to meet the above requirements.

Relative to traditional detection techniques involving small molecule dye and rapidly developing detection techniques using quantum dot, fluorescent protein detection technique has a unique overwhelming advantage in the imaging of most living cells; fluorescent protein can be genetically introduced into cells, tissues, and even whole organs, therefore it can be used as a whole-cell marker or gene activation indicator.

Green fluorescent protein is originally isolated from *Aequorea victoria*, and the wild-type AvGFP consists of 238 amino acids and has a molecular weight of about 26 kD. Recent study confirms that, in native GFP protein, three amino acids from 65 to 67, Ser-Tyr-Gly, are able to spontaneously form a fluorescent chromogenic moiety, wherein p-hydroxy-benzylidene-imidazolinone is the main luminous feature. The wild-type AvGFP has rather complex spectral characteristics with its main fluorescent excitation peak at 395 nm, and a secondary peak at 475 nm, whose amplitude intensity is approximately ⅓ of the main peak. Under standard solution condition, 395 nm excitation can produce 508 nm emission, and 475 nm excitation produces maximal emission at 503 nm (Heim, R. et al., Proc Natl Acad Sci USA. 1994, V. 91 (26), pp. 12501-12504).

Upon intensive studies on GFP protein mutations, a variety of prominent GFP derivatives have been developed using molecular biotechnology. Through various single-point mutations or combinations thereof made to the wild-type GFP, mutants such as enhanced-type GFP (S65T, F64L), YFP (T203Y) and CFP (Y66W) can be obtained. By rearranging GFP protein sequence to shift the original amino acids 145-238 to the N terminal and the original amino acids 1-144 to the C terminal of the new protein, and binding the two fragments through a flexible short peptide chain, a space sensitive circular permutation fluorescent protein is formed thereby, and a T203Y point mutation thereupon results in a circular permutation yellow fluorescent protein cpYFP (Nagai, T. et al., Proc Natl Acad Sci U.S.A. 2001, V. 98 (6), pp. 3197-3202). Fluorescence-based analytical techniques have further developed along with the progression in fluorescent protein studies. One example is the fluorescence resonance energy transfer (FRET) technique that is routinely adopted nowadays, the key mechanism of which is that when two fluorescent chromophores are in sufficiently close proximity, the donor entity absorbs photon of suitable frequency and is excited to a higher energy state, returns to the ground state upon transferring energy to nearby acceptor entity via dipole-dipole interaction (that is, the occurrence of resonance energy transfer). FRET is a non-radiation energy transfer through intermolecular dipole-dipole interaction transferring energy from donor in excited state to acceptor to make the acceptor in excited state, so that the fluorescence intensity of the donor decreases while the acceptor may emit characteristic fluorescence (sensitized fluorescence) which is stronger than its basic fluorescence, or it may emit no fluorescence (fluorescence quenching). Further studies of the green fluorescent protein show that cyan fluorescent protein (CFP) and yellow fluorescent protein (YFP) derived from green fluorescent protein mutants constitute a prominent donor/acceptor pair. Emission spectrum of CFP substantially overlaps absorption spectrum of YFP, when CFP and YFP are in sufficiently close proximity and upon the excitation with the absorption wavelength of CFP, the chromophore of CFP will effectively resonance transfer energy to the chromophore of YFP, so CFP emission fluorescence will weaken or disappear, and the main emission will be YFP fluorescence. The efficiency of energy transfer between the two chromophores is inversely proportional to sixth power of the spatial distance between them, and is very sensitive to changes in spatial position. Therefore, existing studies report the use of genetic engineering recombinant methods for expression of a novel fusion protein having both termini of the protein of interest fused with CFP and YFP, respectively, such that spatial change caused by binding of the protein with its specific target molecule will be visualized by the fluorescent change.

So the fluorescent protein sequence used herein may come from *Aequorea victoria* fluorescent protein and its derivatives, including, but not limited to sequences of the following mutants: yellow fluorescent protein (YFP), green fluorescent protein (GFP), cyan fluorescent protein (CFP), and the likes, the sequence of yellow fluorescent protein YFP is preferable, and the sequence of circular permutation yellow fluorescent protein cpYFP is particularly preferable.

The branched chain amino acids binding proteins and the leucine binding proteins are derived from *Escherichia coli* or proteins of *Salmonella* which have more than 90% homology with the branched chain amino acid binding proteins and the leucine binding proteins. They contain two typical α/β globular domains of a periplasmic binding protein connected by a hinge, and can bind branched chain amino acids and leucine.

The inventors find that the fluorescent sensor formed by fusion of a fluorescent protein with the branched chain amino acid binding protein or the leucine binding protein can visualize the binding of branched chain amino acid binding protein or leucine binding protein with branched chain amino acid or leucine in real-time and intuitively.

The citation or discussion of any reference in this specification should not be construed as an admission that such reference is available as "Prior Art" to the present disclosure.

SUMMARY

The purpose of the disclosure is to provide a branched chain amino acid fluorescent sensor or leucine fluorescent sensor for real-time localization, high-throughput and quantitative detection of branched chain amino acids or leucine inside or outside the cell.

The disclosure provides a fluorescent sensor, comprising a) a leucine responsive polypeptide, and b) an optically active polypeptide, wherein the optically active polypeptide is inserted into the leucine responsive polypeptide. In one embodiment, the leucine responsive polypeptide is also responsive to other branched chain amino acids, such as isoleucine or valine.

In one embodiment, the optically active polypeptide is a fluorescent protein or a functional fragment or variant thereof. In one embodiment, the fluorescent protein is selected from the group consisting of: green fluorescent protein, blue fluorescent protein, cyan fluorescent protein, orange fluorescent protein, apple red fluorescent protein and red fluorescent protein. In one embodiment, the fluorescent protein has the sequence shown in any of SEQ ID NOs: 3-13.

In one embodiment, the fluorescent sensor further comprises one or more linkers between the leucine responsive polypeptide and the optically active polypeptide. In one embodiment, the fluorescent sensor does not comprise a linker. The linker of the disclosure can be any amino acid sequence, and is preferably no more than 4 amino acids.

In one embodiment, the fluorescent sensor further comprises a localization sequence. The localization sequence is used to locate the sensor to such as specific organelles of cells.

In one embodiment, the leucine responsive polypeptide is selected from the group consisting of a branched chain amino acid binding protein or its functional fragment, and a leucine binding protein or its functional fragment.

In one embodiment, the leucine responsive polypeptide is a branched chain amino acid (BCAA) binding protein or a functional fragment thereof, preferably having a sequence shown in SEQ ID NO: 1 or its functional fragment, or a sequence having 85% identity with SEQ ID NO: 1 or its functional fragment.

In one embodiment, the leucine responsive polypeptide is a leucine binding protein or a functional fragment thereof, preferably having a sequence shown in SEQ ID NO: 2 or its functional fragment, or a sequence having 85% identity with SEQ ID NO: 2 or its functional fragment.

The optically active polypeptide can be located at any position of the leucine responsive polypeptide. In one embodiment, the optically active polypeptide is inserted in residues 118-120, residues 248-258 or residues 325-331 of the leucine responsive polypeptide, and the residue number corresponds to the full length of the BCAA binding protein or the full length of the leucine binding protein. In one embodiment, the optically active polypeptide replaces one or more amino acids in residues 118-120, residues 248-258 or residues 325-331 of the leucine responsive polypeptide, and the residue number corresponds to the full length of the BCAA binding protein or the full length of the leucine binding protein.

In one embodiment, the optically active polypeptide is inserted in the BCAA binding protein at the site of: 118/119, 118/120, 119/120, 248/249, 248/250, 248/251, 248/252, 248/253, 248/254, 248/255, 248/256, 248/257, 248/258, 249/250, 249/251, 249/252, 249/253, 249/254, 249/255, 249/256, 249/257, 249/258, 250/251, 250/252, 250/253, 250/254, 250/255, 250/256, 250/257, 250/258, 251/252, 251/253, 251/254, 251/255, 251/256, 251/257, 251/258, 252/253, 252/254, 252/255, 252/256, 252/257, 252/258, 253/254, 253/255, 253/256, 253/257, 253/258, 254/255, 254/256, 254/257, 254/258, 255/256, 255/257, 255/258, 256/257, 256/258, 257/258, 325/326, 325/327, 325/328, 325/329, 326/327, 326/328, 326/329, 327/328, 327/329 or 328/329.

In one embodiment, the optically active polypeptide is inserted in the leucine binding protein at the site of: 118/119, 118/120, 119/120, 248/249, 248/250, 248/251, 248/252, 248/253, 248/254, 248/255, 248/256, 248/257, 248/258, 249/250, 249/251, 249/252, 249/253, 249/254, 249/255, 249/256, 249/257, 249/258, 250/251, 250/252, 250/253, 250/254, 250/255, 250/256, 250/257, 250/258, 251/252, 251/253, 251/254, 251/255, 251/256, 251/257, 251/258, 252/253, 252/254, 252/255, 252/256, 252/257, 252/258, 253/254, 253/255, 253/256, 253/257, 253/258, 254/255, 254/256, 254/257, 254/258, 255/256, 255/257, 255/258, 256/257, 256/258, 257/258, 327/328, 327/329, 327/330, 327/331, 328/329, 328/330, 328/331, 329/330, 329/331 or 330/331.

In one embodiment, the optically active polypeptide is inserted in the leucine responsive polypeptide at residues 325-329, and the residue number corresponds to the full length of the BCAA binding protein. In one embodiment, the optically active polypeptide replaces one or more amino acids in residues 325-329 of the leucine responsive polypeptide, and the residue number corresponds to the full length of the BCAA binding protein. Preferably, the optically active polypeptide is inserted in the BCAA binding protein between residues 326 and 327 or between residues 327 and 328.

In one embodiment, the optically active polypeptide is inserted in the leucine responsive polypeptide at residues 327-331, and the residue number corresponds to the full length of the leucine binding protein. In one embodiment, the optically active polypeptide replaces one or more amino acids in residues 327-331 of the leucine responsive polypeptide, and the residue number corresponds to the full length of the leucine binding protein. Preferably, the optically active polypeptide is inserted in the leucine binding protein between residues 328 and 329 or between residues 329 and 330.

On another aspect, the disclosure provides a fluorescent sensor, comprising a) a BCAA responsive polypeptide, and b) an optically active polypeptide, wherein the optically active polypeptide is inserted into the BCAA responsive polypeptide.

In one embodiment, the optically active polypeptide is a fluorescent protein or a functional fragment or variant thereof. In one embodiment, the fluorescent protein is selected from the group consisting of: green fluorescent protein, blue fluorescent protein, cyan fluorescent protein, orange fluorescent protein, apple red fluorescent protein and red fluorescent protein. In one embodiment, the fluorescent protein has the sequence shown in any of SEQ ID NOs: 3-13.

In one embodiment, the fluorescent sensor further comprises one or more linkers between the BCAA responsive polypeptide and the optically active polypeptide. In one embodiment, the fluorescent sensor does not comprise a linker. The linker of the disclosure can be any amino acid sequence, and is preferably no more than 4 amino acids.

In one embodiment, the fluorescent sensor comprises a localization sequence. The localization sequence is used to locate the sensor to such as specific organelles of cells.

In one embodiment, the branched chain amino acids are selected from leucine, isoleucine and valine.

In one embodiment, the BCAA responsive polypeptide is selected from the group consisting of a branched chain amino acid binding protein or its functional fragment, and a leucine binding protein or its functional fragment.

In one embodiment, the BCAA responsive polypeptide is a BCAA binding protein or a functional fragment thereof, preferably having a sequence shown in SEQ ID NO: 1 or its functional fragment, or a sequence having 85% identity with SEQ ID NO: 1 or its functional fragment.

In one embodiment, the BCAA responsive polypeptide is a leucine binding protein or a functional fragment thereof, preferably having a sequence shown in SEQ ID NO: 2 or its functional fragment, or a sequence having 85% identity with SEQ ID NO: 2 or its functional fragment.

The optically active polypeptide can be located at any position of the BCAA responsive polypeptide. In one embodiment, the optically active polypeptide is inserted in residues 118-120, residues 248-258 or residues 325-331 of the BCAA responsive polypeptide, and the residue number corresponds to the full length of the BCAA binding protein or the full length of the leucine binding protein. In one embodiment, the optically active polypeptide replaces one or more amino acids in residues 118-120, residues 248-258 or residues 325-331 of the BCAA responsive polypeptide, and the residue number corresponds to the full length of the BCAA binding protein or the full length of the leucine binding protein.

In one embodiment, the optically active polypeptide is inserted in the BCAA binding protein at the site of: 118/119, 118/120, 119/120, 248/249, 248/250, 248/251, 248/252, 248/253, 248/254, 248/255, 248/256, 248/257, 248/258, 249/250, 249/251, 249/252, 249/253, 249/254, 249/255, 249/256, 249/257, 249/258, 250/251, 250/252, 250/253, 250/254, 250/255, 250/256, 250/257, 250/258, 251/252, 251/253, 251/254, 251/255, 251/256, 251/257, 251/258, 252/253, 252/254, 252/255, 252/256, 252/257, 252/258, 253/254, 253/255, 253/256, 253/257, 253/258, 254/255, 254/256, 254/257, 254/258, 255/256, 255/257, 255/258, 256/257, 256/258, 257/258, 325/326, 325/327, 325/328, 325/329, 326/327, 326/328, 326/329, 327/328, 327/329 or 328/329. When mention a site herein, if two numbers expressed in "X/Y" are not consecutive numbers, the optically active polypeptide replaces the amino acids between the two numbers. For example, 250/257 indicates that the optically active polypeptide replaces the amino acid sequence 251-256.

In one embodiment, the optically active polypeptide is inserted in the leucine binding protein at the site of: 118/119, 118/120, 119/120, 248/249, 248/250, 248/251, 248/252, 248/253, 248/254, 248/255, 248/256, 248/257, 248/258, 249/250, 249/251, 249/252, 249/253, 249/254, 249/255, 249/256, 249/257, 249/258, 250/251, 250/252, 250/253, 250/254, 250/255, 250/256, 250/257, 250/258, 251/252, 251/253, 251/254, 251/255, 251/256, 251/257, 251/258, 252/253, 252/254, 252/255, 252/256, 252/257, 252/258, 253/254, 253/255, 253/256, 253/257, 253/258, 254/255, 254/256, 254/257, 254/258, 255/256, 255/257, 255/258, 256/257, 256/258, 257/258, 327/328, 327/329, 327/330, 327/331, 328/329, 328/330, 328/331, 329/330, 329/331 or 330/331. When mention a site herein, if two numbers expressed in "X/Y" are not consecutive numbers, the optically active polypeptide replaces the amino acids between the two numbers. For example, 250/257 indicates that the optically active polypeptide replaces the amino acid sequence 251-256.

In one embodiment, the optically active polypeptide is inserted in residues 325-329 of the BCAA binding protein or a functional fragment thereof, and the residue number corresponds to the full length of the BCAA binding protein.

Preferably, the optically active polypeptide is inserted in the BCAA binding protein between residues 326 and 327 or between residues 327 and 328. In one embodiment, the optically active polypeptide replaces one or more amino acids in residues 325-329 of the BCAA binding protein or a functional fragment thereof, and the residue number corresponds to the full length of the BCAA binding protein.

In one embodiment, the optically active polypeptide is inserted in residues 327-331 of the leucine binding protein or a functional fragment thereof, and the residue number corresponds to the full length of the leucine binding protein. In one embodiment, the optically active polypeptide replaces one or more amino acids in residues 327-331 of the leucine binding protein or a functional fragment thereof, and the residue number corresponds to the full length of the leucine binding protein. Preferably, the optically active polypeptide is inserted in the leucine binding protein between residues 328 and 329 or between residues 329 and 330.

The present disclosure also relates to a nucleic acid sequence encoding the fluorescent sensor herein, or a complementary sequence thereof.

The disclosure also provides an expression vector comprising the nucleic acid sequence or a complementary sequence thereof of the disclosure operably linked to an expression control sequence, wherein the nucleic acid sequence encodes the fluorescent sensor of the disclosure.

The present disclosure also provides a cell comprising the expression vector of the disclosure, wherein the expression vector comprising the nucleic acid sequence or a complementary sequence thereof of the disclosure operably linked to an expression control sequence.

The present disclosure also provides a method for preparing the fluorescent sensor of this disclosure, comprising the following steps: providing a cell comprising an expression vector that expresses the fluorescent sensor of the disclosure, culturing the cell under conditions suitable for the expression of the cell, and separating the fluorescent sensor.

The disclosure provides a method for detecting leucine in a sample, comprising the following steps: contacting the fluorescent sensor described in the disclosure or the fluorescent sensor prepared according to the method of the disclosure with the sample, and detecting the change of the optically active polypeptide.

The disclosure provides a method for detecting BCAA in a sample, comprising the following steps: contacting the fluorescent sensor described in the disclosure or the fluorescent sensor prepared according to the method of the disclosure with the sample, and detecting the change of the optically active polypeptide. In one embodiment, the branched chain amino acids are selected from leucine, isoleucine and valine. The detection can be conducted in vitro, in vivo, in situ, or at subcellular level.

The disclosure also provides uses of the fluorescent sensor described in the disclosure or the fluorescent sensor prepared according to the method of the disclosure in detecting leucine in a sample. The detection can be conducted in vitro, in vivo, in situ, or at subcellular level.

The disclosure also provides uses of the fluorescent sensor described in the disclosure or the fluorescent sensor prepared according to the method of the disclosure in detecting BCAAs in a sample. In one embodiment, the branched chain amino acids are selected from leucine, isoleucine and valine. The detection can be conducted in vitro, in vivo, in situ, or at subcellular level.

The disclosure also provides a kit, comprising the fluorescent sensor described in the disclosure or the fluorescent sensor prepared according to the method of the disclosure.

The beneficial effects of the disclosure:

The fluorescent sensor of the disclosure is easy to mature, has large fluorescence dynamic change range and good specificity. It can be expressed in the cell by gene operation, and can be used for real-time localization, high-throughput and quantitative detection of BCAA and leucine inside or outside the cell. The time-consuming sample processing steps are eliminated. The experimental results show that the maximum response of BCAA fluorescent sensor and leucine fluorescent sensor herein to BCAA and leucine is more than 3 times, which can be used in localization detection in subcellular structures such as cytoplasm, mitochondria, nucleus, endoplasmic reticulum, extracellular membrane, intracellular membrane, Golgi and lysosome, and can be used in high-throughput screening for compounds.

BRIEF DESCRIPTION OF THE DRAWINGS

As shown in FIG. 5, the fusion proteins show no statistically significant change compared with the control.

DETAILED DESCRIPTION

I. Definitions

Figure 1:
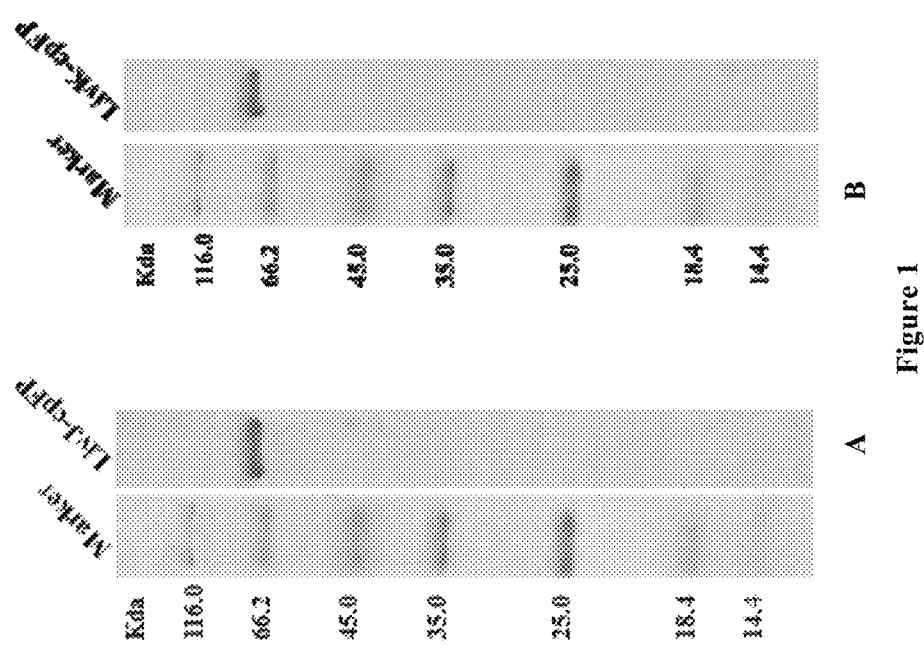
FIG. 1 shows the SDS-PAGE diagram of BCAA fluorescent sensor and leucine fluorescent sensor described in Examples.

When a numerical value or range is indicated, the term "about" used herein means the value or range is within 20%, 10% and 5% of the indicated value or range.

Terms such as "containing", "comprising" and its equivalents used herein shall be read as encompasses the meaning of "having" and "consisting of . . . ", for example, a composition "containing" X may consist exclusively of X or may include other substances, like X+Y.

The term "branched chain amino acid" or "BCAA" as used herein is an amino acid having branched aliphatic side chain(s) (central carbon atoms bound to three or more atoms). Protein derived BCAA includes three kinds of amino acids: leucine, isoleucine and valine. Non protein derived BCAA includes 2-aminoisobutyric acid.

The term "BCAA responsive polypeptide" as used herein refers to peptides that respond or sensitive to BCAA. The term "leucine responsive polypeptide" as used herein refers to peptides that respond or sensitive to leucine. In the disclosure, they can be referred to as "responsive polypeptide". The term "responsive" or "respond" includes any response of the chemical, biological, electrical or physiological parameters of the polypeptide associated with the interaction of the responsive polypeptide. The response includes small changes, such as changes in the direction of amino acids or peptide segments of the responsive polypeptide and, for example, changes in the primary, secondary or tertiary structure of the polypeptide, including, for example, changes in protonation, electrochemical potential and/or conformation. "Conformation" is a three-dimensional arrangement of the primary, secondary or tertiary structure of a molecule containing side group(s). When the three-dimensional structure of a molecule changes, the conformation changes. Examples of conformational changes include the transition from an α-helix to a β-fold or from a β-fold to an α-helix. It should be understood that, as long as the fluorescence of the fluorescent protein is changed, the detectable change does not need to be a conformational change.

The BCAA responsive polypeptide or leucine responsive polypeptide includes but is not limited to "BCAA binding protein", "protein that binds to BCAA", "leucine binding protein" and "protein that binds to leucine". The exemplary BCAA binding protein LivJ or leucine binding protein LivK of the disclosure are derived from *Escherichia coli* or proteins of *Salmonella* which have more than 90% homology with the branched chain amino acid binding proteins and the leucine binding proteins. They contain two typical α/β globular domains of a periplasmic binding protein connected by a hinge, and can bind branched chain amino acids and leucine. BCAA binding protein or leucine binding protein can sense the concentration changes of BCAA and leucine in periplasm, and the spatial conformation of BCAA binding protein and leucine binding protein will also change greatly during the dynamic concentration changes of BCAA and leucine. The conformational change generated by the specific binding of BCAA binding protein and leucine binding protein with BCAA and leucine of physiological concentration causes the conformational change of fluorescent protein, which leads to the change of fluorescence of the fluorescent protein. Using the standard curve based on the fluorescence of the fluorescent protein measured under different BCAA and leucine concentrations, the presence and/or level of BCAA and leucine can be detected and analyzed. The exemplary BCAA binding protein is shown in SEQ ID NO: 1, and the amino acid sequence of the exemplary leucine binding protein is shown in SEQ ID NO: 2.

The term "fusion protein" is synonymous with the terms "fluorescent fusion protein" and "recombinant fluorescent fusion protein", and refers a polypeptide or protein comprising an amino acid sequence of a first polypeptide or protein, or fragment, analog or derivative thereof, and an amino acid sequence of a heterologous polypeptide or protein (that is, a second polypeptide or protein, or fragment, analog or derivative thereof, which differs from the first polypeptide or protein, or fragment, analog or derivative thereof). In one embodiment, the fusion protein comprises a fluorescent protein fused with the heterologous protein, polypeptide or peptide. According to this embodiment, the heterologous protein, polypeptide or peptide may or may not be a fluorescent protein of different type. In one embodiment, the fusion protein maintains or enhances its activity relative to the activity of the original polypeptide or protein prior to the fusion with heterologous protein, polypeptide or peptide. In a specific embodiment, the fusion protein comprises a fluorescent sensor fused with a heterologous protein, polypeptide or peptide, wherein the heterologous protein, polypeptide or peptide can be a specific subcellular localization signal.

The term "fluorescent sensor" used herein refers to a responsive polypeptide fused with a fluorescent protein; the responsive polypeptide can be BCAA responsive polypeptide or leucine responsive polypeptide, especially, BCAA binding protein or leucine binding protein. The fluorescent sensor utilizes the conformational changes of the fluorescent protein caused by binding of the responsive polypeptide with BCAA (such as leucine, isoleucine and valine), and thus lead to the generation or disappearance of fluorescence, or changes in the generated fluorescence, allowing the detection of the presence and/or level of BCAA.

In the fluorescent sensor of the present disclosure, the optically active polypeptide (e.g., a fluorescent protein) can be operatively inserted into the responsive polypeptides, which can be BCAA responsive polypeptides or leucine responsive polypeptides. Protein based "optically active polypeptide" is a kind of polypeptide capable of luminescence. Fluorescence is an optical property of the optically active polypeptide, which can be used to detect the responsiveness of the fluorescent sensor or responsive polypeptide of the disclosure. As used herein, the term "fluorescence property" refers to, based on suitable excitation wavelength, the molar extinction coefficient, fluorescence quantum efficiency, shape of excitation or emission spectrum, maximum excitation wavelength and maximum emission wavelength, excitation ratio, amplitude of two different wavelengths, emission amplitude ratio of two different wavelengths, lifetime of excited state or fluorescence anisotropy.

The measurable difference in any of these properties between the active and inactive states is sufficient for the utility of the fluorescent protein substrate of the present disclosure in activity determination. The measurable difference can be determined by detecting the amount of any quantifiable fluorescence property, for example, the amount of fluorescence at a specific wavelength or the integration of fluorescence on the emission spectrum. Preferably, the protein substrate is selected to present a fluorescence characteristic that is easily distinguishable between an inactive and an activated conformational state.

The term "fluorophore" used here is synonymous with "fluorescent protein", representing a protein exhibits autofluorescence or emits fluorescence under illumination. Fluorescent proteins are often used as detection means, for instance, green fluorescent protein GFP and BFP, CFP, YFP, cpYFP, etc, derived therefrom GFP are routinely used in the biotechnology arts. Any fluorescent protein can be used in the present disclosure, including a protein that fluoresces due to intramolecular rearrangement or the addition of a cofactor that promotes fluorescence. The sequences of exemplary fluorescent proteins are shown in SEQ ID NO: 3-13.

The term "GFP" used herein refers to green fluorescent protein, which is originally isolated from *Aequorea victoria*. The wild type AvGFP is consisted of 238 amino acids and has a molecular weight of about 26 kD. GFP has a unique barrel like structure formed by 12 β-fold chains, in which a chromogenic tripeptide (Ser65-Tyr66-Gly67) is wrapped. In the presence of oxygen, it will spontaneously form a chromophore structure of p-hydroxybenzylideneimidazolinone and produce fluorescence. GFP is a good fluorescence imaging tool with stable fluorescence and does not need cofactor to produce fluorescence. Recent study confirms that Ser-Tyr-Gly, the three amino acids 65-67 in native GFP protein, are able to spontaneously form a fluorescent chromophore: p-hydroxybenzylideneimidazolinone, which is the primary emitting site. The wild-type AvGFP exhibits very complex spectral characteristics with its main fluorescence excitation peak at 395 nm and a secondary peak at 475 nm, whose amplitude intensity is about ⅓ of the main peak. Under standard solution condition, 395 nm excitation can produce 508 nm emission, and 475 nm excitation produces maximum emission at 503 nm wavelength.

The term "YFP" used herein refers to yellow fluorescent protein, which is derived from green fluorescent protein GFP, the amino acid sequence of which is up to 90% or more homologous to GFP, and the key change of YFP from GFP is that the substitution of amino acid 203 from threonine to tyrosine (T203Y). Compared to original AvGFP, the main excitation peak of YFP is red-shifted to 514 nm wavelength and emission wavelength shifted to 527 nm. Site-directed mutation of amino acid No. 65 of the YFP (S65T) thereupon will obtain the fluorescence enhanced yellow fluorescent protein EYFP.

The fluorescent protein of the disclosure can be the yellow fluorescent protein cpYFP, and the amino acid sequence of the yellow fluorescent protein cpYFP is shown in SEQ ID NO: 3. In the present disclosure, the cpYFP is formed by connecting the original N-terminal and C-terminal of GFP through a flexible short peptide chain, and creating a new N-terminal and C-terminal near the chromophore of the original GFP. The cpYFP has the original amino acids 145-238 as the N terminus, and the original amino acids 1-144 as the C terminus, with the two fragments linked through a short flexible peptide chain of 5 to 9 amino acids. The cpYFP (circular permutation yellow fluorescent protein) is sensitive to spacial changes. Herein, the chromophore near position is preferably at Y144 and N145 amino acids; the flexible short peptide chain is preferably VDGGSGGTG or GGSGG.

In the present disclosure, the red fluorescent protein cpmKate is originally extracted from coral in the sea. The wild RFP is an oligomer protein that is not suitable for fusion expression in organisms. On the basis of RFP, red fluorescent proteins with different color bands are further derived, among which the most commonly used are mCherry and mKate.

In other embodiments of the disclosure, the fluorescent protein can also be one or more of a green fluorescent protein having an amino acid sequence as shown in SEQ ID NO: 6 or SEQ ID NO: 11, a blue fluorescent protein having amino acid sequence as shown in SEQ ID NO: 4 or SEQ ID NO: 12, a cyan fluorescent protein cpTFP having an amino acid sequence as shown in SEQ ID NO: 7, an orange fluorescent protein having an amino acid sequence as shown in SEQ ID NO: 8, an apple red fluorescent protein having an amino acid sequence as shown in SEQ ID NO: 5, a red fluorescent protein cpmKate having an amino acid sequence as shown in SEQ ID NO: 9 or SEQ ID NO: 13 and a red fluorescent protein mCherry having an amino acid sequence as shown in SEQ ID NO: 10.

In the fluorescent sensor of the present disclosure, the fluorescent protein or its functional fragment or variant may be located at any position of the responsive polypeptide, which may be a BCAA responsive peptide or a leucine responsive polypeptide. Specifically, the fluorescent protein or its functional fragment or variant is located in the flexible region of the responsive polypeptide. The flexible region refers to some specific structures such as ring domain in the high-level structure of a protein, which has higher mobility and flexibility than other high-level structures. The spatial conformation of the flexible region can be changed dynamically after the protein and ligand are bound. The flexible region herein can be the region where the insertion sites in BCAA binding protein and leucine binding protein are located.

In one embodiment, the fluorescent protein or its functional fragment or variant is inserted in residues 118-120, residues 248-258 or residues 325-331 of the responsive polypeptide, and the residue number corresponds to the full length of the BCAA binding protein or the full length of the leucine binding protein. In one embodiment, the fluorescent protein or its functional fragment or variant replaces one or more amino acids in residues 118-120, residues 248-258 or residues 325-331 of the responsive polypeptide, and the residue number corresponds to the full length of the BCAA binding protein or the full length of the leucine binding protein. In one embodiment, the fluorescent protein or its functional fragment or variant is inserted in the BCAA binding protein at the site of: 118/119, 118/120, 119/120, 248/249, 248/250, 248/251, 248/252, 248/253, 248/254, 248/255, 248/256, 248/257, 248/258, 249/250, 249/251, 249/252, 249/253, 249/254, 249/255, 249/256, 249/257, 249/258, 250/251, 250/252, 250/253, 250/254, 250/255, 250/256, 250/257, 250/258, 251/252, 251/253, 251/254, 251/255, 251/256, 251/257, 251/258, 252/253, 252/254, 252/255, 252/256, 252/257, 252/258, 253/254, 253/255, 253/256, 253/257, 253/258, 254/255, 254/256, 254/257, 254/258, 255/256, 255/257, 255/258, 256/257, 256/258, 257/258, 325/326, 325/327, 325/328, 325/329, 326/327, 326/328, 326/329, 327/328, 327/329 or 328/329. In one embodiment, the fluorescent protein or its functional fragment or variant is inserted in the leucine binding protein at the site of: 118/119, 118/120, 119/120, 248/249, 248/250, 248/251, 248/252, 248/253, 248/254, 248/255, 248/256, 248/257, 248/258, 249/250, 249/251, 249/252, 249/253, 249/254, 249/255, 249/256, 249/257, 249/258, 250/251, 250/252, 250/253, 250/254, 250/255, 250/256, 250/257, 250/258, 251/252, 251/253, 251/254, 251/255, 251/256, 251/257, 251/258, 252/253, 252/254, 252/255, 252/256, 252/257, 252/258, 253/254, 253/255, 253/256, 253/257, 253/258, 254/255, 254/256, 254/257, 254/258, 255/256, 255/257, 255/258, 256/257, 256/258, 257/258, 327/328, 327/329, 327/330, 327/331, 328/329, 328/330, 328/331, 329/330, 329/331 or 330/331. In one embodiment, the fluorescent protein or its functional fragment or variant is inserted in residues 325-329 of the BCAA binding protein or a functional fragment thereof, and the residue number corresponds to the full length of the BCAA binding protein. In one embodiment, the fluorescent protein or its functional fragment or variant replaces one or more amino acids in residues 325-329 of the BCAA binding protein or a functional fragment thereof, and the residue number corresponds to the full length of the BCAA binding protein. Preferably, the fluorescent protein or its functional fragment or variant is inserted in the BCAA binding protein or a functional fragment thereof between residues 326 and 327 or between residues 327 and 328. In one embodiment, the fluorescent protein or its functional fragment or variant is inserted in residues 327-331 of the leucine binding protein or a functional fragment thereof, and the residue number corresponds to the full length of the leucine binding protein. In one embodiment, the fluorescent protein or its functional fragment or variant replaces one or more amino acids in residues 327-331 of the leucine binding protein or a functional fragment thereof, and the residue number corresponds to the full length of the leucine binding protein. Preferably, the fluorescent protein or its functional fragment or variant is inserted in the leucine binding protein or a functional fragment thereof between residues 328 and 329 or between residues 329 and 330.

For example, when the yellow fluorescent protein is inserted between amino acids 325/326, 325/327, 325/328, 325/329, 326/327, 326/328, 326/329, 327/328, 327/329 or 328/329 of BCAA binding protein of SEQ ID NO: 1, the amino acid sequence of the fluorescent sensor is as shown in SEQ ID NOs: 14-23. For example, when the yellow fluorescent protein is inserted between amino acids 327/328, 327/329, 327/330, 327/331, 328/329, 328/330, 328/331, 329/330, 329/331 or 330/331 of leucine binding protein of SEQ ID NO: 2, the amino acid sequence of the fluorescent sensor is as shown in SEQ ID NOs: 24-33.

In this disclosure, the responsive polypeptide that fused with fluorophore can be a full length BCAA binding protein or a full length leucine binding protein, or a fragment thereof; amino acids 1-345 of BCAA binding protein or amino acids 1-347 of leucine binding protein are preferable.

"Linker" means an amino acid or nucleic acid sequence linking the two segments within a polypeptide, protein or nucleic acid in the disclosure. When linking for a polypeptide or protein of the disclosure, the length of the linker is no longer than 6 amino acids, preferably, no longer than four amino acids, more preferably, 3 amino acids. When linking for a nucleic acids of the disclosure, the length of the linker is no longer than 18 nucleotides, preferably no longer than 12 nucleotides, more preferably 9 nucleotides.

When referring to a polypeptide or protein, the term "variant" used herein includes variants of the polypeptide or protein with the same function but differ in sequence. These variants include, but not limited to, sequences obtained by deleting, inserting and/or substituting one or more (typically 1-30, preferably 1-20, more preferably 1-10, and most preferably 1-5) amino acid(s) in the sequence of the polypeptide or protein, and by adding one or more (usually less than 20, preferably less than 10, and more preferably within 5) amino acid(s) to its C-terminus and/or N-terminus. For example, in the art, substitution with amino acids of comparable or similar properties usually does not change the function of the polypeptide or protein. Amino acids with similar properties usually refer to a family of amino acids having similar side chains and have been clearly defined in the art. These families include amino acids with basic side chains (e.g., lysine, arginine, histidine), amino acids with acidic side chains (e.g., aspartate, glutamate), amino acids with uncharged polar side chain (e.g., glycine, asparagine, glutamine, serine, threonine, tyrosine, cysteine), amino acids with non-polar side chains (e.g., alanine, valine, leucine, isoleucine, proline, phenylalanine, methionine, tryptophan), amino acids with β-branched side chains (e.g., threonine, valine, isoleucine), and amino acids with aromatic side chains (e.g., tyrosine, phenylalanine, tryptophan, histidine). As another example, adding one or more amino acids to the C-terminus and/or N-terminus usually does not change the function of the polypeptide or protein either. As known to a person skilled in the art, genetic cloning process often requires design of suitable endonuclease sites, which will eventually introduce one or more irrelevant residues to the terminus of the polypeptide or protein to be expressed, but this does not affect the activity of the target polypeptide or protein. For another example, in order to construct a fusion protein, to promote the expression of a recombinant protein, to obtain a recombinant protein that can secrete itself into the extracellular environment of the host cells, or to facilitate the purification of a recombinant protein, it is often desirable to have the N-terminus, C-terminus, or other suitable regions of the protein added with some amino acids, for example, including, but not limited to, suitable connecting peptides, signal peptides, leader peptides, the terminal extensions, the glutathione S-transferase (GST), maltose E binding protein, Protein A, tags such as 6His or Flag, or factor Xa or thrombin or enterokinase protease cleavage sites. Variants of the polypeptide or protein may include: homologous sequences, conservative variants, allelic variants, natural mutants, induced mutants, polypeptide or protein encoded by a DNA which could hybridize with the DNA for said polypeptide or protein under high or low stringent conditions, as well as the polypeptide or protein derived from antiserum against said polypeptide or protein. These variants may also comprise polypeptide or protein whose sequence is at least about 70%, at least about 75%, at least about 80%, at least about 85%, at least about 90%, at least about 95%, at least about 98%, at least about 99%, or 100% sequence identity with said polypeptide or protein.

In the context of two or more polypeptides or nucleic acid sequences, the term "identical" or "percent identity" means, when compared and aligned for maximum correspondence over a comparing window or designated region using available methods such as comparing algorithms known in the art or by manual alignment and visual inspection, two or more sequences or sub-sequences are the same or have a specified percentage of amino acid residues or nucleotides that are the same (e.g., 60%, 65%, 70%, 75%, 80%, 85%, 90%, 91%, 92%, 93%, 94%, 95%, 96%, 97%, 98%, 99% or 100% are the same). For example, preferred algorithms that are suitable for determining the percent sequence identity or similarity are the BLAST and BLAST 2.0 algorithms, which can be found in Altschul (1977) Nucleic Acids Res. 25:3389 and Altschul (1990) J. Mol Biol. 215:403, respectively.

The terms "functional fragment", "derivative" and "analog" mean polypeptides or proteins retain substantially the same biological function or activity of original polypeptide or protein. The "functional fragment", "derivative" and "analog" may have the same or substantially the same amino acid sequences compared with naturally occurring proteins.

As used herein, "substantially the same" means that most of, not all of, the amino acid sequence are identical, but retain the functional activity of the related sequence. Usually, two amino acid sequences are "substantially the same" or "substantially homologous", if they are at least 85% identical. The term also includes fragments with three-dimensional structures different from those of naturally occurring proteins. Functional fragments, derivatives or analogs of the responsive polypeptides in the disclosure may be (i) proteins with one or more conservative or non-conservative amino acid substitution (preferably conservative), where the substituted amino acid residues may or may not be one encoded by the genetic code, or (ii) proteins containing substitutions of one or more amino acid residues having a substituent group, or (iii) proteins formed having the mature protein fused with another compound (such as compounds that extend half-life of the protein, for example, polyethylene glycol), or (iv) proteins formed by having said protein fused with additional amino acid sequence (such as leader sequence or secretory sequence, or sequence used for purification of the protein or proprotein sequence, or fusion protein formed with fragment of antigen IgG). In accordance with the teachings provided herein, these functional fragments, derivatives and analogs are well known to a person skilled in the art.

The differences between analogs and the original polypeptide or protein may be the difference in amino acid sequences, and may also be the difference in the forms of modifications that will not affect the sequence, or both. These proteins include natural or induced genetic variants. Induced variants can be obtained by a variety of techniques, such as generating random mutagenesis by irradiation or exposure to mutagens, and can also be obtained by directed mutagenesis or other known molecular biology techniques.

Analogs mentioned herein also include analogs with residue(s) different from natural L-amino acid (e.g., D-amino acids), as well as analogs with a non-naturally occurred or synthetic amino acid (such as β, γ-amino acids). It should be understood that the responsive polypeptide of the disclosure is not limited to the representative proteins, fragments, derivatives and analogs exemplified above. Forms of modification (usually without change of the primary structure): chemical derivatization of the protein in vivo or in vitro, such as acetylation or carboxylation. The modifications also include glycosylation, such as proteins generated by conducting glycosylation during protein synthesis and processing or further processing steps. This modification can be achieved by exposure of the protein to an enzyme that glycosylates (such as mammalian glycosylase or deglycosylase). The modifications also include sequences with phosphorylated amino acid residues (e.g. phosphotyrosine, phosphoserine, phosphothreonine), and further include protein modified to improve its anti-proteolytic properties, or to optimize the solubility.

The term "nucleic acid" used herein can be in the form of DNA or RNA. Forms of DNA include cDNA, genomic DNA or artificially synthesized DNA. DNA can be single-stranded or double-stranded. The DNA may be coding strand or non-coding strand. The coding sequence that encodes the mature protein can be identical with the sequence shown in the coding region of SEQ ID NO: 1, 3, 5, 7, 9, 11, 13, 15 or 17, or its degenerate variants. "Degenerate variant" used in the disclosure refers to a nucleic acid sequence that encodes the polypeptide of the disclosure, but is different from the coding region sequence shown in SEQ ID NO: 1, 3, 5, 7, 9, 11, 13, 15 or 17.

In the context of nucleic acid, the term "variants" used herein may be naturally occurring allelic variants or non-naturally occurring variants. These nucleotide variants include degenerate variants, substituted variants, deletion variants, and insertion variants. As known in the art, allelic variant is an alternate form of a nucleic acid, it may be caused by one or more nucleotide substitution, deletion or insertion, but does not substantially alter the function of the encoded protein. The nucleic acid of the disclosure may include nucleotide sequences with at least about 70%, at least about 75%, at least about 80%, at least about 85%, at least about 90%, at least about 95%, at least about 98%, at least about 99%, or 100% identity with said nucleic acid sequence.

As used herein, the term "hybridizing under stringent conditions" is used to describe conditions for hybridization and washing under which nucleotide sequences at least 60% homologous to each other typically remain hybridized to each other. Preferably, stringent conditions are the conditions that under which sequences at least 65%, more preferably at least 70%, and even more preferably at least 80% or higher homologous to each other typically remain hybridized to each other. The stringent condition is known to a person of ordinary skills in the art. In one preferred, non-limiting example, the stringent conditions are: (1) hybridization and elution under relatively low ionic strength and relatively high temperature, such as 0.2×SSC, 1% SDS, 0° C.; or (2) hybridization at the addition of denaturing agent, 50% (v/v) methyl amide, 0.1% fetal calf serum/0.1% Ficoll, 42° C., etc; or (3) hybridization occurred only between two sequences at least 90%, more preferably no less than 95% homologous to each other. Furthermore, the protein encoded by the nucleic acid sequences capable of hybridization has the same biological function and activity as the mature protein shown in SEQ ID NO: 4, 5, 6, 7 or 8.

The present disclosure also relates to a nucleic acid fragment hybridizes with the sequence described above. As used here, the length of "nucleic acid fragment" contains at least 15 nucleotides, preferably at least 30 nucleotides, more preferably at least 50 nucleotides, and most preferably at least 100 or more nucleotides. The nucleic acid fragment can be used for nucleic acid amplification techniques (e.g. PCR).

Generally, the full-length sequences or the fragments of the fluorescent sensor or fusion protein in the disclosure can be obtained by PCR amplification method, recombination method or artificially synthetic method. For PCR amplification, primers can be designed according to the relevant nucleotide sequence disclosed by the disclosure, and in particular, the sequence of the open reading frame, and commercially available cDNA library, or cDNA library prepared by person skilled in the art using routine methods could be used as template, thereby, obtaining the corresponding sequences by amplification. For longer sequences, two or more individual PCR amplifications are typically desired, which are followed by ligating the separately amplified fragment together in a proper order. When the full-length sequence of the fluorescent sensor or fusion protein or fragment thereof is less than 2500 bp, artificial synthesis method can be used. The artificial synthesis method is a conventional synthetic method for DNA in the art, for example, the full-length sequence can be obtained by synthesizing a plurality of small fragments first and then connecting them.

A large quantity of the sequences can be achieved by recombination. Typically, the sequences is cloned into a vector, which is subsequently transferred into cell, and then the corresponding polypeptide or protein can be obtained from the proliferated host cells by routine isolation and purification methods.

Furthermore, artificial synthesis can also be used to synthesize the corresponding sequence, especially when the fragment is short. Typically, multiple smaller fragments are synthesized first, and later linked together to produce a fragment with much longer sequence.

So far, the DNA sequence that encoding the protein herein (or its fragment, derivative, analog or variant) can be obtained solely by chemical synthesis. Said DNA sequence can be introduced subsequently into various available DNA molecules (e.g. vectors) and cells that are already known in the art. Through mutant PCR or chemical synthesis methods, a mutation can be introduced into the sequence of the protein of the disclosure.

As used herein, the terms "expression vector" and "recombinant vector" may be used interchangeably, and refer to a prokaryotic or eukaryotic expression vector known in the art, such as a bacterial plasmid, bacteriophage, yeast plasmid, plant cell virus, mammalian cell virus such as adenovirus, retroviral or other vectors, which can replicate and stabilize in the host organism. One important feature of these recombinant vectors is that they typically comprise expression control sequences. As used herein, the term "expression control sequence" refers to an element that regulates transcription, translation and expression of a target gene, and may be operably linked with the target gene, said element may be an origin of replication, a promoter, a marker gene or translation control elements, including enhancers, operons, terminators, ribosome binding sites, etc., and the selection of expression control sequence depends on the host cell used. In present disclosure, suitable recombinant vector includes, but not limited to, bacterial plasmid. In the context of recombinant expression vector, "operably linked" means the target nucleotide sequence and the regulatory sequence are linked in a way that allows expression of the nucleotide sequence. Suitable methods for constructing expression vector which comprises the coding sequence of the fusion protein and appropriate transcriptional/translational control signals are well known to the person skilled in the art. These methods include in vitro recombinant DNA techniques, DNA synthesis techniques, in vivo recombinant techniques, etc. Said DNA sequence may be effectively linked to a proper promoter in the expression vector to direct mRNA synthesis. Representative examples of promoters include $E.$ $coli$ lac or trp promoter; λ phage PL promoter; eukaryotic promoters include CMV immediate early promoter, HSV thymidine kinase promoter, early and late SV40 promoter, retrovirus LTR, and some other promoters known to control expression of genes in prokaryotic or eukaryotic cells or their viruses. Expression vector further comprises a ribosome binding site for the initiation of translation, and a transcription terminator.

A person of ordinary skills in the art will understand that design of the recombinant expression vector can vary depending on the host cell to be transformed, desired expression level of the protein and other factors. In addition, the recombinant expression vector preferably contains one or more selective marker genes to provide phenotypic traits, such as dihydrofolate reductase, neomycin resistance in eukaryotic cells, or tetracycline or ampicillin resistance in $E.$ $coli$, for the selection of transformed host cells.

In one embodiment, the coding sequence of the fluorescent sensor or fusion protein in present disclosure is double digested with BamHI and HindIII and ligated into the pRSET$_b$ vector digested with BamHI and HindIII to obtain an $E.$ $coli$ recombinant expression vector. The expression vector of the present disclosure can be transferred into a host cell to produce a protein or peptide comprising the fusion protein. This transfer process may be carried out using routine transformation or transfection techniques well known to a person skilled in the art.

As used herein, the term "host cell" or "cell", also known as recipient cells, refers to cells capable of receiving and accommodating recombinant DNA molecule(s), which is the place for recombinant gene amplification. An ideal recipient cell should satisfy two criteria: easily available and proliferating. The "cell" in present disclosure may include prokaryotic cells and eukaryotic cells, specifically, include bacterial cells, yeast cells, insect cells and mammalian cells.

The expression vector in present disclosure can be used to express the fluorescent sensor or fusion proteins in prokaryotic or eukaryotic cells. Accordingly, the present disclosure relates to a host cell, preferably $E.$ $coli$, having the expression vector of the disclosure incorporated therein. The host cell can be any prokaryotic or eukaryotic cell, representative examples include: bacterial cells including $E.$ $coli,$ $Streptomyces,$ $Salmonella$ $typhimurium$, fungal cells such as yeast, plant cells, insect cells as Drosophila S2 or Sf9, animal cells as CHO, COS, 293 cells or Bowes melanoma cells, etc., host cells described above are inclusive but not limiting. Said host cells are preferably those advantageous for expression of the gene product or the fermentative production, such cells are well known and routinely used in the art, for example, various $E.$ $coli$ cells and yeast cells. In one embodiment of the present disclosure, $E.$ $coli$ BL21 is selected to construct a host cell that expresses the fusion protein of present disclosure. The choice of appropriate carrier, promoter, enhancer and host cells is evident to a person of ordinary skills in the art.

As used herein, the term "transformation" and "transfection", "incorporating" and "transduction" refer to various techniques, already known in the art, to introduce exogenous nucleic acid (e.g., linear DNA or RNA (e.g., linearized vector or individual gene construct without vector)) or nucleic acid in the form of carrier (e.g., plasmids, cosmids, phage, phagemid, phasmid, transposon or other DNA) into a host cell, including calcium phosphate or calcium chloride coprecipitation, DEAE-mannan-mediated transfection, lipid transfection, natural competent cells, chemical-mediated transfer, or electroporation. When the host is a prokaryote such as $E.$ $coli$, competent cells capable of absorbing DNA can be harvested after exponential growth phase, and treated with CaCl$_2$ method, the steps used therein are well known in the art. Another method uses MgCl$_2$. If necessary, transformation can also be conducted by electroporation. When the host cell is a eukaryotic cell, DNA transfection methods can be used are as follows: calcium phosphate co-precipitation method, conventional mechanical methods such as microinjection, electroporation, liposome packaging, etc.

Transformed cell obtained thereby may be cultured using routine methods which are suitable for the expression in the host cells in order to express the fusion protein of the present disclosure. Depending on the host cells, the medium used for culture can be various conventional media. The culture is performed under conditions suitable for the growth of the host cells. When the host cells have grown to an appropriate cell density, the selected promoter is induced by an appropriate method (such as temperature shift or chemical induction), and the cells are further incubated for another period of time.

In the above method, the recombinant protein can be expressed within the cell, or on the cell membrane or secreted into extracellular environment. If desired, the recombinant protein can be isolated or purified using various separation methods based on its physical, chemical and other characteristics. These methods are well known to a person skilled in the art. Examples of such methods include, but not limited to: conventional refolding treatment, treatment with a protein precipitating agent (salting out), centrifugation, osmotic lysis of bacteria, ultra treatment, ultra centrifugation, molecular sieve chromatography (gel filtration), adsorption chromatography, ion exchange chromatography, high performance liquid chromatography (HPLC) and various other liquid chromatography techniques, and combinations thereof. The affinity chromatography with His-tag is preferred.

In one embodiment, the fluorescence sensor or a fusion protein of present disclosure is produced by fermentation of *E. coli* comprising the coding sequence of the fusion protein, followed by purification using nickel column affinity chromatography to obtain the fluorescent sensor or a fusion protein of the disclosure in a pure form.

Uses of the fluorescent sensor or fusion protein of the present disclosure include, but not limited to, detection of BCAA or leucine, detection of BCAA or leucine in physiological state, detection of BCAA or leucine in subcellular level, in situ detection of BCAA or leucine.

The disclosure also provides the use of the fluorescent sensor in the real-time localization and quantitative detection of BCAA and leucine, and high-throughput compound screening. In one embodiment, preferably, the BCAA fluorescent sensor and the leucine fluorescent sensor are linked to a signal peptide for different parts of the cell and transferred into the cell; then the real-time localization of BCAA and leucine is conducted by detecting the intensity of the fluorescence signal in the cell, and the BCAA and leucine quantitative detection is conducted based on the corresponding BCAA and leucine standard dropping curve. In one embodiment, the BCAA and leucine standard dropping curve is plotted according to the fluorescence signals of the BCAA fluorescent sensor and the leucine fluorescent sensor at different concentrations of BCAA and leucine. The fluorescent sensor of the disclosure is directly transferred into the cell, and the time-consuming sample processing process is not needed in the real-time localization and quantitative detection of BCAA and leucine, and the result is more accurate. In high-throughput compound screening by the fluorescent sensor of the disclosure, different compounds are added to the cell culture medium and the changes of BCAA and leucine content are detected, then the compounds that lead to content changes of BCAA and leucine can be screened. In general, the use described in the present disclosure does not involve the diagnosis and treatment of diseases.

Concentrations, contents, percentages, and other numerical values may be presented herein in a range format. It is to be understood that such range format is used merely for convenience and brevity, and it should be interpreted flexibly to include not only the numerical values explicitly recited as the upper and lower limits of the range, but also to include all the individual numerical values or sub-ranges encompassed within said range as if each numerical values or sub range is explicitly recited.

EMBODIMENTS

1. A fluorescent sensor, comprising
    a) a leucine responsive polypeptide, and
    b) an optically active polypeptide,
    wherein the optically active polypeptide is inserted in the leucine responsive polypeptide.

2. The fluorescent sensor according to embodiment 1, wherein the leucine responsive polypeptide is also responsive to other branched chain amino acids, such as isoleucine or valine, or the optically active polypeptide is a fluorescent protein or a functional fragment or variant thereof.

3. The fluorescent sensor according to any one of the preceding embodiments, wherein the fluorescent sensor further comprises one or more linkers between the leucine responsive polypeptide and the optically active polypeptide.

4. The fluorescent sensor according to any one of the preceding embodiments, wherein the fluorescent sensor further comprises a localization sequence.

5. The fluorescent sensor according to any one of the preceding embodiments, wherein the leucine responsive polypeptide is selected from the group consisting of a BCAA binding protein or its functional fragment, and a leucine binding protein or its functional fragment.

6. The fluorescent sensor according to any one of the preceding embodiments, wherein the leucine responsive polypeptide is a BCAA binding protein or a functional fragment thereof, preferably having a sequence shown in SEQ ID NO: 1 or its functional fragment, or a sequence having 85% identity with SEQ ID NO: 1 or its functional fragment.

7. The fluorescent sensor according to any one of the preceding embodiments, wherein the leucine responsive polypeptide is a leucine binding protein or a functional fragment thereof, preferably having a sequence shown in SEQ ID NO: 2 or its functional fragment, or a sequence having 85% identity with SEQ ID NO: 2 or its functional fragment.

8. The fluorescent sensor according to any one of embodiments 6-7, wherein the optically active polypeptide is inserted in residues 118-120, residues 248-258 or residues 325-331 of the leucine responsive polypeptide, and the residue number corresponds to the full length of the BCAA binding protein or the full length of the leucine binding protein.

9. The fluorescent sensor according to any one of embodiments 6-7, wherein the optically active polypeptide replaces one or more amino acids in residues 118-120, residues 248-258 or residues 325-331 of the leucine responsive polypeptide, and the residue number corresponds to the full length of the BCAA binding protein or the full length of the leucine binding protein.

10. The fluorescent sensor according to embodiment 6, wherein the optically active polypeptide is inserted in the leucine responsive polypeptide at residues 325-329, and the residue number corresponds to the full length of the BCAA binding protein.

11. The fluorescent sensor according to embodiment 6, wherein the optically active polypeptide replaces one or more amino acids in residues 325-329 of the leucine responsive polypeptide, and the residue number corresponds to the full length of the BCAA binding protein.

12. The fluorescent sensor according to embodiment 7, wherein the optically active polypeptide is inserted in the leucine responsive polypeptide at residues 327-331, and the residue number corresponds to the full length of the leucine binding protein.

13. The fluorescent sensor according to embodiment 7, wherein the optically active polypeptide replaces one or more amino acids in residues 327-331 of the leucine responsive polypeptide, and the residue number corresponds to the full length of the leucine binding protein.
14. The fluorescent sensor according to any one of the preceding embodiments, wherein the fluorescent protein is selected from the group consisting of: green fluorescent protein, blue fluorescent protein, cyan fluorescent protein, orange fluorescent protein, apple red fluorescent protein and red fluorescent protein.
15. The fluorescent sensor according to any one of the preceding embodiments, wherein the fluorescent protein has the sequence as shown in any of SEQ ID NOs: 3-13.
16. A nucleic acid sequence encoding the fluorescent sensor according to any one of the preceding embodiments, or a complementary sequence thereof.
17. An expression vector comprising the nucleic acid sequence according to any one of the preceding embodiments operably linked to an expression control sequence.
18. A cell comprising the expression vector according to embodiment 17.
19. A method for preparing the fluorescent sensor according to embodiment 1, comprising: providing a cell comprising a expression vector that expresses the fluorescent sensor according to any one of embodiments 1-15, culturing the cell under conditions suitable for the expression of the cell, and separating the fluorescent sensor.
20. A method for detecting leucine, comprising: contacting the fluorescent sensor according to any one of embodiments 1-15 or the fluorescent sensor prepared by the method according to embodiment 19 with a sample, and detecting the change of the optically active polypeptide.
21. A method for detecting a branched chain amino acid, comprising: contacting the fluorescent sensor according to any one of embodiments 1-15 or the fluorescent sensor prepared by the method according to embodiment 19 with a sample, and detecting the change of the optically active polypeptide, wherein the branched chain amino acid is selected from such as leucine, isoleucine and valine.
22. Use of the fluorescent sensor according to any one of embodiments 1-15 or the fluorescent sensor prepared by the method according to embodiment 19 in detecting leucine in a sample.
23. Use of the fluorescent sensor according to any one of embodiments 1-15 or the fluorescent sensor prepared by the method according to embodiment 19 in detecting a branched chain amino acid in a sample, wherein the branched chain amino acid is selected from such as leucine, isoleucine and valine.
24. A kit comprising the fluorescent sensor according to any one of embodiments 1-15 or the fluorescent sensor prepared by the method according to embodiment 19.

EXAMPLE

The disclosure is further illustrated by the specific examples described below. It should be understood that these examples are merely illustrative, and do not limit the scope of the present disclosure.

Unless otherwise indicated, experimental protocols in the following examples generally adopt customary conditions, such as those described in Sambrook et al., "*Molecular Cloning: A Laboratory Guide*" (New York, USA: Cold Spring Harbor Laboratory Press, 1989); Jane Ruskems et al., Lab Ref "*A handbook of Recipes, Reagents, and Other Reference Tools for Use at the Bench*"; J. Sambrook, D. W. Russell, "*Molecular Cloning: A Laboratory Guide*", translated by Huang Beitang (Third Edition, August 2002, published by Science Press, Beijing); Freseni, et al. "*Culture of Animal Cells: a Manual of Basic Technique*", translated by Zhang Jingbo and Xu cunshuan (Fifth Edition); J. S. bonifassin, M. Dassault, et al, "*Short Protocols in Cell Biology*", translated by Zhang Jingbo; or the conditions according to the manufacturer's recommendations. Unless otherwise indicated herein, all percentages and parts are by weight. Based on the following Examples, it is not difficult for a person of ordinary skill in the art to successfully implement the disclosure by making slight modifications and transformations according to the specific circumstances, which fall within the scope of the claims of the present disclosure.

I. Experimental Materials and Reagents

The pRSETb-cpYFP, pRSETb-LivJ, and pRSETb-LivK plasmid used in the Examples was constructed by the Protein Laboratory of East China University of Science and Technology, and the pRSETb plasmid was purchased from Invitrogen. All primers for PCR were synthesized, purified and identified via mass spectrometry by Shanghai Generay BioTech Co., Ltd. The expression plasmids constructed in the Examples were sequenced by BGI and Jieli Biology. Taq DNA polymerases used in Examples were purchased from Dongsheng Biological Technology Co., Ltd.; pfu DNA polymerases were purchased from Tiangen biotech (Beijing) Co., Ltd.; and primeSTAR DNA polymerases were purchased from Takara. The three polymerases were provided with corresponding polymerase buffers and dNTPs. BamHI, BglII, HindIII, NdeI, XhoI, EcoRI, SpeI, T4 ligase, T4 phosphorylase (T4 PNK) were purchased from Fermentas, with corresponding buffers. Lip2000 Kit was purchased from Invitrogen. BCAA and leucine were purchased from Sigma. Unless otherwise indicated, inorganic salts and other chemical reagents are purchased from Sigma Aldrich. HEPES, ampicillin (AMP) and puromycin were purchased from Ameresco Co., Ltd; 96-well detection blackboard and 384-well fluorescence detection blackboard were purchased from Grenier.

The DNA purification kit used in the Examples was purchased from BBI (Canada), and the plasmid small extraction kit was purchased from Tiangen biotech (Beijing) Co., Ltd. The clone strain Mach1 was purchased from Invitrogen. Both Ni affinity chromatography column and desalination column packing were from GE Healthcare.

The instruments used in the Examples: Biotek Synergy 2 Microplate Reader (Bio-Tek, United States), X-15R high-speed freezing centrifuge (Beckman, United States), Microfuge22R high-speed freezing centrifuge (Beckman, United States), PCR amplification instrument (Biometra, Germany), Ultrasonic crusher (Scientz Co, Ltd., Ningbo), Nuclear Acid Electrophoresis instrument (Shenneng Co, Ltd.), Fluorescence Spectrophotometer (Varian, USA), $CO_2$ Constant Temperature Cell Incubator (SANYO), Inverted Fluorescence Microscope (Nikon, Japan).

II. Conventional Molecular Biology Method and Cell Experimental Method Used in Examples (1) PCR
1. Target Fragment PCR:
The target fragment PCR was used to amplify gene fragments and identify positive colonies. The reaction system of PCR is shown in Table 1, and the amplification procedure is shown in Table 2.

TABLE 1

PCR reaction system
Target fragment PCR reaction system

| | |
|---|---|
| Template | 0.5-1 μL |
| Forward primer (25 μM) | 0.5 μL |
| Reverse primer (25 μM) | 0.5 μL |
| 10 × pfu buffer | 5 μL |
| pfu DNA polymerase | 0.5 μL |
| dNTP (10 mM) | 1 μL |
| ddH$_2$O | 41.5-42 μL |
| total | 50 μL |

TABLE 2

PCR procedure
PCR procedure

| | | |
|---|---|---|
| denaturation | 95° C. | 2-10 min |
| 30 cycles | 94-96° C. | 30-45 s |
| | 50-65° C. | 30-45 s |
| | 72° C. | bp/(600 bp/min) |
| extension | 72° C. | 10 min |

2. Long fragment (>2500 bp) PCR:

The long fragment amplification used in the disclosure is mainly a reverse PCR amplification, which is used to obtain site directed mutation in the following Examples. Reverse PCR primers were designed on the mutation site, and the 5' end of one primer contained the mutated nucleotide sequence. The amplified products contain the corresponding mutated nucleotide sequence. The reaction system of long fragment PCR is shown in Table 3, and the amplification procedure is shown in Table 4 or Table 5.

TABLE 3

Long fragment (>2500 bp) PCR reaction system
Long fragment (>2500 bp) PCR reaction system

| | |
|---|---|
| Template (10 pg-1 ng) | 1 μL |
| Forward primer (25 μM) | 0.5 μL |
| Reverse primer (25 μM) | 0.5 μL |
| 5 × PrimerSTAR buffer | 10 μL |
| PrimerSTAR DNA buffer | 0.5 μL |
| dNTP (2.5 mM) | 4 μL |
| ddH$_2$O | 33.5 μL |
| total | 50 μL |

TABLE 4

Long fragment (>2500 bp) PCR procedure
Long fragment PCR procedure

| | | |
|---|---|---|
| denaturation | 95° C. | 5 min |
| 30 cycles | 98° C. | 10 s |
| | 50-68° C. | 5-15 s |
| | 72° C. | bp/(1000 bp/min) |
| extension | 72° C. | 10 min |

TABLE 5

Long fragment (>2500 bp) PCR procedure
Long fragment PCR procedure

| | | |
|---|---|---|
| denaturation | 95° C. | 5 min |
| 30 cycles | 98° C. | 10 s |
| | 68° C. | bp/(1000 bp/min) |
| extension | 72° C. | 10 min |

(2) Endonuclease Digestion Reaction:

The system of double enzyme digestion of a plasmid is shown in Table 6, wherein n represents the amount of ddH$_2$O needed to make the system up to the total volume.

TABLE 6 double enzyme digestion system of a plasmid
double enzyme digestion system of a plasmid

| | |
|---|---|
| plasmid | 20 μL(about 1.5 μg) |
| 10 × Buffer | 5 μL |
| endonuclease 1 | 1-2 μL |
| endonuclease 2 | 1-2 μL |
| ddH$_2$O | n μL |
| total | 50 μL |
| reaction condition | 37° C., 1~7 h |

(3) 5' Phosphorylation of DNA Fragment

The plasmids or genomic DNA extracted from microorganisms contain phosphate groups at ends, while PCR products do not. Therefore, it is necessary to add phosphate group to the 5' terminal of PCR products, and only DNA molecules containing phosphate groups at ends can get ligated. The phosphorylation reaction system is shown in Table 7, in which T4 PNK is the abbreviation of T4 polynucleotide kinase, which is used for the addition of phosphate groups on the 5' terminal of DNA molecules.

TABLE 7

Phosphorylation reaction system
Phosphorylation reaction system

| | |
|---|---|
| PCR products DNA | 5-8 μL |
| 10 × T4 ligase Buffer | 1 μL |
| T4 PNK | 1 μL |
| ddH$_2$O | 0-3 μL |
| total | 10 μL |
| reaction condition | 37° C., 30 min~2 h, then 72° C., 20 min |

(4) Ligation of Target Fragment and Plasmid

The ligation methods of different fragments and plasmids (vectors) are different, and three ligation methods are used in the disclosure.

1. Ligation Between Blunt Ends of Short Fragments and Linearized Vectors

The method is achieved by phosphorylation of PCR products with blunt ends at the 5' end of the DNA fragments using T4 PNK, and ligation of the fragments and linearized vectors in the presence of PEG4000 and T4 DNA ligase to obtain the recombinant plasmid. Homologous recombination ligation system is shown in Table 8.

TABLE 8

| Homologous recombination ligation system | |
|---|---|
| Homologous recombination ligation system | |
| T4 PNK treated DNA fragment | 4 µl |
| linearized vector | 4 µl |
| PEG4000 | 1 µl |
| 10 × T4 ligase Buffer | 1 µL |
| T4 DNA ligase | 1 µL |
| total | 10 µl |
| reaction condition | 22° C., 30 min |

2. Ligation of DNA Fragments with Cohesive Ends and Linearized Vectors with Cohesive Ends DNA fragments treated by endonucleases usually have cohesive ends. Therefore recombinant plasmids can be obtained by linking the DNA fragments to the vectors containing cohesive ends with complementary sequences. The ligation reaction system is shown in Table 9.

TABLE 9

| Ligation reaction system | |
|---|---|
| Ligation reaction system | |
| Endonuclease treated PCR products DNA | 1-7 µL |
| Endonuclease treated vector | 0.5-7 µL |
| 10 × T4 ligase Buffer | 1 µL |
| T4 DNA ligase | 1 µL |
| ddH$_2$O | n µL |
| total | 10 µL |
| reaction condition | 16° C., 4~8 h |

Note:
the mass ratio of PCR product to vector is about 2:1-6:1.

3. Self Cyclization Ligation of 5'-End Phosphorylated DNA Fragments with Site Directed Mutations Due to Reverse PCR The 5'-terminal phosphorylated DNA fragment was ligated by self cyclization between the 3' and 5' ends of the linearized vector to obtain the recombinant plasmid. Self cyclization ligation reaction system is shown in Table 10.

TABLE 10

| Self cyclization ligation reaction system | |
|---|---|
| Self cyclization ligation reaction system | |
| Phosphorylation reaction system | 10 µL |
| T4 ligase (5 U/µL) | 0.5 µL |
| total | 10.5 µL |
| reaction condition | 16° C., 4~16 h |

(5) Preparation and Transformation of Competent Cells
Preparation of Competent Cells:
 1. Single clone (e.g. Mach1) was selected and inoculated in 5 mL LB medium and shaken overnight at 37° C.
 2. Transfer 0.5-1 mL overnight cultured bacteria to 50 mL LB medium and incubate at 37° C., 220 rpm for 3 to 5 h, until OD600=0.5.
 3. The cells were pre-cooled in ice bath for 2 h.
 4. Centrifuge at 4° C., 4000 rpm for 10 min.
 5. Discard the supernatant and suspend the cells with 5 ml of pre-cooled suspension buffer. After homogenization, add the suspension buffer to the final volume of 50 mL.
 6. Ice bath for 45 minutes.
 7. Centrifuge at 4000 rpm for 10 min at 4° C., then the bacteria were resuspended with 5 ml ice pre-cooled storage buffer.
 8. Add 100 µl of bacteria mixture in each EP tube and store at −80° C. or in liquid nitrogen.

Suspension buffer: CaCl$_2$ (100 mM), MgCl$_2$ (70 mM), NaAc (40 mM)

Storage buffer: 0.5 mL DMSO, 1.9 mL 80% glycerin, 1 mL 10×CaCl$_2$ (1 M), 1 mL 10×MgCl$_2$ (700 mM), 1 mL 10×NaAc (400 mM), 4.6 mL ddH$_2$O Transformation:
 1. 100 µl competent cells were thawed on ice bath.
 2. Add appropriate volume of ligation products, gently blow and mix, and ice bath for 30 min. Generally, the added volume of ligation products is less than 1/10 of the volume of competent cells.
 3. The bacteria was put into 42° C. water bath for 90 s, and then transferred to ice bath for 5 min.
 4. Add 500 µl LB and culture in a 37° C. shaker at 200 rpm for 1 h.
 5. Centrifuge the bacteria at 4000 rpm for 3 min, leave 200 µL supernatant to resuspend the bacteria, evenly inoculate on an agar plate containing appropriate antibiotics, and culture the plate upside down overnight in a 37° C. incubator.

(6) Protein Expression, Purification and Fluorescence Detection
 1. BCAA and leucine sensor plasmids based on pRSETb were transformed into JM109 (DE3) and cultured upside down overnight. The clones were selected and added into a 250 mL conical flask and cultured at 37° C. in a shaker at 220 rpm until OD=0.4-0.8. The bacteria was added with 1/1000 (v/v) IPTG (1 M) and induced for 24-36 h at 18° C.
 2. After expression, centrifuge the cells at 4000 rpm for 30 min, add 50 mM phosphate buffer to resuspend the cells, and break the cells by ultrasound until the liqid became clear. Centrifugate at 4° C., 9600 rpm for 20 min.
 3. The supernatant was purified by self-assembled Ni affinity chromatography to obtain proteins. The proteins were dissolved in 20 mM MOPS buffer (pH 7.4) or PBS through self-assembled desalting column.
 4. After the purified BCAA binding protein, leucine binding protein and mutant protein were identified by SDS-PAGE, the sensor was diluted with a determination buffer (100 mM HEPES, 100 mM NaCl, pH 7.3) or phosphate buffer PBS to form the protein solution, with the final concentration of 5-10 µM. A stock solution of 1 M histidine was prepared by adding histidine in a determination buffer (20 mM MOPS, pH 7.4) or phosphate buffer PBS.

Incubate 100 µl 5 µM protein solutions at 37° C. for 5 min, add BCAA or leucine to the final concentration of 100 mM and mix, and then determine absorption at 340 nm by multi-functional fluorescent microplate reader.

Incubate 100 µl 1 µM fluorescent sensor solutions at 37° C. for 5 min, add BCAA or leucine and titrate, and then determine the fluorescence emission intensity at 528 nm based on 485 nm fluorescence excitation. The fluorescence excitation and emission of the samples were determined by a multi-functional fluorescent microplate reader.

Incubate 100 µl 1 µM fluorescent sensor solutions at 37° C. for 5 min, add BCAA or leucine, and then determine the absorption spectrum and fluorescence spectrum of the sensor protein. The absorption spectrum and fluorescence spectrum of the samples were determined by a multi-functional fluorescent microplate reader.

(7) Fluorescence Detection of Mammalian Cells
1. BCAA and leucine sensor plasmids based on pCDNA3.1+ were transfected into HeLa by Lipofectamine 2000 (Invitrogen) and cultured in an incubator with 5% $CO_2$ at 37° C. After 24-36 hours of sufficient expression of the exogenous gene, fluorescence detection was performed.
2. After induction, adherent HeLa cells were washed with PBS for three times, and were detected in HBSS solution by a fluorescence microscope and microplate reader respectively.

Example 1

Construction of Plasmid pRSETb-LivJ and pRSETb-LivK

The LivJ and LivK genes of *Escherichia coli* were amplified by PCR. The PCR products of LivJ were recovered by gel electrophoresis, and then digested by BamHI and HindIII. The PCR products of LivK were recovered by gel electrophoresis and then digested by EcoRI and HindIII. The pRSETb vectors were digested correspondingly. After ligation by T4 DNA ligase, the ligated products were transformed into MachI. The transformed MachI was coated on LB plate (100 ug/mL ampicillin) and cultured overnight at 37° C. Extract the plasmids from MachI transformants, and identify them by PCR. Before later use, the positive plasmids were sequenced to ensure correctness.

Figure 2:
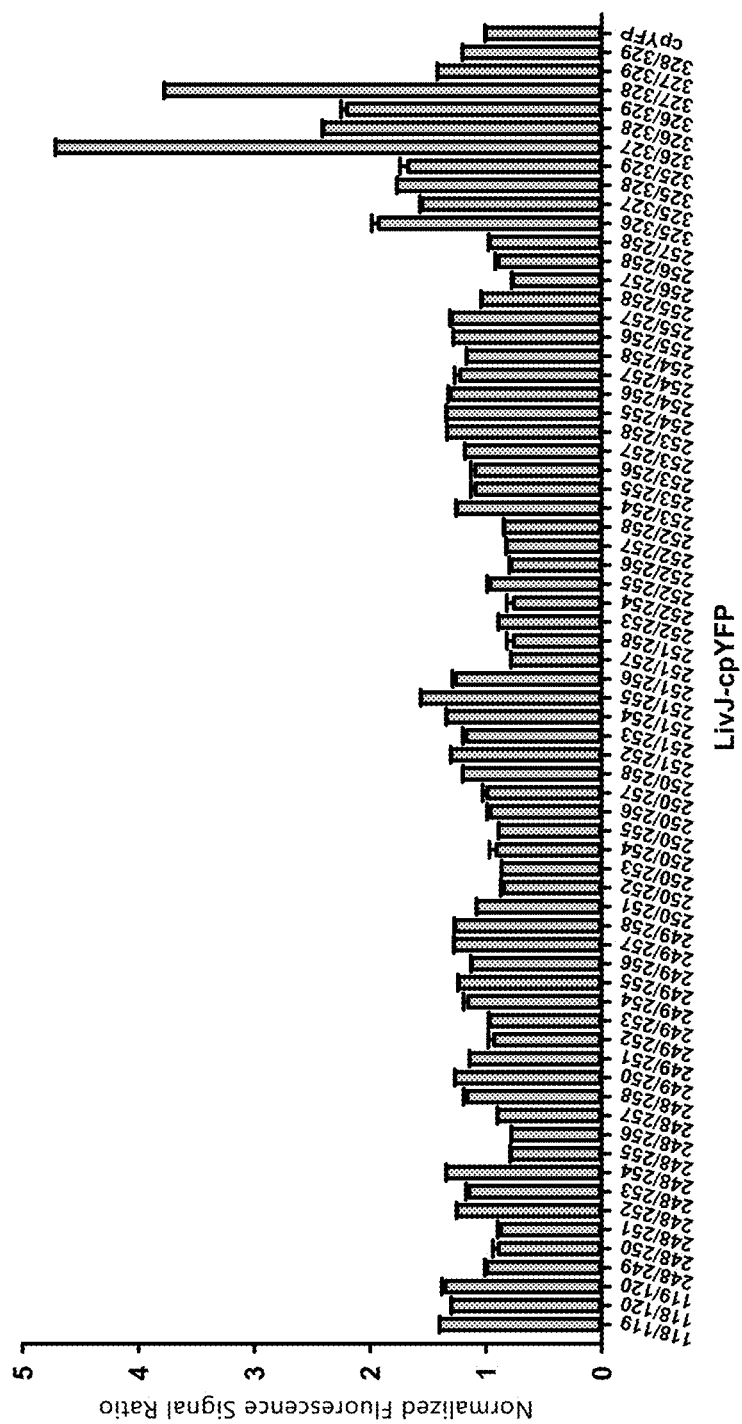
FIG. 2 shows the changes in the response of BCAA fluorescent sensors and leucine fluorescent sensors to BCAA, the BCAA fluorescent sensors and leucine fluorescent sensors are formed by insertion of the yellow fluorescent protein cpYFP at different sites of the BCAA binding protein and leucine binding protein according to Example 1.
Figure 2:
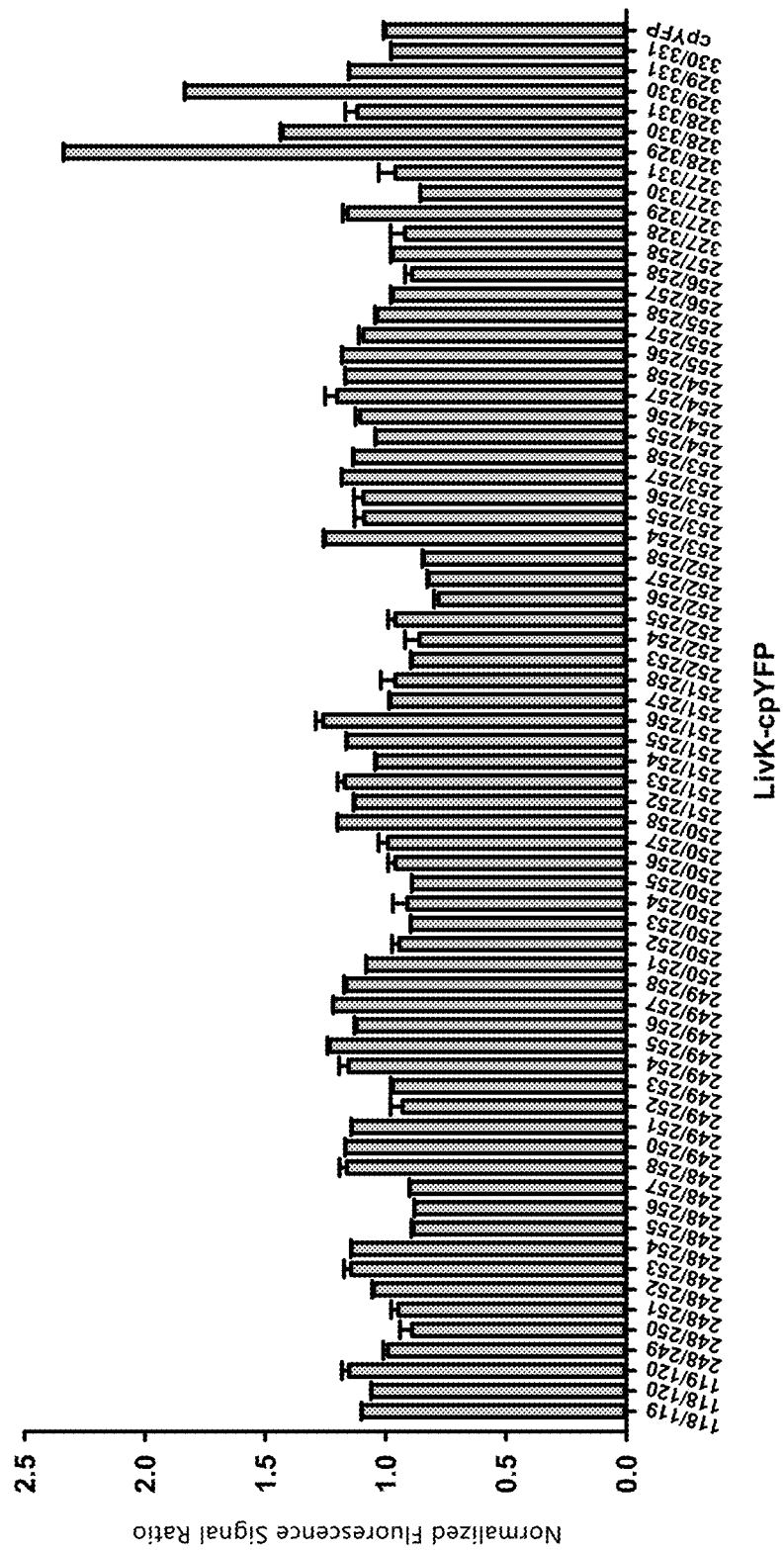

Construction and Detection of Plasmids of pRSETb-LivJ-cpYFP and pRSETb-LivK-cpYFP Fluorescent Sensors with Different Insertion Sites In this Example, plasmids based on pRSETb-LivJ were constructed using the following positions (sites) for insertion according to the crystal structure of LivJ: 118/119, 118/120, 119/120, 248/249, 248/250, 248/251, 248/252, 248/253, 248/254, 248/255, 248/256, 248/257, 248/258, 249/250, 249/251, 249/252, 249/253, 249/254, 249/255, 249/256, 249/257, 249/258, 250/251, 250/252, 250/253, 250/254, 250/255, 250/256, 250/257, 250/258, 251/252, 251/253, 251/254, 251/255, 251/256, 251/257, 251/258, 252/253, 252/254, 252/255, 252/256, 252/257, 252/258, 253/254, 253/255, 253/256, 253/257, 253/258, 254/255, 254/256, 254/257, 254/258, 255/256, 255/257, 255/258, 256/257, 256/258, 257/258, 325/326, 325/327, 325/328, 325/329, 326/327, 326/328, 326/329, 327/328, 327/329, 328/329. Among them, 326/327, 327/328 responded more than 3 times to BCAA (as shown in FIG. 2).

Plasmids based on pRSETb-LivK were constructed using the following positions (sites) for insertion according to the crystal structure of LivK: 118/119, 118/120, 119/120, 248/249, 248/250, 248/251, 248/252, 248/253, 248/254, 248/255, 248/256, 248/257, 248/258, 249/250, 249/251, 249/252, 249/253, 249/254, 249/255, 249/256, 249/257, 249/258, 250/251, 250/252, 250/253, 250/254, 250/255, 250/256, 250/257, 250/258, 251/252, 251/253, 251/254, 251/255, 251/256, 251/257, 251/258, 252/253, 252/254, 252/255, 252/256, 252/257, 252/258, 253/254, 253/255, 253/256, 253/257, 253/258, 254/255, 254/256, 254/257, 254/258, 255/256, 255/257, 255/258, 256/257, 256/258, 257/258, 327/328, 327/329, 327/330, 327/331, 328/329, 328/330, 328/331, 329/330, 329/331, 330/331. Among them, 328/327 and 330/328 responded more than 1.5 times to leucine (as shown in FIG. 2).

The DNA fragment of cpYFP was produced by PCR. After adding a phosphate group at the 5' end, the DNA fragment was inactivated. At the same time, the linearized pRSETb-LivJ and pRSETb-LivK having different break positions were amplified by reverse PCR, and were ligated with the 5' phosphorylated cpYFP fragment in the presence of PEG4000 and T4 DNA ligase to produce recombinant plasmids. The plates were put in Kodak in vivo imaging system, and the clones with yellow fluorescence excited by FITC channel were selected and sequenced by BGI Beijing (Shanghai Branch).

After sequencing, the recombinant plasmid was transformed into JM109 (DE3) to induce expression, and proteins were purified and detected to be 67 kDa by SDS-PAGE electrophoresis. This size was consistent with that of the LivJ-cpYFP and LivK-cpYFP fusion proteins having a His-tag purification tag expressed by pRSETb-LivJ-cpYFP and pRSETb-LivK-cpYFP. Results are shown in FIG. 1

The purified LivJ-cpYFP and LivK-cpYFP fusion proteins were screened for BCAA and leucine response. The signal of the fusion fluorescent protein containing 10 mM BCAA and leucine was divided by the signal of the fusion fluorescent protein without BCAA and leucine.

As shown in FIG. 2, the results showed that the response of BCAA fluorescent sensors 326/327 and 327/328 to BCAA was more than 3 times of the control. 528 nm emission intensity of 326/327 and 327/328 based on 420 nm excitation was decreased with the increase of BCAA concentration; and 528 nm emission intensity of 326/327 and 327/328 based on 485 nm excitation was increased with the increase of BCAA concentration. The response of leucine fluorescent sensors 328/329 and 329/330 to leucine was more than 1.5 times of the control. 528 nm emission intensity of 328/329 and 329/330 based on 420 nm excitation was decreased with the increase of leucine concentration; and 528 nm emission intensity of 326/327 and 327/328 based on 485 nm excitation was increased with the increase of leucine concentration.

Example 2

Design, Construction and Detection of BCAA Fluorescent Sensor Based on cpBFP

Figure 3:
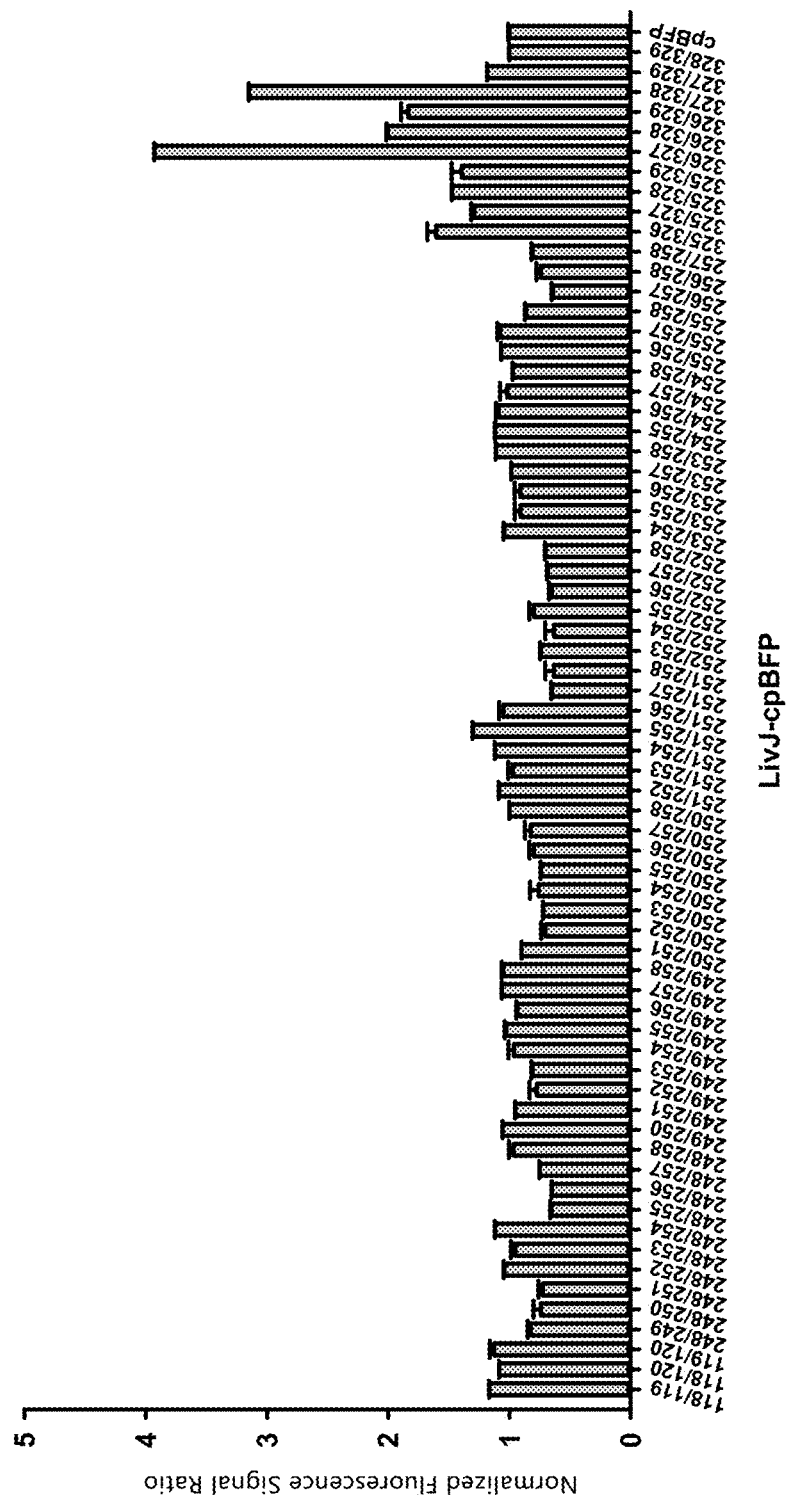
FIG. 3 shows the changes in the response of BCAA fluorescent sensors and leucine fluorescent sensors to BCAA, the BCAA fluorescent sensors and leucine fluorescent sensors are formed by insertion of the blue fluorescent protein cpBFP at different sites of the BCAA binding protein and leucine binding protein according to Example 2.
Figure 3:
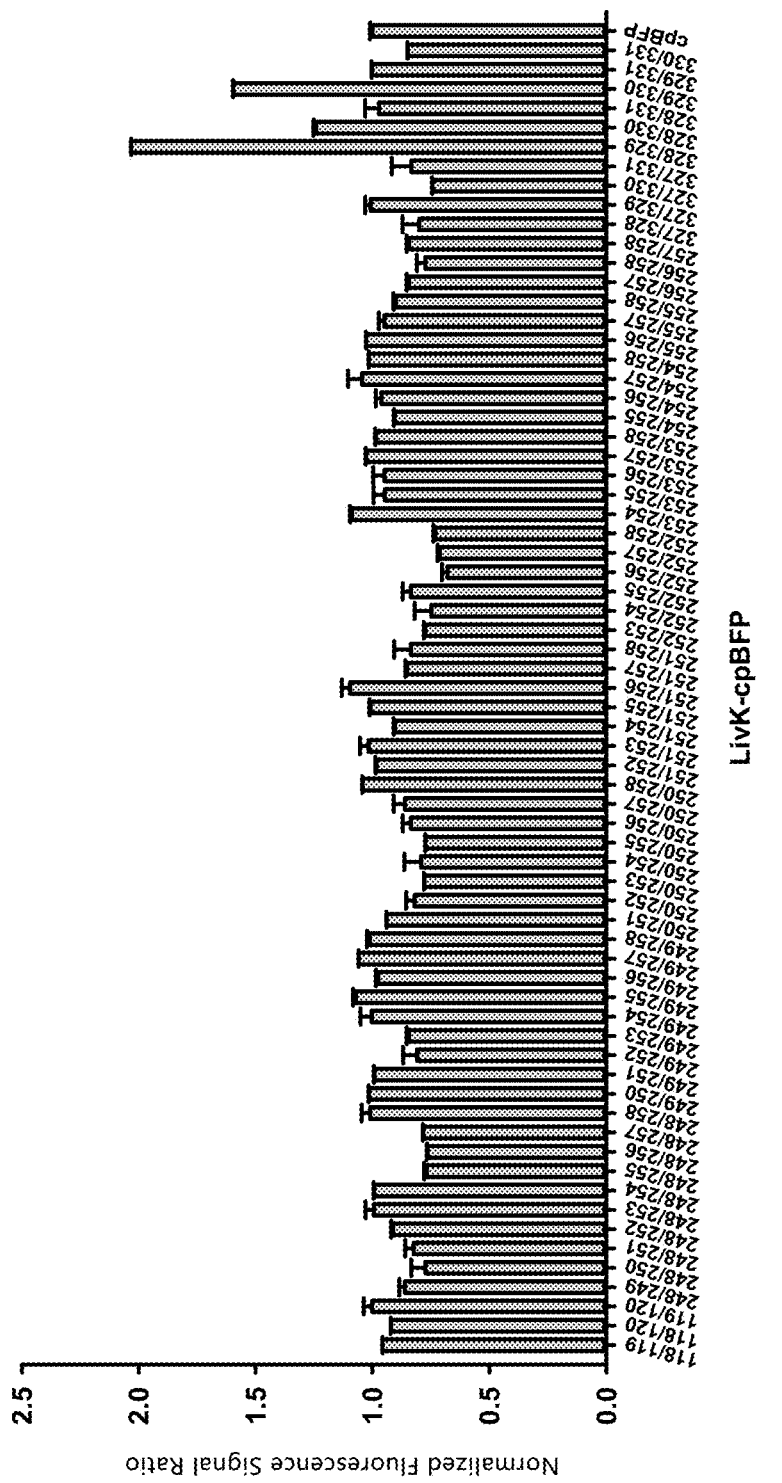

BCAA blue fluorescent sensors and leucine blue fluorescent sensors were constructed according to the method in Example 1, except that cpYFP was replaced with cpBFP, which was fused into BCAA binding protein and leucine binding protein respectively. As shown in FIG. 3, the fluorescence detection results showed that BCAA fluorescent sensors 326/327 and 327/328 responded to BCAA more than 3 times than control, and leucine fluorescent sensors 328/329 and 329/330 responded to leucine more than 1.5 times than control.

Example 3

Design, Construction and Detection of BCAA Fluorescent Sensor Based on cpmApple

Figure 4:
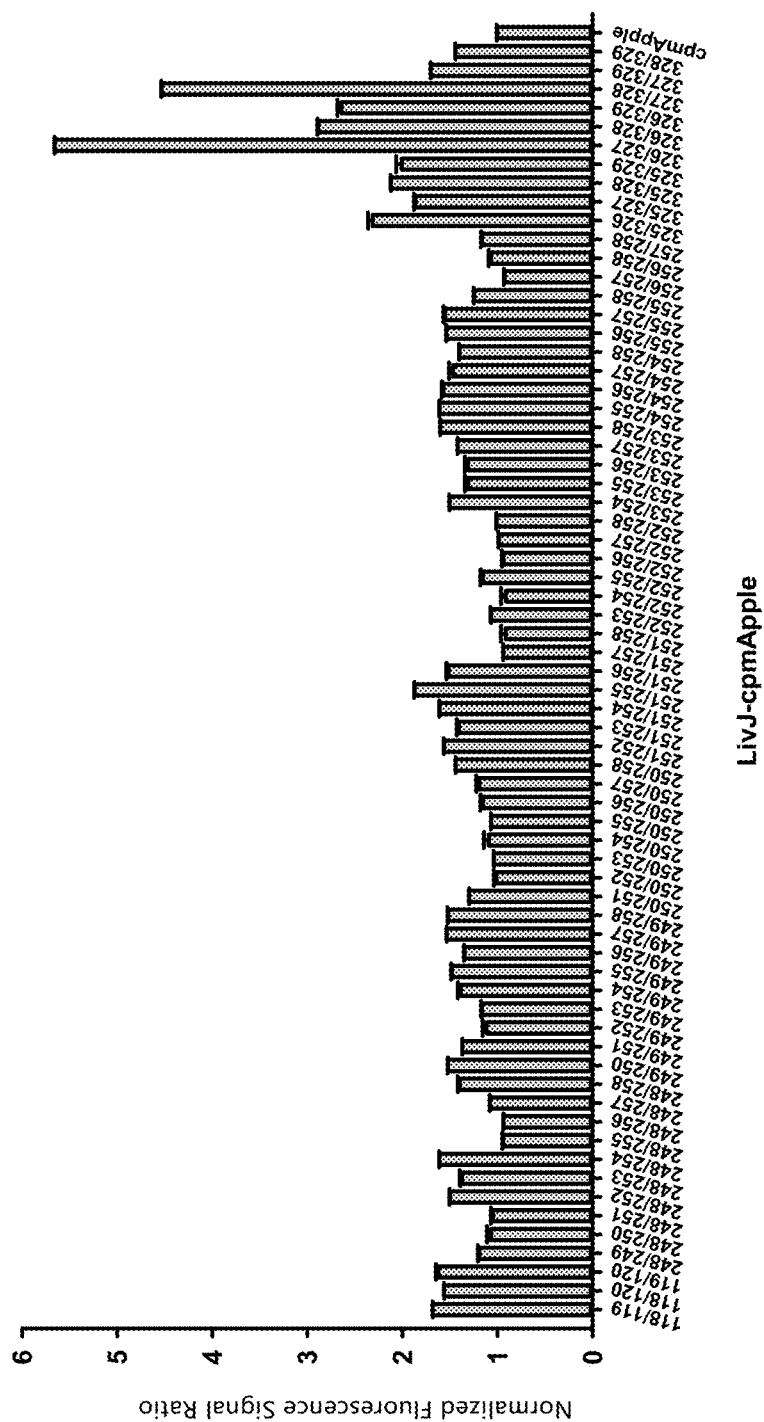
FIG. 4 shows the changes in the response of BCAA fluorescent sensors and leucine fluorescent sensors to BCAA, the BCAA fluorescent sensors and leucine fluorescent sensors are formed by insertion of the apple red fluorescent protein cpmApple at different sites of the BCAA binding protein and leucine binding protein according to Example 3.
Figure 4:
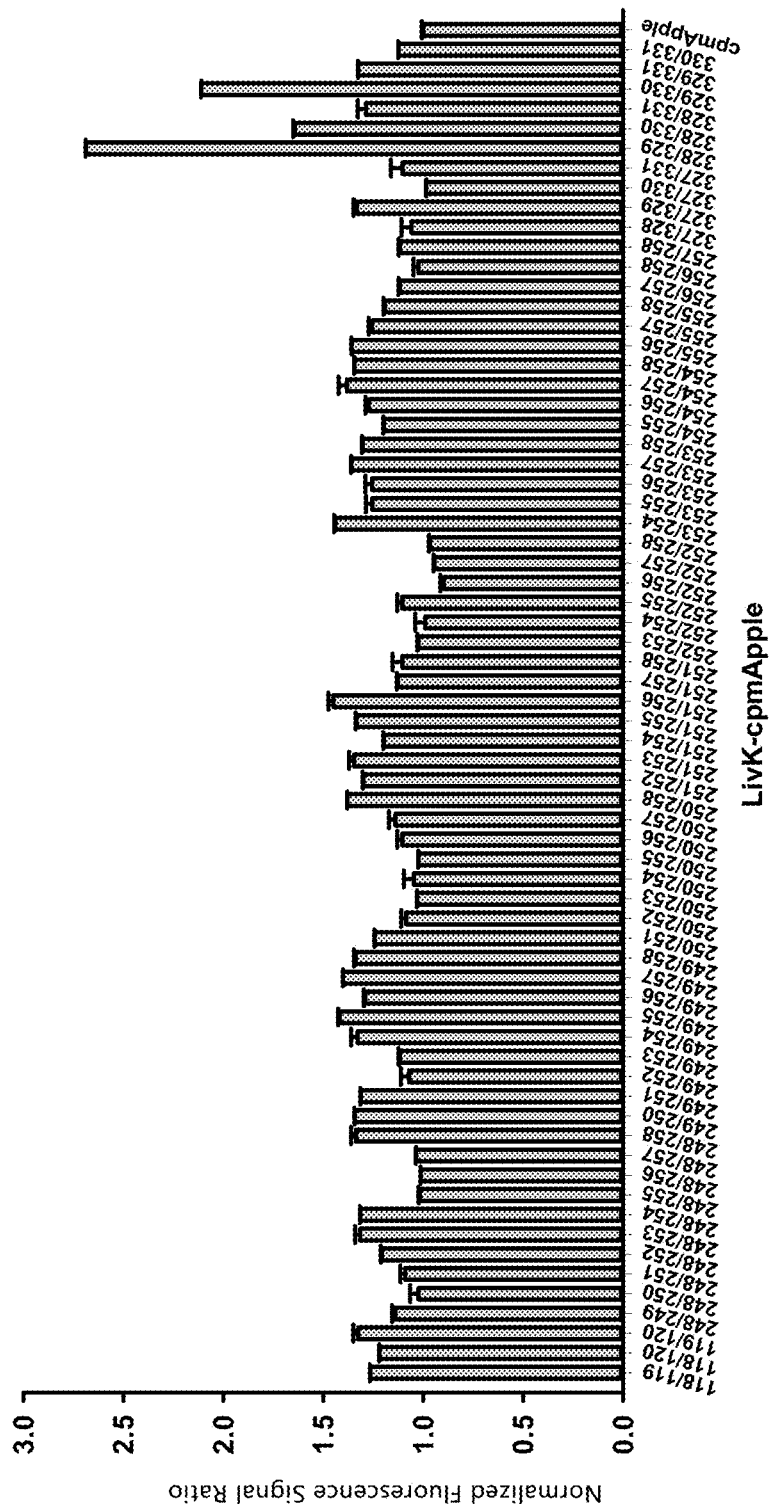

BCAA red fluorescent sensors and leucine red fluorescent sensors were constructed according to the method in Example 1, except that cpYFP was replaced with cpmApple, which was fused into BCAA binding protein and leucine binding protein respectively. As shown in FIG. 4, the fluorescence detection results showed that BCAA fluorescent sensor 326/327 and 327/328 responded to BCAA more than 3 times than control, and leucine fluorescent sensor 328/329 and 329/330 responded to leucine more than 1.5 times than control.

The results of examples 1-3 indicate that linker region 325-329 of BCAA binding protein is suitable for fusing cpFP fluorescent protein to obtain BCAA fluorescent sensors responding to BCAA; linker region 327-331 of leucine binding protein is suitable for fusing cpFP fluorescent protein to obtain leucine fluorescent sensors responding to leucine.

Example 4

Figure 5:
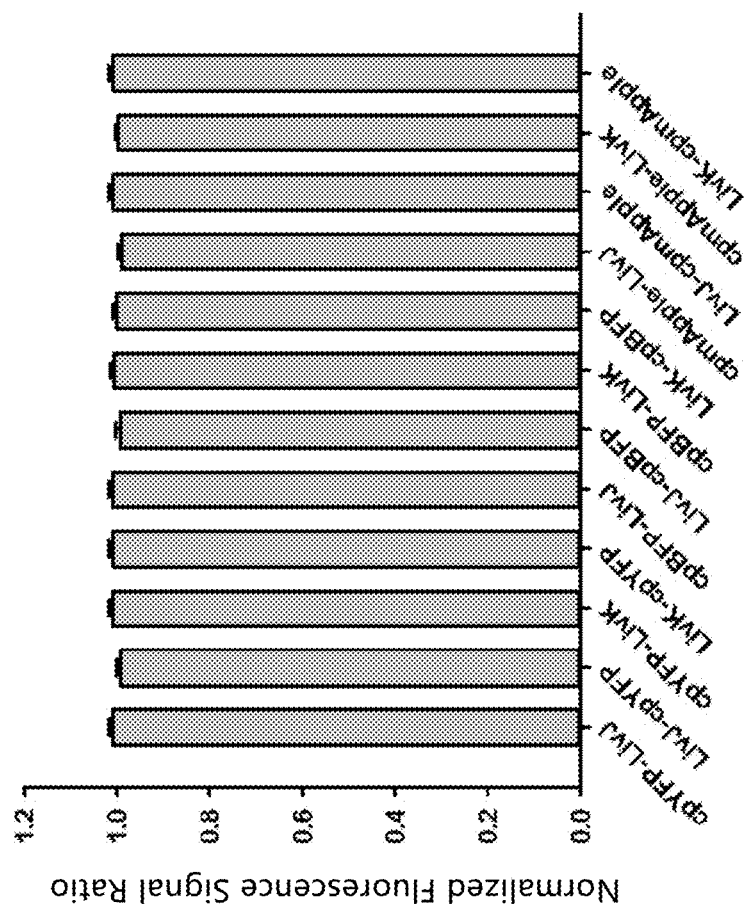
FIG. 5 shows the response of the fusion proteins to BCAA, the fusion proteins are formed by fusion of three fluorescent proteins with the N-terminal or C-terminal of the BCAA fluorescent sensor or the leucine fluorescent sensor described in Example 4.

The Simple Direct Fusion of Fluorescent Protein and BCAA Binding Protein Cannot Produce Fluorescent Sensors Responding to BCAA The fluorescent protein cpYFP was directly fused to the N-terminal or C-terminal of LivK or LivJ protein to construct BCAA fluorescent sensors, and then cpYFP was replaced by cpBFP and cpmApple to construct BCAA blue fluorescent sensors and BCAA red fluorescent sensors respectively. As shown in FIG. 5, the fluorescence detection results showed that the response of the above BCAA fluorescent sensors to BCAA did not change as compared with the control.

Example 5

Characterization of Fluorescent Sensors LivJ-cpYFP and LivK-cpYFP

Figure 6:
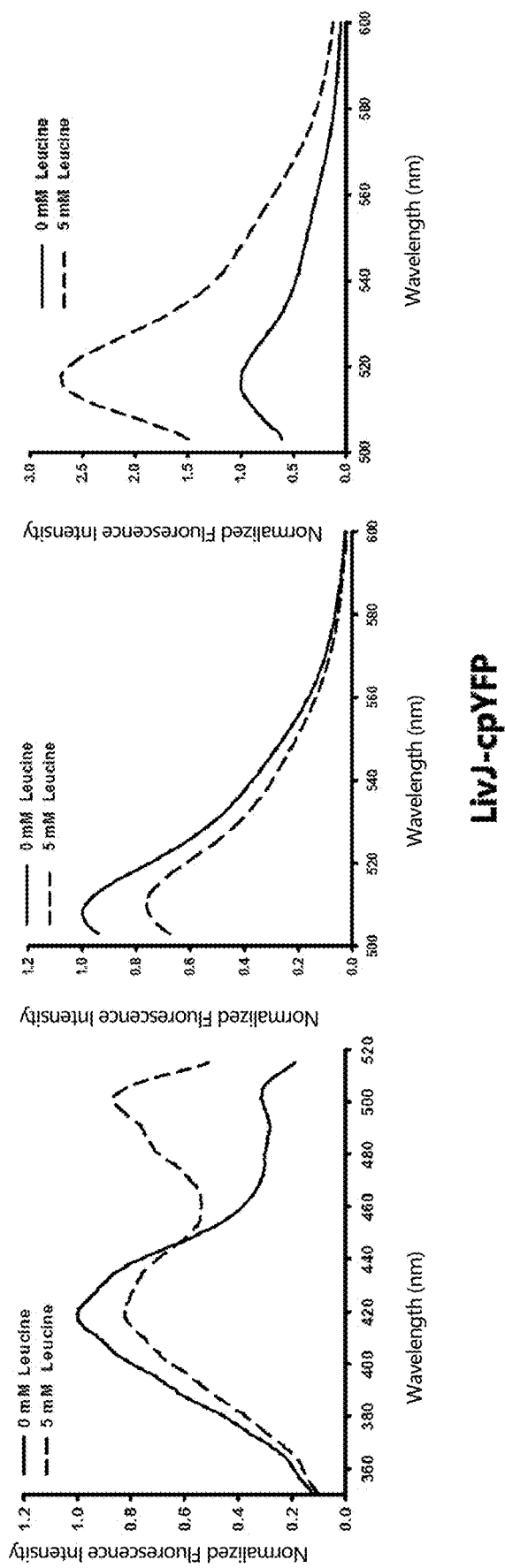
FIG. 6 shows the fluorescence spectrum diagram of BCAA fluorescent sensor and leucine fluorescent sensor described in Example 5.
Figure 6:
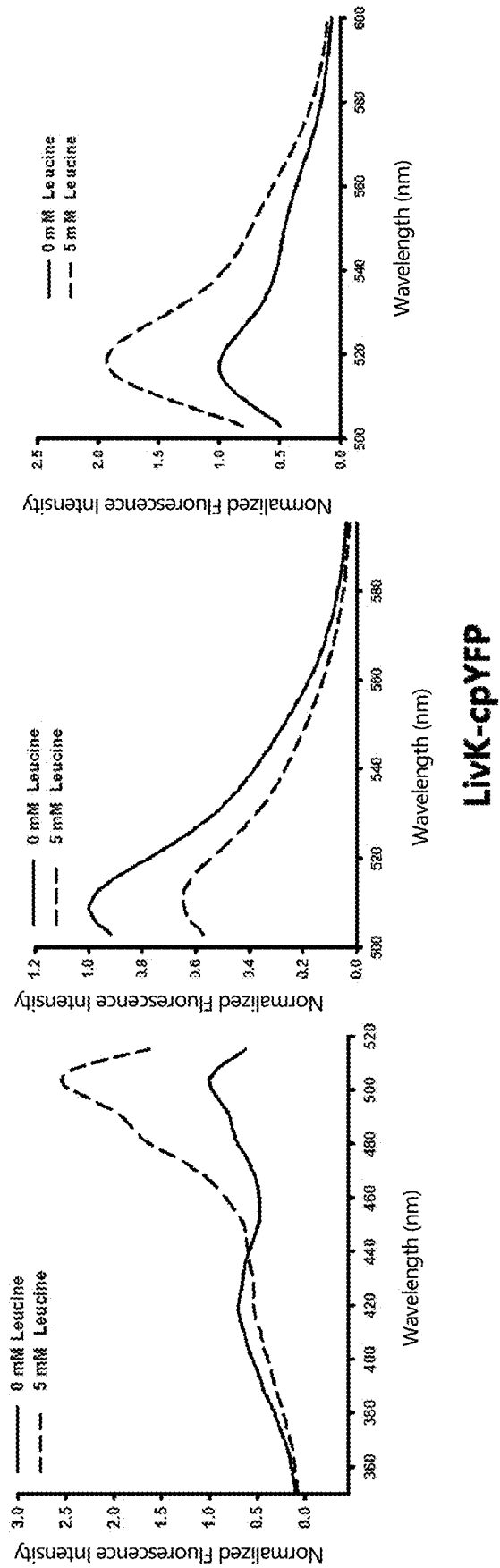

The purified LivJ-cpYFP and LivK-cpYFP were treated with 0 mM and 5 mM leucine respectively for 10 min, and the fluorescence spectra were detected by a fluorescence spectrophotometer. For the determination of excitation spectrum: fixed emission at 530 nm, detect 350~515 nm excitation spectrum; for the determination of emission spectrum, fixed excitation at 490 nm, detect 505~600 nm emission spectrum. The spectra of LivJ-cpYFP and LivK-cpYFP fluorescent sensors were shown in FIGS. 6A and 6B. The results indicate that the fluorescence spectra of LivJ-cpYFP and LivK-cpYFP fluorescent sensors are similar to those of cpYFP (Nagai, T., et al., Proc Natl Acad Sci USA. 2001, V. 98(6), pp. 3197-3202).

Figure 7:
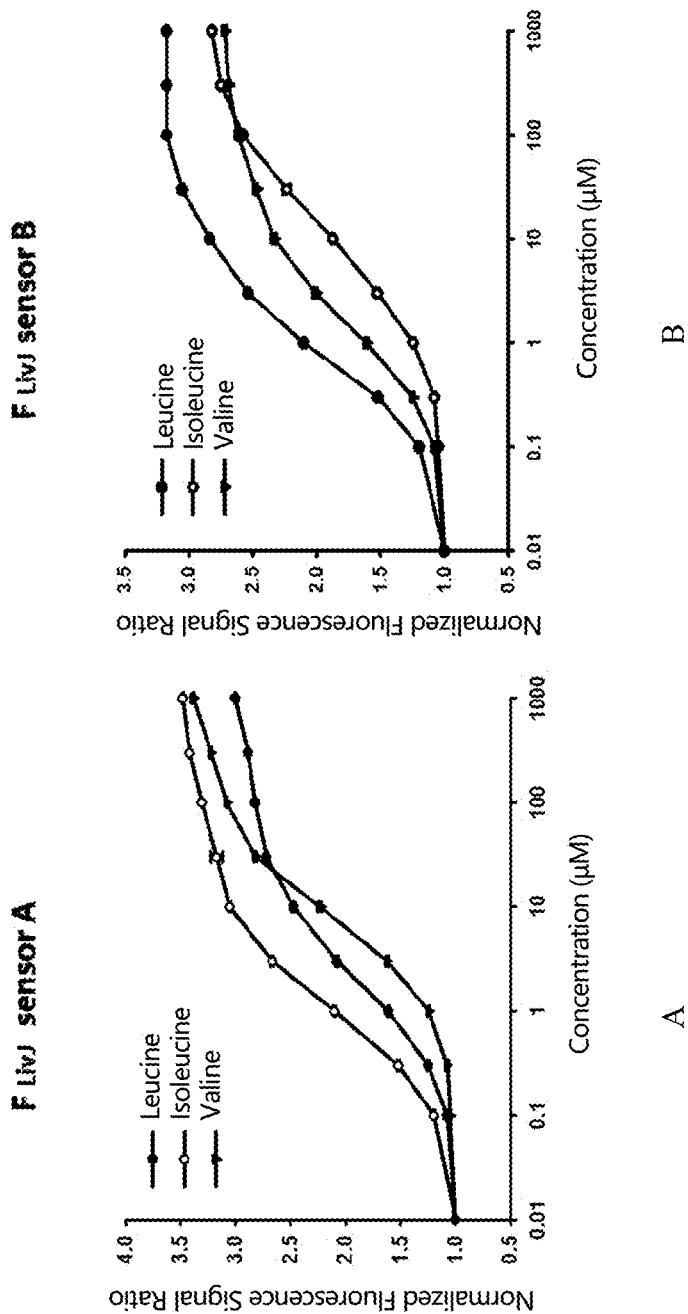
FIG. 7 shows the titration curve of BCAA fluorescent sensors against different concentrations of BCAA, as described in Example 5, and the titration curve of leucine fluorescent sensors against different concentrations of leucine or BCAA, as described in Example 5.
Figure 7:
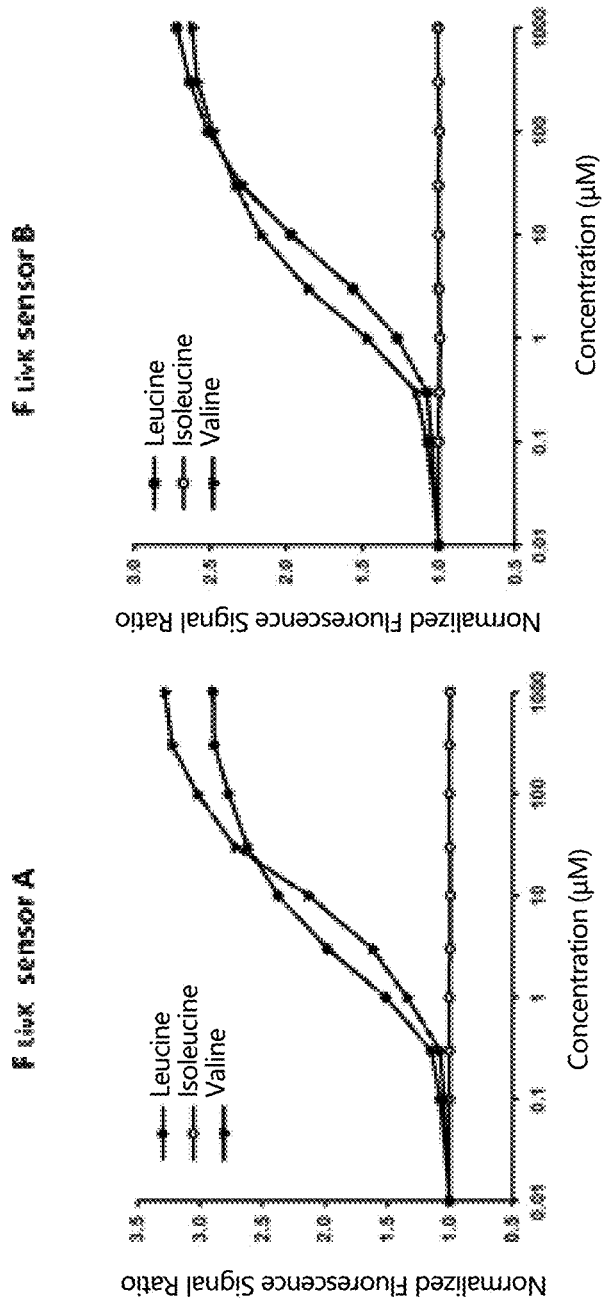

Sensors with the detection range of 0.1 μM~1 mM: F LivJ sensor A (LivJ-cpYFP 326/327), F LivJ sensor B (LivJ-cpYFP 327/328), F LivK sensor A (Livk-cpYFP 328/329), and F LivK sensor B (Livk-cpYFP 329/330) were selected for concentration gradient detection (0-1 mM) of the three BCAA. After the purified LivJ-cpYFP and LivK-cpYFP were treated for 10 min, the ratio of fluorescence intensities at 528 nm excited by 420 nm and at 528 nm excited by 485 nm was detected. The results were shown in FIG. 7. In this way, more suitable BCAA or leucine can be selected for quantitative detection according to the content or level of BCAA or leucine in the sample.

Example 6

Localization of Fluorescent Sensor FLivJ Sensor A in Different Subcellular Organelles and Detection of Fluorescence Sensor Properties in Subcellular Organelles In this embodiment, different localization signal peptides were fused with BCAA fluorescent sensor FLivJ sensor A to localize the sensor into different organelles.

Figure 8:
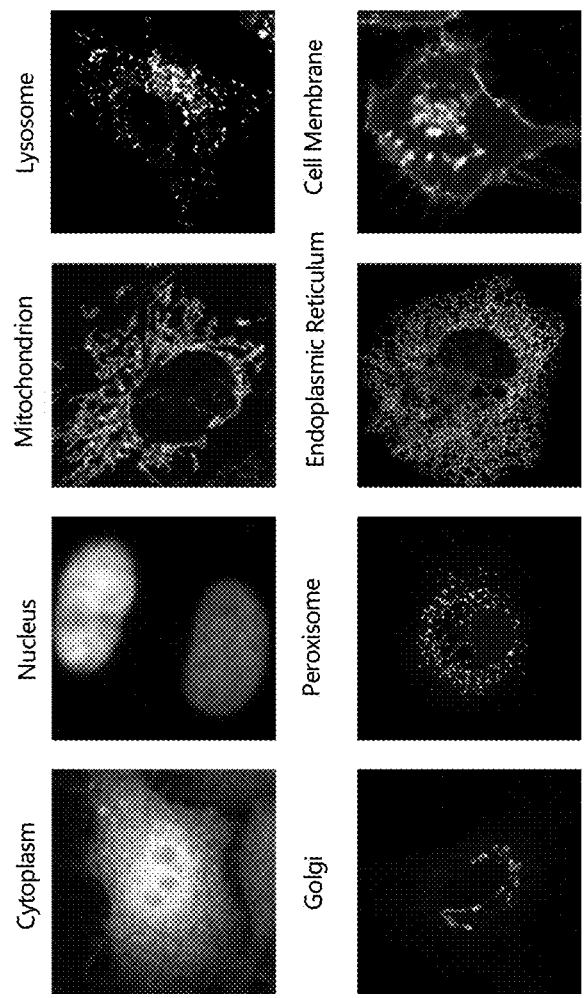
FIG. 8 shows the subcellular localization and distribution of BCAA fluorescent sensors in mammalian cells, as described in Example 6.

After 36 hours of transfection using FLivJ sensor A fused with different localization signal peptides, HeLa cells were washed with PBS and placed in HBSS solution for fluorescence detection under FITC channel by an inverted fluorescence microscope. It is found that FLivJ sensor A, by fusing with different specific localization signal peptides, can be localized into cytoplasm, nucleus, inner membrane, inner membrane, mitochondria, phagosome, lysosome and Golgi body. As shown in FIG. 8, different subcellular structures showed fluorescence, and the distribution and intensity of fluorescence were different.

Figure 9:
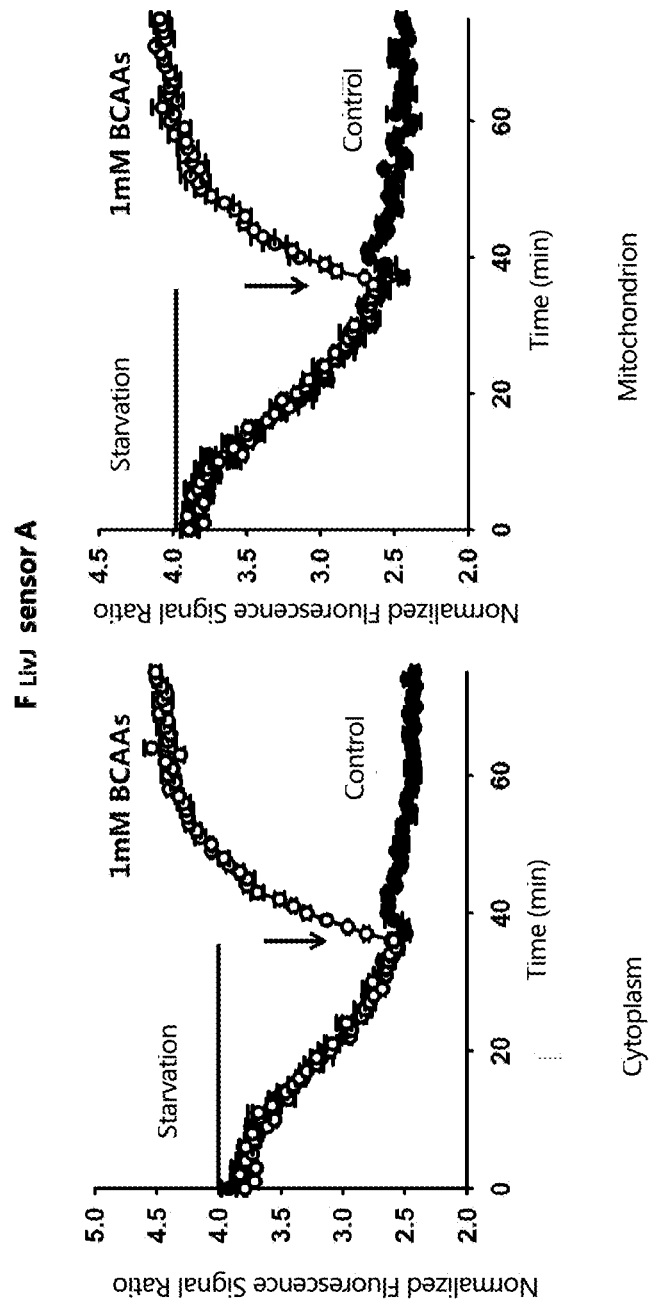
FIG. 9 shows the dynamic monitoring of BCAA transmembrane transport in different subcellular organelles of mammalian cells by the BCAA fluorescent sensor, as described in Example 6.

After 36 hours of transfection using FLivJ sensor A fused with different localization signal peptides (cytoplasm and mitochondria), HeLa cells were washed with PBS and placed in HBSS solution for measurement of the change in the ratio of fluorescence intensities at 528 nm excited by 420 nm and at 528 nm excited by 485 nm during 40 min. As shown in FIG. 9, with the consumption of BCAA, ratio 485/420 was decreased; after adding BCAAs and further measuring for 43 min, ratio 485/420 of the group with added BCAAs increased gradually, while ratio 485/420 of the control group continued to decrease until unchanged.

Example 7

High-Throughput Compounds Screening Based on BCAA FLivJ Sensor A In Vivo

In this Example, a high-throughput compound screening using HeLa cells expressing BCAA FLivJ sensor A in the cytoplasm was performed.

Figure 10:
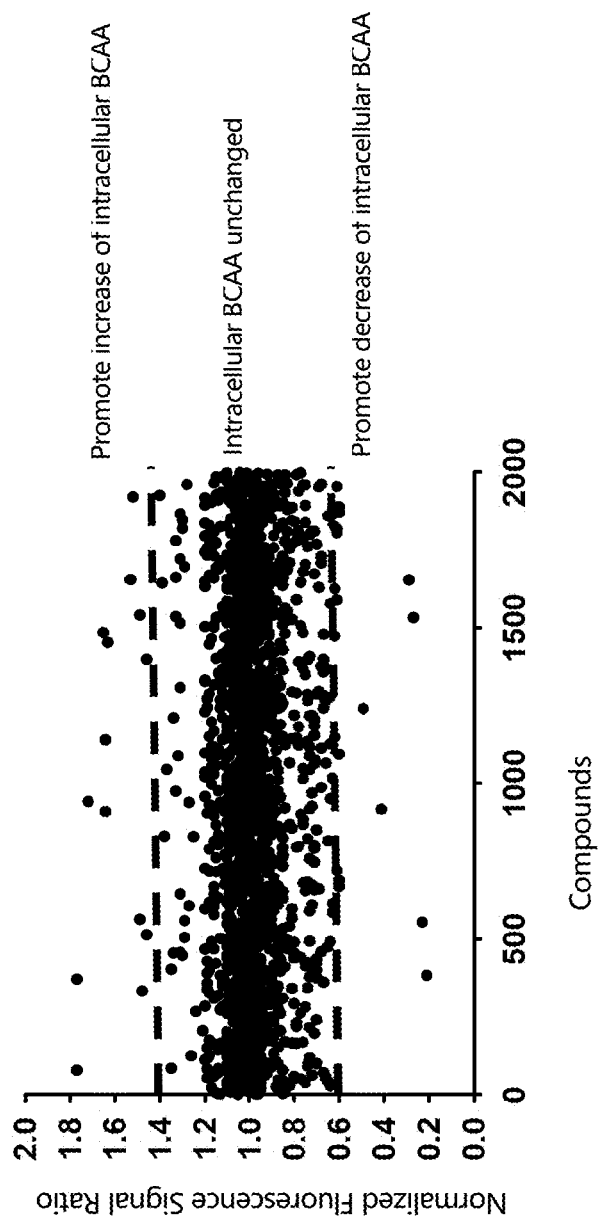
FIG. 10 shows the diagram of in vivo high-throughput screening for compounds based on the BCAA fluorescent sensor, as described in Example 7.

HeLa cells transfected with FLivJ sensor A gene were washed with PBS and treated with HBSS solution (without BCAA) for 1 hour, and then treated with a compound of 10 μM for 1 hour. Add BCAAs. The ratio of fluorescence intensities at 528 nm excited by 420 nm and at 528 nm excited by 485 nm was recorded by a microplate reader. The sample without compound treatment was used as the standard. As shown in FIG. 10, it is found that, among 2000 compounds, most of them had little effect on the precess of BCAAs entering cells. 16 compounds increased the uptake of BCAA by the cells, and 6 compounds could significantly reduce the uptake of BCAA by the cells.

Example 8

Figure 11:
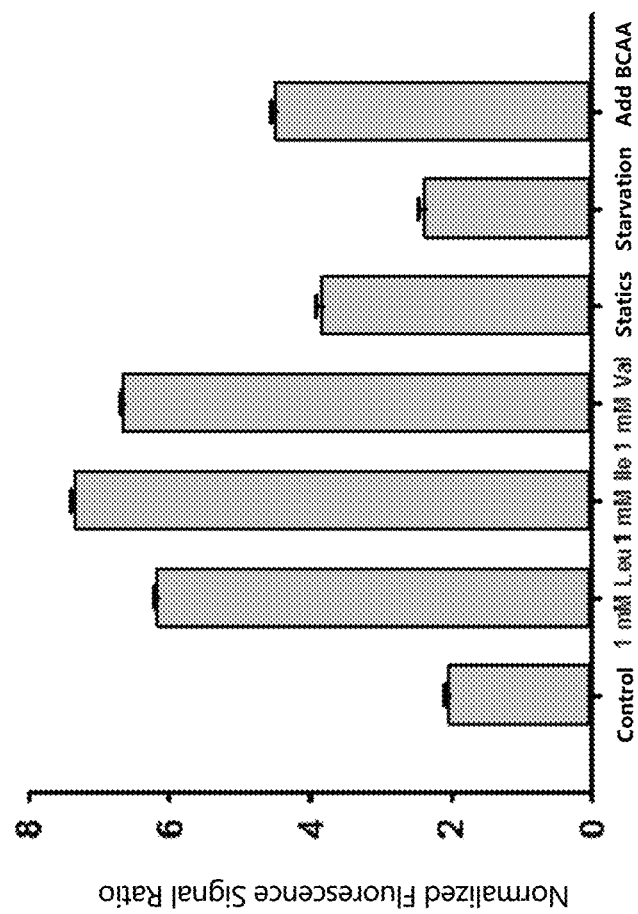
FIG. 11 shows the quantitative analysis of BCAA in culture medium and blood by BCAA fluorescent sensor, as described in Example 8.

Quantitative Analysis of BCAA in Different Subcellular Organelles by BCAA Sensor FLivJ Sensor A In this Example, semiquantitative analysis was performed using HeLa cells expressing BCAA FLivJ sensor A in the cytoplasm. HeLa cells transfected with FLivJ sensor A were divided into several groups: one was not treated, the other was washed with PBS and placed in HBSS solution (without BCAA) for 1 hour, then treated with three kinds of BCAA of 1 mM for 1 hour, or continued to be placed in HBSS solution. The ratio of fluorescence intensities at 528 nm excited by 420 nm and at 528 nm excited by 485 nm was recorded by a microplate reader. As shown in FIG. 11, the metabolism of BCAA can be detected.

It can be seen from the above Examples that the fluorescent sensor provided by the disclosure has relatively small molecular weights and is easy to mature. The sensor has large fluorescence dynamic change range and good specificity. It can be expressed in the cell by gene operation, can be used for real-time localization and quantitative detection of BCAA inside or outside the cell, and can be used in high-throughput screening for compounds.

OTHER EMBODIMENTS

A number of embodiments are described herein. However, it should be understood that, in view of this specification, variations and modifications will be apparent to those skilled in the art, without departing from the spirit and scope of the disclosure. Therefore, these alternative embodiments are also included within the scope of the appended claims.

We claim:

1. A fluorescent sensor, comprising
   a) a leucine responsive polypeptide, and
   b) an optically active polypeptide,
   wherein the optically active polypeptide is a fluorescent protein or a functional fragment thereof,
   wherein the optically active polypeptide is inserted in the leucine responsive polypeptide,
   and wherein the leucine responsive polypeptide has a sequence shown in SEQ ID NO: 1, or a sequence having at least 90% identity with SEQ ID NO: 1 and having a structure in which typical α/β globular domains of a periplasm binding protein are engaged with a hinge, and the optically active polypeptide is inserted in the leucine responsive polypeptide at a site selected from the group consisting of: 251/255, 325/326, 325/327, 325/328, 325/329, 326/327, 326/328, 326/329, and 327/328, or
   the leucine responsive polypeptide has a sequence shown in SEQ ID NO: 2, or a sequence having at least 90% identity with SEQ ID NO: 2 and having a structure in which typical α/β globular domains of a periplasm binding protein are engaged with a hinge, and the optically active polypeptide is inserted in the leucine responsive polypeptide at a site selected from the group consisting of: 328/329, 328/330, and 329/330.

2. The fluorescent sensor according to claim 1, wherein the leucine responsive polypeptide is also responsive to isoleucine and/or valine.

3. The fluorescent sensor according to claim 1, wherein the optically active polypeptide is selected from the group consisting of: green fluorescent protein, blue fluorescent protein, cyan fluorescent protein, orange fluorescent protein, apple red fluorescent protein and red fluorescent protein, or the optically active polypeptide has the sequence shown in any of SEQ ID NOs: 3-13.

4. The fluorescent sensor according to claim 1, wherein, the fluorescent sensor comprises:

(1) an amino acid sequence selected from the group consisting of SEQ ID NO: 14-21, 28, 29, and 31, or (2) a sequence that is 90% identical to the sequence of (1).

5. A nucleic acid sequence encoding the fluorescent sensor according to claim 1, or a complementary sequence thereof.

6. An expression vector comprising the nucleic acid sequence according to claim 5 operably linked to an expression control sequence.

7. A cell comprising the expression vector according to claim 6.

8. A method for preparing the fluorescent sensor according to claim 1, comprising:

provide a cell comprising an expression vector that expresses the fluorescent sensor according to claim 1, culturing the cell under conditions suitable for the expression of the cell, and separating the fluorescent sensor.

9. A method for detecting a branched chain amino acid, comprising:

contacting the fluorescent sensor according to claim 2 with a sample, and detecting the change of the optically active polypeptide, wherein the branched chain amino acid can be selected from leucine, isoleucine and valine.

10. A kit comprising the fluorescent sensor according to claim 1.

* * * * *